(12) United States Patent
Hulls et al.

(10) Patent No.: US 8,082,703 B2
(45) Date of Patent: *Dec. 27, 2011

(54) FORCE-RESISTING DEVICES AND METHODS FOR STRUCTURES

(75) Inventors: John Hulls, Point Reyes, CA (US); Rory R. Davis, Gardnerville, NV (US)

(73) Assignee: Ei-Land Corporation, San Diego, CA (US)

(*) Notice: Subject to any disclaimer, the term of this patent is extended or adjusted under 35 U.S.C. 154(b) by 1554 days.

This patent is subject to a terminal disclaimer.

(21) Appl. No.: 11/201,155

(22) Filed: Aug. 11, 2005

(65) Prior Publication Data

US 2006/0080907 A1 Apr. 20, 2006

Related U.S. Application Data

(63) Continuation-in-part of application No. 10/074,684, filed on Feb. 11, 2002, now Pat. No. 7,043,879.

(60) Provisional application No. 60/601,186, filed on Aug. 13, 2004.

(51) Int. Cl.
*E04B 1/98* (2006.01)

(52) U.S. Cl. .......... 52/167.1; 52/395; 52/167.7

(58) Field of Classification Search .......... 52/167.7, 52/167.3, 395, 293.3, 167.1
See application file for complete search history.

(56) References Cited

U.S. PATENT DOCUMENTS

| | | | |
|---|---|---|---|
| 1,895,667 A | 1/1933 | Junkers | |
| 2,146,333 A | 2/1939 | Deming | |
| 2,263,214 A | 11/1941 | Larkin | |
| 2,576,530 A | 11/1951 | Medal | |
| 2,742,114 A | 4/1956 | Behlen | |
| 3,360,892 A | 1/1968 | Rosso | |
| 3,568,388 A | 3/1971 | Flachbarth | |
| 3,633,327 A | 1/1972 | Klingensmith | |
| 3,657,849 A | 4/1972 | Garton | |
| 3,820,295 A | 6/1974 | Folley | |
| 3,963,099 A | 6/1976 | Skinner et al. | |
| 4,037,379 A | 7/1977 | Ozanne | |
| 4,094,111 A | 6/1978 | Creegan | |
| 4,309,853 A | 1/1982 | Lowe | |

(Continued)

FOREIGN PATENT DOCUMENTS

GB  2 315 288 A  7/1996

OTHER PUBLICATIONS

P. R. Smith, "DESC 1004 Building Principles", University of Sydney, 8 pages, Semester 2, 2000.

(Continued)

*Primary Examiner* — Basil Katcheves
(74) *Attorney, Agent, or Firm* — Drinker Biddle & Rath LLP

(57) ABSTRACT

A force resisting device for transmitting forces and dissipating and absorbing energy in a shear wall or shear wall segment includes at least one active element, the active element having a force versus deflection property under at least one cyclic load such that the shear wall has at least one building code compliant parameter. The building code compliant parameter includes an equivalent response coefficient, R, a system overstrength coefficient, W, and a deflection amplification factor, C. Exemplary embodiments of prefabricated shear walls or shear wall segments include the disclosed force resisting device. Exemplary embodiments of buildings include the disclosed prefabricated shear wall or shear wall segment with the disclosed force resisting device.

14 Claims, 35 Drawing Sheets

U.S. PATENT DOCUMENTS

| | | | |
|---|---|---|---|
| 4,546,590 A | 10/1985 | Finch | |
| 5,070,661 A | 12/1991 | Lo Guidici | |
| 5,079,894 A * | 1/1992 | Lau | 52/847 |
| 5,177,915 A | 1/1993 | Kobori et al. | |
| 5,390,466 A | 2/1995 | Johnson | |
| 5,553,437 A | 9/1996 | Navon | |
| 5,581,969 A | 12/1996 | Kelleher | |
| 5,595,040 A | 1/1997 | Chen | |
| 5,605,024 A * | 2/1997 | Sucato et al. | 52/696 |
| 5,619,837 A | 4/1997 | DiSanto | |
| 5,628,156 A | 5/1997 | Tarics | |
| 5,660,017 A | 8/1997 | Hougton | |
| 5,664,388 A | 9/1997 | Chapman | |
| 5,680,738 A | 10/1997 | Allen et al. | |
| 5,706,614 A | 1/1998 | Wiley | |
| 5,706,626 A | 1/1998 | Mueller | |
| 5,729,950 A | 3/1998 | Hardy | |
| 5,862,639 A | 1/1999 | Abou-Rached | |
| 5,870,870 A | 2/1999 | Utzman | |
| 5,904,025 A | 5/1999 | Bass et al. | |
| 5,927,019 A | 7/1999 | Ichida | |
| 5,974,760 A * | 11/1999 | Tingley | 52/837 |
| 6,006,487 A | 12/1999 | Leek | |
| 6,067,769 A | 5/2000 | Hardy | |
| 6,112,799 A | 9/2000 | Mullet et al. | |
| 6,148,583 A | 11/2000 | Hardy | |
| 6,170,202 B1 | 1/2001 | Davoodi et al. | |
| 6,205,725 B1 | 3/2001 | Butler | |
| 6,212,849 B1 | 4/2001 | Pellock | |
| 6,233,884 B1 | 5/2001 | Tipping et al. | |
| 6,237,303 B1 | 5/2001 | Allen et al. | |
| 6,260,323 B1 | 7/2001 | Hockey | |
| 6,293,063 B2 | 9/2001 | Van Doren | |
| 6,298,612 B1 | 10/2001 | Adams | |
| 6,298,617 B1 | 10/2001 | De Quesada | |
| 6,308,469 B1 | 10/2001 | Leung | |
| 6,327,825 B1 | 12/2001 | Sanders et al. | |
| 6,385,942 B1 | 5/2002 | Grossman | |
| 6,389,767 B1 | 5/2002 | Lucey et al. | |
| 6,412,237 B1 | 7/2002 | Sahai | |
| 6,438,905 B2 | 8/2002 | Constantinou | |
| 6,481,175 B2 | 11/2002 | Potter et al. | |
| 6,484,460 B2 | 11/2002 | VanHaitsma | |
| 6,560,940 B2 | 5/2003 | Mueller | |
| 6,755,003 B1 * | 6/2004 | McGrath et al. | 52/847 |
| 6,761,001 B2 | 7/2004 | Mueller | |
| 7,251,920 B2 | 8/2007 | Timmerman | |
| 2001/0002529 A1 | 6/2001 | Commins et al. | |
| 2002/0162284 A1 | 11/2002 | Karalic | |
| 2002/0162285 A1 | 11/2002 | Sahai | |
| 2003/0150173 A1 | 8/2003 | Hulls et al. | |
| 2004/0154258 A1 | 8/2004 | Hulls et al. | |

OTHER PUBLICATIONS

G. Davis, "Steel moment-frame buildings, Part 2: The engineer's options", *Structural Engineer*, Jun. 2001, pp. 28-35.

D. Utterback, "Common Engineering Problems in Frame Construction", http://www.taunton,com/pages/h00011.asp, The Taunton Press, 6 pages, Apr. 3, 2002.

Simpson Strong-Tie Co., Inc., "Wood Construction Connectors", Catalog C-2002 (front cover and p. 31).

"Details, Dimensions and How to Do It!", The Smart Shear Wall Solution™, Installation Manual, Simplified Structural Systems™, Copyright 2000.

A. Astaneh-Asl, "Seismic Behavior and Design of Steel Sheer Walls," Steel TIPS, Structural Steel Educational Council Technical Information & Product Services (Jan. 2001).

A. Astaneh-Asl, "Seismic Behavior and Design of Steel Shear Walls," SEAONC Seminar, Paper Distributed and Presented at the 2001 SEAONC Seminar, Structural Engineers Association of Northern California (Nov. 2001).

A. Astaneh-Asl, "Steel Plate Shear Walls," U.S.—Japan Workshop on Seismc Fracture Issues in Steel Structures (Feb. 2000).

L. Louca and J. Friis, "Modelling Failure of Welded Connections to Corrugated Panel Structures Under Blast Loading," Imperial College of Science, Technology and Medicine, Deparent of Civil and Environmental Engineering, South Kensington, London, United Kingdom, Offshore Technology Report 2000/088 (2001).

Y. Mo and S. Perng, "Behavior of Framed Shearwalls Made of Corrugated Steel Under Lateral Load Reversals," Advances in Structural Engineering, vol. 3 No. 3 (2000).

C. Miller, "Light Gage Steel Infill Panels in Multistory Steel Frames," Engineering Journal, American Institute of Steel Construction (1974).

Y. Takahashi, T. Takeda, Y. Takemoto and M. Takagi, Experimental Study on Thin Steel Shear Walls and Particular Steel Bracings Under Alternative Horizontal Load, Structural Engineering Laboratory, Technical Research Institute, Ohbayashi-Gumi Ltd., Tokyo, Japan, published in the International Association for Bridge and Structural Engineering Symposium: Resistance and Ultimate Deformability of Structures Acted on by Well Defined Repeated Loads (1973).

Butler Manufacturing Company, A Century of Excellence, Building Profit: vol. 21, No. 1 (Spring 2001).

Y. Kawai, R. Kanno, N. Uno and Y. Sakumoto, "Seismic Resistance and Design of Steel-Framed Houses," Nippon Steel Technical Report No. 79 (Jan. 1999).

M. Elgaaly, "Thin Steel Plate Shear Walls Behavior and Analysis," 32 Thin-Walled Structures 151-180 (1998).

V. Caccese, M. Elgaaly and R. Chen, "Experimental Study of Thin Steel-Plate Shear Walls Under Cyclic Load," 119 Journal of Structural Engineering 573-87, ASCE (Feb. 1993).

M. Elgaaly and Y. Liu, "Analysis of Thin-Steel-Plate Shear Walls," 123 Journal of Structural Engineering, 1487-96 (Nov. 1997).

M. Elgaaly, V. Caccese and C. Du, "Postbuckling Behavior of Steel-Plate Shear Walls Under Cyclic Loads," 119 Journal of Structural Engineering, 588-605 (Feb. 1993).

M. Elgaaly and V. Caccese, "Steel Plate Shear Walls," Proceedings of the 1990 National Steel Construction Conference, American Institute of Steel Construction (AISC) (1990).

P. Timler, "Design Evolution and State-of-the-Art Development of Steel Plate Shear Wall Construction in North America," Structural Engineers Association of California, (SEAOC Proceedings, Proceedings of the 69th Annual Convention (Aug. 2000).

G. Kulak, D. Kennedy, R. Driver and M. Medhekar, "Steel Plate Shear Walls—An Overview," Engineering Journal 50-62 (First Quarter 2001).

R. Driver, G. Kulak, A. Elwi, D. Kennedy, "FE and Simplified Models of Steel Plate Shear Wall," 124 Journal of Structural Engineering 121-30 (Feb. 1998).

R. Driver, G. Kulak, D. Kennedy and A. Elwi, "Cyclic Test of Four-Story Steel Plate Shear Wall," 124 Journal of Structural Engineering 112-20 (Feb. 1998).

M. Elgaaly and A. Seshadri, "Steel Built-Up Girders with Trapezodially Corrugated Webs," Engineering Journal 1-11 (First Quarter 1998).

T. Yamaguchi, Y. Nakata, T. Takeuschi, T. Ikebe, T. Nagao, A. Minami, T. Suzuki, "Seismic Control Devices Using Low-Yield-Pomt Steel," Nippon Technical Report No. 77, 78 (Jul. 1998).

W. Chen, *Handbook of Structural Engineering*, CRC Press (1997).

H. Akiyama, *Earthquake-Resistant Limit-State Design for Buildings*, University of Tokyo Press (1985).

G. Hancock, T. Murray and D. Ellifritt, *Cold-Formed Steel Structures to the AISI Specification*, Marcel Dekker, Inc. (2001).

Canadian Standards Association, "Limit States Design of Steel Structures," (Dec. 2001).

Original Complaint for Patent Infringement filed Oct. 28, 2009 in Civil Action No. 2:09-cv-337-CE.

U.S. Appl. No. 09/897,740 for Corrugated Diaphragm Shear Panel filed Jun. 29, 2001.

U.S. Appl. No. 60/215,290 for Corrugated Diaphragm Shear Panel filed Jun. 30, 2000.

Memarzadeh et al., *Steel and Composite Structures*, vol. 10, No. 1 (2010) 87-108.

Astaneh-Asl, *Steel TIPS*, Structural Steel Education Council, May 2002, pp. 1-49.

Steigmann, *Proceedings of the Royal Society of London. Series A, Mathematical and Physical Sciences*, vol. 429, No. 1876. (May 8, 1990), pp. 141-173.

W. Pan & K.S. Sivakumaran, "Cyclic Response of Metal-Clad Wood-Framed Shear Walls", *Proceedings of the Third International Conference on Thin-Walled Structures*, (Elsevier 2001).

Acsys Panels website "Panelized Building System—Technical Info. and Specifications", http://www.acsys.net/technical-info-specs.htm, Jun. 7, 2010.

Acsys Panels website Panel Building System—Seminar to SIP (Structural Insulated Panel)—Acsys, Inc., http://www.acsys.net/Connection-Details-index.htm, Jun. 7, 2010.

Acsys Panels website "Panel Building System—benefits—construction benefits—owner benefits", http://www.acsys.net/panel-overview-benefits.htm, Jun. 7, 2010.

Acsys Installation Guide v.3.0, "ACSYS Panelized Building System Installation Guide", 2005.

ICC-ES Legacy Report PFC-5881, Reissued Apr. 1, 2005.

Acsys Installation Details, Rev. Date Dec. 11, 2007.

Koreteck Installation Details, Rev. Date Feb. 28, 2007.

LBN—Light Beam Inc., Steel Homes Brochure, 1995.

Light Beam System—LBN Shear Panel, Jan. 1997.

Light Beam Panel Specification Sheet, Feb. 11, 1996.

Light Beam System—News Release, Sep. 1996.

A1 Commings Memo, Shearwall/Holdown Testing, Preliminary Observations, Jun. 6, 1996.

Quinton Bowles, UMKC Institute, Observer's Report of Diaphragm Strength and Stiffness of the Butlerib II Roof and Wall Panels, 1984.

Carl E. Kurk, University of Kansas, Butlerib II Diaphragm Tests, Aug. 7, 1985.

Sheet Metal Perimeter Foundation Anchorpanel Information Sheet, 2002.

Anchorpanel Summary, http://www.fasttrackfoundations.com/method.html, Mar. 6, 2001.

Fast Track Foundation Systems, http://www.fasttrackfoundations.com, Aug. 29, 2000.

Anchorpanel Panel Shelter System, http://fasttrackfoundations.com/tornado.html, Mar. 6, 2001.

Anchorpanel Custom and Spec Homes, http://fasttrackfoundations.com/custom.html, Mar. 6, 2001.

Anchorpanel Retrofit Foundations, http://fasttrackfoundations.com/retrofit.html, Mar. 6, 2001.

Anchorpanel Perimeter Foundations, http://www.fasttrackfoundations.com/manuf.html, Oct. 2, 2000.

\* cited by examiner

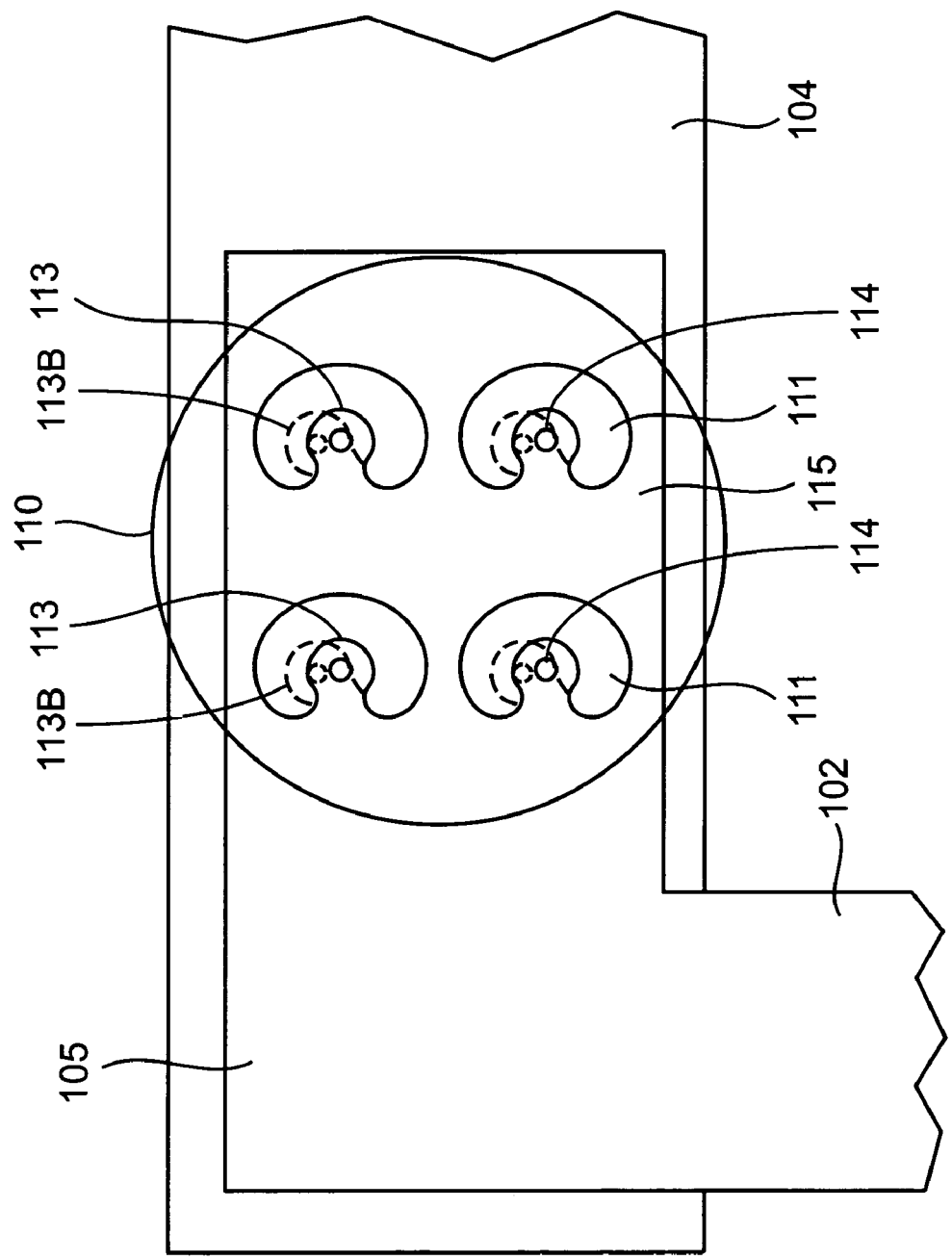

FORCE-RESISTING DEVICES AND METHODS FOR STRUCTURES

FIELD OF THE DISCLOSURE

The present application is a continuation-in-part application of U.S. patent application Ser. No. 10/074,684 filed Feb. 11, 2002 now U.S. Pat. No. 7,043,879. The present application also claims priority under 35 U.S.C. §119(e) to U.S. Provisional Application No. 60/601,186 filed Aug. 13, 2004. The contents of all of the above-cited applications are incorporated herein by reference.

The present disclosure relates to devices and methods for transmitting forces and dissipating and absorbing energy across discontinuous structural elements. More particularly, the present disclosure relates to a force-resisting device for transmitting forces and dissipating and absorbing energy. The device includes at least one active element; the active element configured to effect the transmission, dissipation, and absorption functions by means of controlled deformation. In addition, the present disclosure relates generally to structures used in buildings, and in particular to structures used to reinforce building walls and portal openings, such as doors and windows.

STATE OF THE ART

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention Building structures must be designed to safely withstand forces that may be applied thereto. As construction techniques improve, buildings are more capable of resisting loads that are applied thereto. Examples of loads that may be applied to buildings are those that result from earthquakes and windstorms. These forces may resolve within a structure as tension, compression, shear, torsion, or bending forces. Of the forces produced by such events on a building, horizontal (or shear) loads are significant. These horizontal forces attempt to shear (slide) the building off its foundation. Additionally, horizontal forces that develop in an upper story of a multiple story structure are transmitted to the lowest story primarily as in-plane shear loads on the lower story walls. In conjunction with shear forces, "uplift" or "overturning" forces also result on the structure. These uplift/overturning forces, generated in reaction to the moment of the shear force, attempt to lift and rotate the walls of the structure about a lower corner of the wall. In fabricating the structure, the structure must be designed with sufficient "shear resistance" so that the structure does not sustain excessive non-structural and/or structural damage or collapse due to applied forces, potentially resulting in extensive economic cost, serious injury or loss of life. Shear resistance can be further defined as the ability of a structure to absorb, dissipate, and transfer forces.

To address the need to build a structure having sufficient strength, uniform building codes ("UBC's") provide required building practices wherein the prescribed goal is life safety, but not necessarily to retain the building as habitable after a natural disaster. Damage caused by forces resulting from seismic and hurricane events has exposed the need for improved force-resisting structures and/or structural elements for both new building structures and for retrofit into existing building structures. Currently, building codes are overseen and administered by the International Code Council (ICC), which is a group founded in 1994 by the consolidation of Building Officials and Code Administrators International, Inc. (BOCA), International Conference of Building Officials (ICBO), and Southern Building Code Congress International, Inc. (SBCCI). The International Building Codes (IBC) are updated every 3 years, the latest being 2003 IBC. ICC also adopts Supplements annually. An evaluation service is also offered to technically evaluate building products, components, methods, and materials and to report on products and systems with respect to the code requirements.

Prior to the creation of the UBC's, early buildings were constructed having little or no capability to resist shear forces, uplift from foundations, and other loads. Walls of the structure were generally constructed only of vertical frame members with horizontal planks nailed across them. Later improvements included the use of diagonal wood braces, or diagonal sub-planking in the walls, with either shingles or some other outer layer to exclude weather and provide a finished exterior. However, as understanding of building performance in earthquakes and hurricanes continues to improve, the necessity for better structural properties has become more apparent and is being mandated by the UBC.

In general construction, the most common way of producing a shear wall is to use plywood sheathing attached to a plurality of vertical 2×4 or 2×6 inch wooden or metal framing members. The plywood sheathing is attached to the framing members with closely spaced nails/screws on the edges of the plywood panel. The use of the plywood sheathing and specified fastening patterns that are incorporated into all modern building codes has proven to be a very successful method of producing a wall having shear resistance. Analysis of damage caused in recent earthquakes, such as the 1994 Northridge earthquake in California, illustrated that in some cases, buildings built to the standards specified in the California UBC survived rather well. However, there were a substantial number of structural failures generally associated with openings formed in shear walls and stress concentrations on steel-frame building connections. Although, a building may remain standing after an earthquake, it still may be rendered uninhabitable due to non-structural and/or structural damage.

Problems caused by openings are twofold: stiffness reduction and stress concentrations. First, openings dramatically reduce the shear stiffness of the wall. For example, even comparatively small window openings will reduce the shear stiffness sufficiently that the wall can no longer be considered a continuous shear wall, thereby increasing the effective aspect ratio of the wall, wherein the aspect ratio is defined as the ratio of the height of the wall H to the width of the wall W. When the aspect ratio of the wall is increased, the overturning forces on the wall for the constant overturning moment (where the moment is determined by story height and shear force only) become higher and more localized.

Referring now to FIG. 1, there is illustrated an exemplary embodiment of an isolated shear wall 10 illustrating the balance of forces applied thereto. The force F is the shear force carried by the shear wall at the top edge due to a loading event such as an earthquake. The force must be reacted in shear at the foundation, shown by the opposing force F at the bottom. The moment of F relative to the foundation, equal to F multiplied by the story height H, must be reacted by foundation vertical or overturning forces A1, A2 (shown as discrete, but may be distributed near the corners). The force A2 is particularly troublesome, as it is tensile against the foundation, and is equal to (H/W)×F. In a case where there are adjacent additional structures, some of the overturning moment may be carried by shear on the sides of the shear wall 10, but eventually the entire overturning moment must be reacted at the foundation by vertical forces, and those forces are proportional to the panel aspect ratio H/W.

Referring now to FIG. 2A, there is shown an exemplary embodiment of a shear wall 10 wherein an opening O has been formed within the shear wall. As shown in FIG. 2A, the opening creates a discontinuity in the force transmitting characteristics of the shear wall, wherein forces that are normally carried across the entire wall width W now must be carried across the reduced width W'. The reduced width is less stiff and less strong, and the opening corners also introduce panel stress concentrations that did not previously exist. The corners A tend to crack open, and the corners B tend to crush and buckle closed, under the direction of force F' shown, as FIG. 2B shows. Therefore, the load carrying stiffness and overall strength of this shear wall is substantially reduced. In addition, if adjacent structures exist, they will be caused to carry more forces because this panel is less stiff and as a result takes up a smaller proportion of the forces.

The construction industry is increasing its focus on the survivability of buildings under extreme loads from seismic events and other forces, and modern codes are increasingly focusing on the ability of the components of the buildings to resist the loads of earthquakes, while not only withstanding and transmitting the loads, but also absorbing and dissipating such loads.

To address the weakness created in shear walls due to openings formed therein, there have been recent changes in the UBC. The recent changes to the UBC have halved the maximum aspect ratio of shear walls and shear wall segments so that the minimum width of an 8 ft high shear wall has been increased from 2 ft. to 4 ft, for a maximum aspect ratio of two.

Another problematic variable in the construction of a building is the variations in construction quality, foundation quality, and soil variability. Following the 1994 Northridge earthquake, it was discovered that a large percentage of building failures occurred as a result of poor field construction practice. One study indicated that one third of the seismic safety items installed were missing and/or improperly installed or poorly implemented in over 40% of the structures surveyed.

Further still, it is important that structural elements within the building structure have generally similar strength and stiffness properties in order to share the applied loads. If every structural element does not work together, this may lead to excessive damage or failure of a structural element due to force over-loading of the structural element, as opposed to load sharing. There may be locations within a building structure wherein walls having different stiffness/strength are joined together. For example, a structure may be built with a concrete retaining wall, wherein timber-framed shear walls may be joined to the poured concrete retaining wall. Many times, during seismic events the connection point of the two walls having different stiffness will separate due to the difference in stiffness of the walls in relation to the movement of the wall in response to the seismic event. In addition, irregular placement of structural elements with varying stiffness/strength characteristics can result in twisting of the structure leading to additional torsional stresses and other stress amplifications. Thus, there is a need for a device that will transmit forces and dissipate and absorb energy across discontinuous structural elements.

In addition to that above, another aspect to be considered is the manner in which the UBC is interpreted by local building inspectors. Often, building inspectors will make highly restrictive interpretations of the building codes in an effort to promote increased safety in building practices.

There have been numerous attempts to address increasing the shear resistance of a structure where the structure includes a number of discontinuities/openings formed in shear wall(s). One of the most common methods of addressing the need to increase the shear resistance of a structure has been to include a moment frame in the design of the structure, whereby steel beams are rigidly connected together such that any force applied to the structure will be carried through the moment frame. A moment frame is typically embodied as a large heavy steel structure designed to transmit shear forces of the structure into the foundation or into special footings formed in the foundation, via bending (or moment) resistance of large steel members. However, a moment frame must be specifically engineered for each application, thus adding significant cost and complexity to the structure. In residential construction, even a modest opening in a shear wall can require 6" or 8" steel girders weighing hundreds of pounds and the attendant foundation reinforcement required to absorb the loads transmitted thereto by the moment frame. The architect/builder must also account for shipping and handling costs associated with the installation of these heavy steel beams on the building site. Further still, the use of a moment frame causes significant problems with the insulating properties of the building, as the metal beams act to conduct heat through the walls of the structure to the interior of the structure, thus causing degradation of insulation properties.

Although moment frames appear to be a solution, albeit inefficient, to increase the shear resistance of a structure, there are still shortcomings of the popular field welded-field bolted beam-to-column moment frame connection. Observation of damage sustained in buildings during the 1994 Northridge earthquake showed that, at many sites, brittle fractures occurred within the connections at very low levels of loading, even while the structure itself remained essentially elastic (Federal Emergency Management Administration Report 350). This type of connection is now not to be used in the construction of new seismic moment frames. For example, tests conducted by the Seismic Structural Design Associates, Inc. (SSDA) have shown large stress and strain gradients in moment frame joints/connections that exacerbate fracture. To address these large concentrations of stress in the corners, there has been much work attempting to improve the ability of the corners of a moment frame to resist loads. One such improvement to a corner connection is embodied in U.S. Pat. No. 6,237,303.

Another approach to structural reinforcement is to utilize a pre-built shear wall such as the Simpson StrongWall®. The StrongWall® is a pre-built shear wall that may be integrated into a building structure. The StrongWall®D is constructed of standard framing materials and metal connectors. Preferably, two such StrongWalls® are used, with a StrongWall® positioned on either side of the portal opening. A header beam is connected to the top ends of these two StrongWalls®.

Unfortunately, the Simpson StrongWall® system has a number of disadvantages, including the fact that it must resist strong overturning moments due to its high height to width ratio. In addition, the StrongWall® system requires a variety of connectors and it incorporates a number of internal reinforcements, making it a complex and bulky system. The StrongWall® further includes a plurality of devices configured to anchor the StrongWall® to a building foundation. The StrongWall® is be connected to the framing of the structure as well as to the foundation. Because the StrongWall® must be connected to the structure's foundation, this requires special work on the foundation prior to installation, thus rendering retrofit application of the StrongWall® not cost effective. In addition, the StrongWall® is delivered to a job site as a pre-built panel, thus the architect/builder must account for shipping and handling costs associated with the installation of these heavy panels on the building site.

Shortcomings of both moment frames and StrongWalls® are that both devices do not attempt to match the shear stiffness and strength characteristics of the surrounding structure. Instead, each device is designed without regard for the structure it will be used within, and is generally designed to carry the entire shear load of a wall or wall segment. As described above, a moment frame is typically constructed of steel beams, wherein the beams are rigidly connected together such that any force applied to the structure will be carried through the moment frame and into the foundation. The StrongWall® is designed in a similar manner, wherein the StrongWall® attempts to be stronger than the surrounding structure. Moment frames and larger StrongWalls®, due to their size and weight, can be difficult to move around the job site and install without the use of costly heavy equipment. Both the moment frame and the StrongWall® significantly increase the overall cost of the structure. Therefore there is a need for a lightweight device that may be installed within or about openings of a structure to maintain the properties of that structure as a generally continuous element.

A typical reinforced brace frame is also made by Hardy Industries of Ventura Calif. The Hardy Frame® is a metal frame equivalent of the Simpson Strong Wall® factory-build wooden shear wall. The Hardy Frame® specifically includes a diagonal member with spaced vertical support members to provide increased resistance against simultaneous shear stress and uplifting. Other variations use solid sheet metal.

While the devices described above may be readily utilized in new construction there is still a need for devices that may be utilized during structural retrofits, seismic or hurricane upgrades, and/or remodels. For example, a homeowner may cut an opening in a shear wall to place a new window or doorway. Many times, these home retrofits are done without any consideration to shear strength of the wall or obtaining a permit. Thus, when the homeowner wishes to sell their house that includes these "improvements", many times their homes will not meet code and cannot be sold as is. As will be explained, the present invention is capable of simultaneously performing all, or some, of the functions required by the present codes, but also the energy dissipation required for better building survival, as projected in proposed codes currently under development, such as AC215. The disclosure in AC215, particularly of performance criteria for shearwalls and segments of shearwalls under seismic and hurricane forces, is incorporated by reference herein in its entirety.

What is therefore needed is a device that can be readily adapted to retrofits to maintain the properties of the structure as a generally continuous element after an opening has been formed in the shear wall. There is also a need for an easily manufactured, lighter, less complicated, more versatile, adjustable, easier to install device for new construction.

SUMMARY

The purpose of the present invention is to provide devices and methods for structurally reinforcing a building element such as a shear wall, while eliminating the high cost, complexity, weight and handling problems of the prior art, while further allowing a builder and/or architect to consider the entire wall as a generally continuous shear wall, and to allow a structure to be designed without having to consider any of the discontinuity problems previously described. A further purpose is to eliminate the need to repeatedly engineer solutions specific to particular shear-resisting elements, openings and discontinuities in specific buildings, and to allow the safe installation of windows and doors in existing buildings without the need for extensive design, structural reinforcement or engineered modifications.

To accomplish these purposes there is provided a force-resisting device for transmitting forces and dissipating and absorbing energy across a discontinuous structural element of a structure.

Exemplary embodiments of a force resisting device for transmitting forces and dissipating and absorbing energy in a shear wall or shear wall segment comprises at least one active element, the active element having a force versus deflection property under at least one cyclic load such that the shear wall or shear wall segment has at least one building code compliant parameter, the parameter selected from the group consisting of an equivalent response coefficient, R, a system overstrength coefficient, W, and a deflection amplification factor, C. Exemplary embodiments of prefabricated shear walls or shear wall segments comprise the disclosed force resisting device. Exemplary embodiments of buildings include the disclosed prefabricated shear wall or shear wall segment with comprising the disclosed force resisting device.

Other exemplary embodiments of the device include at least one active element, the active element having defined force versus deflection properties, wherein the active element is configured to provide a load path across a discontinuous structural element.

In one embodiment there is provided another force-resisting device for transmitting forces and dissipating and absorbing energy across a discontinuous structural element of a structure, the device including at least one active element having at least a first end and a second end, the active element having defined force versus deflection properties and configured to transmit force and dissipate and absorb energy, wherein the first end of the active element is configured to be connected to a structure; and at least one frame element disposed about a discontinuous structural element, wherein the frame element is configured to be connected to the second end of the active element, the active element and the frame element configured to resist forces and reduce stresses and replace stiffness, dissipation, and strength to the structure.

In a further embodiment there is provided yet another force-resisting device for transmitting forces and dissipating and absorbing energy across a discontinuous structural element of a structure, the device including at least one active element having at least a first end and a second end, the active element having defined force versus deflection properties and configured to transmit force and dissipate and absorb energy, wherein the first end of the active element is configured to be connected to a structure. The force-resisting device further includes at least one frame element configured to be connected to a discontinuous structural element, the frame element is configured to be connected to the second end of the active element, wherein the active element and the frame element configured to resist forces applied to the structure by transmitting forces across the discontinuous structural element.

In a further embodiment there is provided yet another force-resisting device for transmitting forces and dissipating and absorbing energy across a discontinuous structural element of a structure, the device including at least one active element having at least a first end and a second end, the active element having defined force versus deflection properties and configured to transmit force and dissipate and absorb energy, wherein the first end of the active element is configured to be connected to a structure, and at least one reinforcement element, the reinforcement element configured to be connected to a structure. The force-resisting device further includes at least one frame element configured to be disposed about a discontinuous structural element, wherein the frame element is configured to be connected to the second end of the active element, the active element, the frame element, and the reinforcement element configured to resist forces applied to the structure by transmitting forces across the discontinuous structural element and further configured to reduce stresses and replace stiffness, dissipation, and strength to the structure.

In still another embodiment there is provided a method of restoring the stiffness, energy dissipation capacity, and strength of a structure containing a discontinuous structural element, the method including the step of: transmitting forces across the discontinuous structural element, thereby providing load sharing across the discontinuity.

In a further embodiment there is provided a method for selecting a force-resisting device, the device configured to transmit loads and to dissipate and absorb energy, the method including the steps of; selecting a structural element to be reinforced; selecting a design configuration of a force-resisting device containing at least one active element; selecting a design configuration for the active element; building a computer generated finite element model of the force-resisting device with at least one degree of freedom for transmitting force and dissipating and absorbing energy; and using the computer generated finite element model in a finite element analysis program to iterate the design of the active element to produce defined force versus deflection properties.

In some embodiments, a structure comprises: at least two structural members; a joining element connected to the at least two structural members; and at least one active element within the joining element, or between the joining element and at least one of the structural members, wherein a force applied to one structural member passes at least partially through the active element and into the other structural member, the active element being configured such that the structure exhibits a prescribed load-deflection relationship when a force is applied thereto. In preferred aspects, the active element is designed (i.e. configured) by performing finite element analysis or iterative calculations.

In other embodiments, the disclosed device is incorporated into a building such that the entire building structure exhibits a desired load-deflection relationship when a force is applied to the building. Thus, by selectively configuring the active element, the present invention may advantageously be used to "tune" the overall structure of the building to optimally absorb, transmit and dissipate energy (including energy from seismic loading). As will be shown, this may be accomplished whether the building is subjected to shear forces alone, or to shear and bending forces together.

Further and in some embodiments, the joining element of the structure further comprises a connector that is configured to connect at least one of the structural members to an external body such as a fixed wall base or a ground plane member in any story of a building. In preferred aspects, the connector is configured such that it does not transmit substantial bending moments to the external body in the plane in which the structural members are disposed. As understood herein, a "fixed wall base" may be any structural foundation supporting a wall. As also understood herein, a "ground plane member in any story of a building" may be any floor or foundation member in any story of a building. In optional preferred aspects, the connector may comprise a pivot or a live hinge.

In optional aspects, one of the structural members may be incorporated into the joining element itself. Moreover, in various preferred aspects, the active element may be integrally formed into the joining element itself.

In some embodiments, the structural members and the joining element are stiff enough to cause deformation or deflection of the active elements. In this way, the active elements are effectively part of the overall structure, and are thus part of the load path of the structure.

The disclosed devices can be configured to be disposed within a wall (including a load bearing wall) so as to reinforce the wall. In this case, the active element is configured such that the wall exhibits a desired load-deflection relationship when a force is applied to the wall.

In some preferred embodiments, the device is configured to be disposed adjacent to a portal opening in a building so as to reinforce the portal opening. In this case, the active element is configured such that structural members adjacent to the portal opening exhibit desired load-deflection relationships when a force is applied to the structural members adjacent to the portal opening. As understood herein, a structural member being "adjacent to" the portal opening includes a structural member at or near the portal opening, including a structural member disposed about the perimeter or at the edges of the portal opening. In optional preferred aspects, the portal opening may be a door, a garage door, a window or a security panel.

In some embodiments, the active element is preferably configured to transmit, absorb and dissipate energy due to the active element exhibiting a prescribed force/deflection relationship when subject to cyclic motion. In specific preferred aspects, the active element is configured to react to bending moments between the first and second structural members so as to reduce the effects of the bending moment in the plane in which both the first and second structural members are disposed. As will be explained, this is preferably accomplished by reducing the effective length of the bending moment arm of the vertical structural member.

In some embodiments, the unwanted effects of the bending moment are reduced in the plane in which the first and second structural members are disposed, but are not reduced in a plane other than the plane in which the effects of the bending moment are reduced (e.g.: a plane perpendicular to the plane in which the first and second structural members are disposed). This is preferably accomplished by allowing relative movement between the structural members in only one plane. Most preferably, such relative movement is only permitted in the plane in which the structural members are disposed (or a plane parallel thereto). For example, the plane in which relative movement between the structural members is permitted preferably corresponds to the plane of a wall or portal opening in (or around which) the structural members are disposed.

As such, the plane in which the unwanted effects of the bending moment are reduced may variously be the plane of a wall when both structural members are disposed within or on the wall; the plane of a portal opening when both structural members are disposed in the plane of the portal opening; or a vertical plane in which a foundation post and a section of a rim joist are disposed. In preferred aspects, the active element flexes when a force passes therethrough. The degree to which the active element flexes may preferably vary along a length of the active element. In preferred aspects, the load-deflection relationship of the active element is nonlinear, such that the load-deflection relationship of the overall structure is nonlinear. Moreover, in preferred aspects, the load-deflection relationship of the active element in the structure changes the deflection, velocity or acceleration level of the structure in a prescribed manner in response to an applied load.

In some embodiments, the active element is configured to provide stiffness and energy dissipation by transmitting a force through the structure in a prescribed way. In further optional aspects, such stiffness and energy dissipation may further be effected passively or controlled mechanically or electrically.

In one embodiments, the active element is configured such that the first and second structural members rotate relative to each other about an axis that is displaced from the locus of the joint formed between the first and second structural members. Accordingly, stresses between the first and second structural members do not concentrate at the locus of the joint.

In another embodiments, a pivot may be provided on the joining element such that the axis of rotation of the structural members passes through the pivot. In this aspect, the active element is configured to transmit forces therethrough such that the full stresses between the first and second structural members do not concentrate at the locus of the joint, but are instead shared by the active element.

In optional embodiments, a load bearing element that at least partially supports the weight of one of the two structural members is included. Such optional load bearing element ensures that the weight of the one of the two structural members is not fully supported by the active element itself. The load bearing element may optionally comprise a cable or pivot connecting the joining element to one of the structural members.

In some embodiments, the first structural member is generally vertical. In preferred aspects, the first structural member may include (but is not limited to): a post or a structural member attached to a post; a column, or a structural member attached to a column; a beam, or a structural member attached to a beam; a wall stud, or a structural member attached to a wall stud. Optionally, the first structural member may be intermediate load bearing posts in the wall that are isolated from the wall via vertically extending apertures in the wall.

In some embodiments, the second structural member is generally horizontal. In preferred aspects, the second structural member may include (but is not limited to): a beam, or a structural member attached to a beam; a wall horizontal plate, or a structural member attached to a wall horizontal plate; a wall sill plate, or a structural member attached to a wall sill plate; a wall header, or a structural member attached to a wall header; a building perimeter frame, or a structural member attached to a building perimeter frame; a rim joist system, or a structural member attached to a rim joist system.

The active elements may take a variety of forms. In one exemplary embodiment, the active element comprises a member having a plurality of cut-out sections therein. In this embodiment, the first structural member may be connected to a first portion of the active element and the second structural member may be connected to a second portion of the active element, wherein the cut-out sections permit the first and second portions of the active element to move with respect to one another when the active element flexes. The active element may be configured to first deform elastically and then plastically, or to deform plastically and then elastically.

In an alternate embodiment, the active element comprises a bendable folded length or channel of material. Preferably, the bendable material is metal. In one preferred embodiment, the bendable folded channel of material is dimensioned to flex such that a fold therein spreads apart at one end and is compressed together at an opposite end, permitting the first and second portions of the joining element to rotate relative to one another. In particular embodiments, this active element may optionally comprise a hollow rectangular or channel shaped element having a plurality of slots disposed therealong. For example, the active element may optionally comprise a slotted metal wall stud. In another particular embodiment, the active element comprises a hollow cylinder configured to transmit larger forces (by resisting relative movement) in a direction along the axis of the cylinder, while transmitting much smaller forces (by permitting relative movement) in a direction normal to the axis of the cylinder. Other element configurations that similarly have high stiffness in selected directions and low stiffness in other selected directions are usable.

BRIEF DESCRIPTION OF THE DRAWING FIGURES

The following detailed description of preferred embodiments can be read in connection with the accompanying drawings in which like numerals designate like elements and in which:

FIG. 17 is a close-up view of the active element of FIG. 14, showing deflection of the active element from a first position to a second position.

DETAILED DESCRIPTION

Definitions

As used herein the following terms are to be understood to be defined as described below.

"Load sharing" shall be understood to define the carrying of a total load by some division among more than one load-bearing element. For example, parallel load bearing elements carry load in proportion to their stiffness, while series load bearing elements carry full load (i.e., do not share load).

"Transmit" shall be understood to define the capacity of an element to withstand applied forces and to react them from one location to another, according to the laws of mechanics, specifically force equilibrium. Transmission of forces of an element within a system always depends on its geometric configuration and its strength capacity relative to the force magnitude to be transmitted, and in some instances on its stiffness.

"Load path" shall be understood to define a route for load to be transmitted.

"Dissipation" shall be understood to define a process of conversion of energy from an undesirable motion form permanently and irreversibly to a benign form, which as one example involves converting mechanical work energy (force acting over a distance) into plastic strain energy of a material, and subsequently heat energy. Dissipation is effected by mechanical damping and plasticity, and can be used to reduce maximum deflection of structures subjected to external forces.

"Absorption" shall be understood to define a process of conversion of energy from an undesirable motion form reversibly and temporarily to a benign form, which as one example involves converting mechanical work energy (force acting over a distance) into elastic strain energy of a material, which can be later restored. Such absorption is effected by mechanical stiffness or springs, and can be used to reduce maximum deflection of structures subjected to external forces.

"Force resisting" shall be understood to define the ability of a device to transmit structural forces, to dissipate energy by some means, and to absorb energy by some means, in some absolute magnitude and relative proportion.

Figure 42:
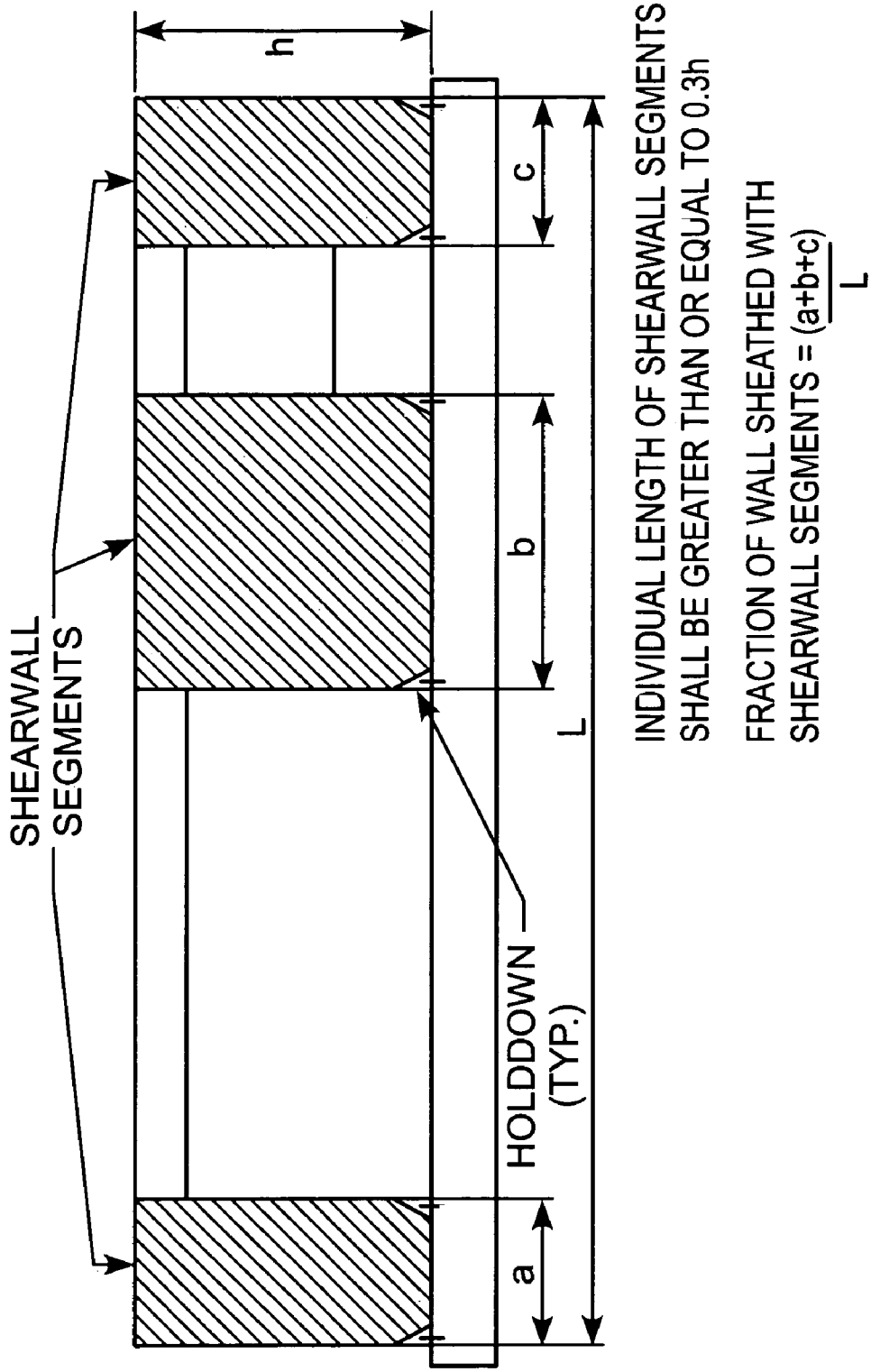
FIG. 42 is a side elevation view of a typical shear wall sheathed with full height sheathing (Type I Wall).
Figure 43:
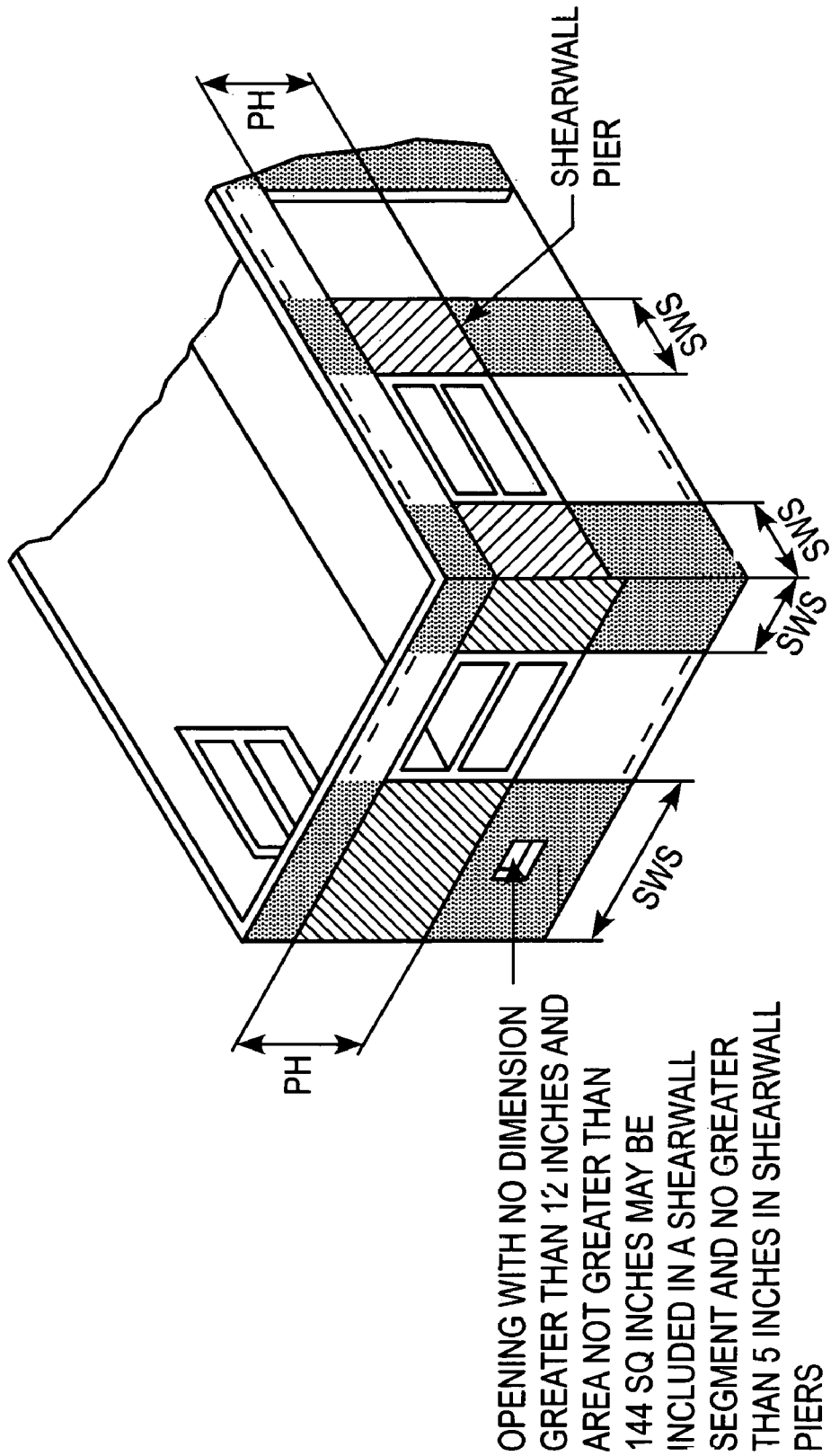
FIG. 43 is an isometric view of a typical structure with portals such as window and door openings showing the arrangement of shear wall segments and shear wall piers.

"Shear wall" shall be understood to define, in generally, a structure capable of resisting shear forces, the shear wall being constructed of framing members having a sheathing material disposed thereon. The framing members may be constructed of wood, metal or similar materials. In particular, shear wall includes a wall or portion of a wall used to resist horizontal forces parallel to the wall or portion of the wall (e.g., in-plane shear). See FIGS. 42 and 43.

"Shear wall segment" shall be understood to define, in general, a portion of a shearwall adjacent to and equal in height to the opening with the shortest height on either side of the shear wall segment. See FIGS. 42 and 43.

"Active element" shall be understood to define a load-bearing element with defined load versus deflection properties that may be designed by engineering analysis in one or more directions or degrees of freedom. The active element is a device configured to deflect or distort in a controlled manner under load.

"Finite element analysis" shall be understood to include the use of a computer model based on the finite element mathematical method to predict reaction forces, deformations, stresses, and strains of a structure in response to applied forces or enforced displacements.

"Discontinuous structural element" is herein defined as any load bearing structure or portion of load bearing structure that has some feature within it that makes the structure's force transmitting, stiffness (absorbing), dissipating, absorbing, or strength characteristics non-uniform, and results in a change of load sharing within the structure, influences the proportion of load shared by the structure relative to adjacent structures, or causes stress concentrations in the structure. Examples of features that cause discontinuous structural elements are door and window openings, localized overly stiffened structural elements, coupled structural elements with different stiffness properties, asymmetrical building configurations, locations in a structure where relative movement of adjacent parts may occur during a loading event, or other similar features.

"Generally continuous shear wall" shall be defined as a shear wall that behaves substantially the same as a continuous shear wall at its edges, i.e. load versus deflection, stiffness, and dissipation characteristics are similar, despite the presence of discontinuities within it.

"Drift" shall be understood to define the amount of deflection or movement of a shear wall or structural element due to a load applied thereto.

"Retrofit" shall be understood to include remodeling, reconstruction, structural upgrading, strengthening, fabrication of shear walls, or similar constructions processes.

The present invention provides devices and methods for maintaining the strength, stiffness (absorption), and dissipation properties of a structure, wherein said properties have been lost or reduced due to an opening or other discontinuity formed within the structure. In the case of an opening, the force-resisting device of the invention transmits the forces and dissipates and absorbs energy at the edge of the opening in such a manner that the exterior edges of the structure into which the opening is cut behave under shear load substantially as if there were no opening formed in the structure. As utilized herein, it shall be understood that the term structure is intended to refer to the entire building structure or to a portion of the entire building structure, such as a shear wall.

In contrast, to the disclosed active elements and its uses, devices that are too stiff can have undesirable failure characteristics. For example, a typical metal shear panel is very stiff and exhibits elastic deformation almost to the point of failure. In such a typical device, there is no (or very little) energy absorption and an ultimate undesirable failure mode. In fact, most conventional thin steel structures have such problems—linear until catastrophic buckling failure.

The device in accordance with one exemplary embodiment includes a lightweight force transmitting and energy dissipating and absorbing force-resisting device that may be disposed about an opening formed in a shear wall. The force-resisting device contains active elements that have defined force versus deflection properties, which may be designed by engineering analysis, such that the forces developed about the opening due to shear on the wall are transmitted around the opening. By designing the proper force-resisting device and active elements, the stress concentrations at the periphery of the opening are mitigated so that the strength of the structure is substantially the same as if an opening had not been formed within the wall, thereby enabling a shear wall having an opening formed therein to behave as a generally continuous shear wall.

Figure 1:
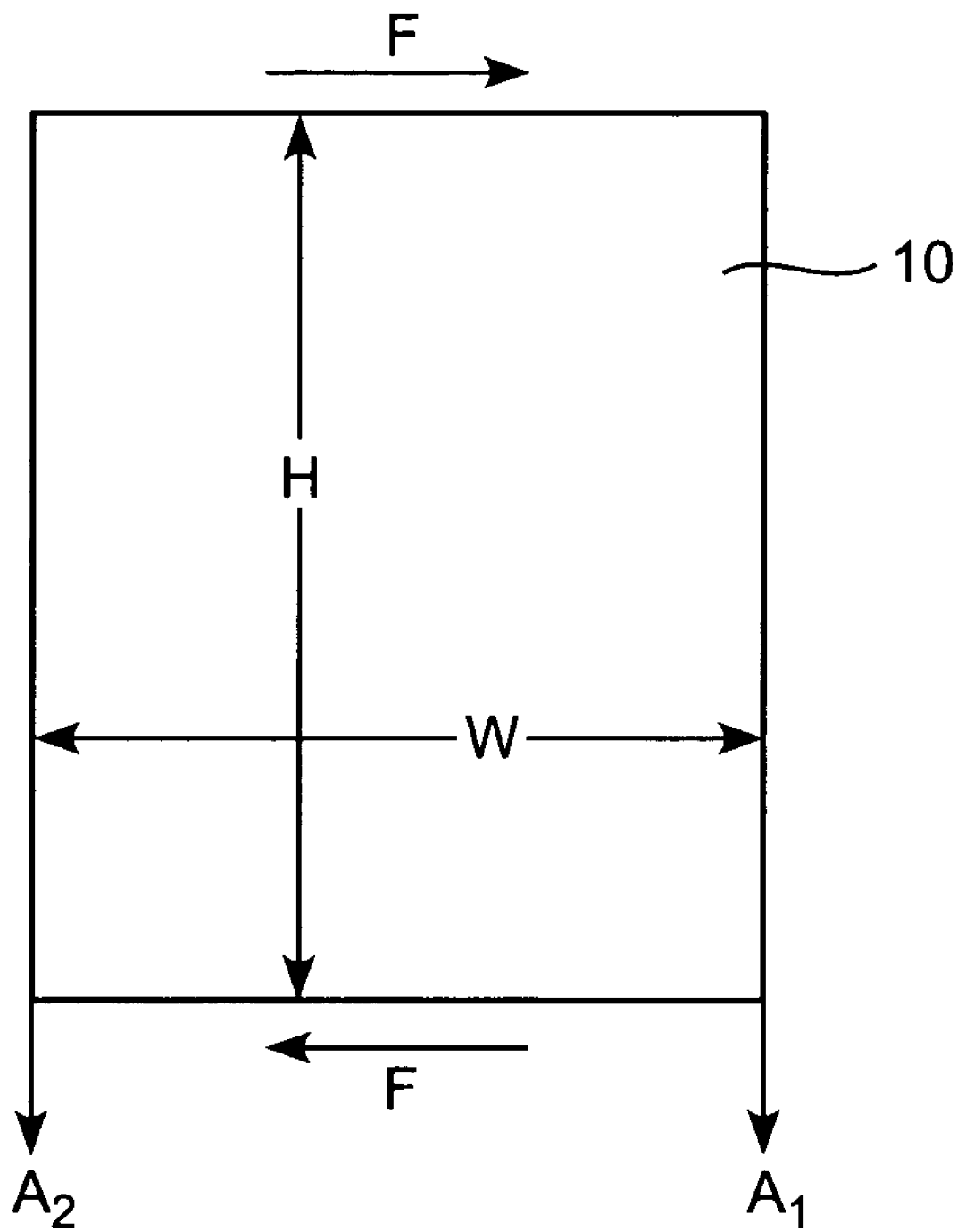
FIG. 1 is an elevational view of an exemplary shear wall illustrating the balance of forces applied thereto.
Figure 2A:
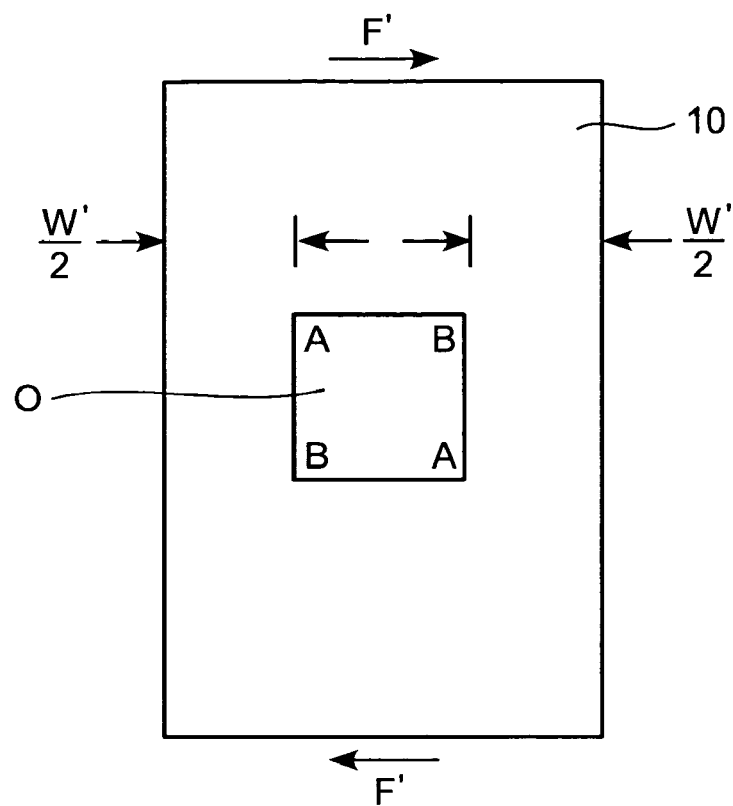
FIG. 2A is an elevational view of an exemplary shear wall including an opening formed therein illustrating the reduction of load bearing width.
Figure 2B:
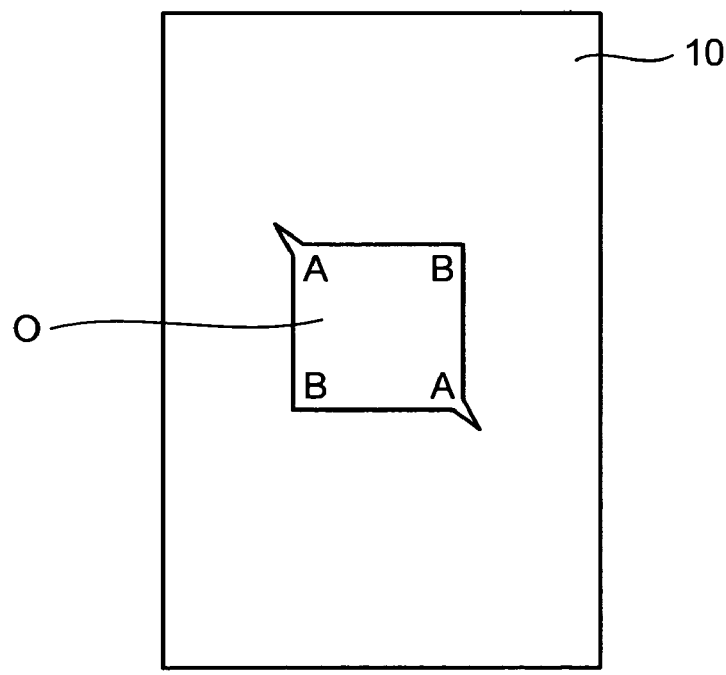
FIG. 2B is an elevational view of an exemplary shear wall including an opening formed therein illustrating the concentration of stresses in the corners of the opening.
Figure 3:
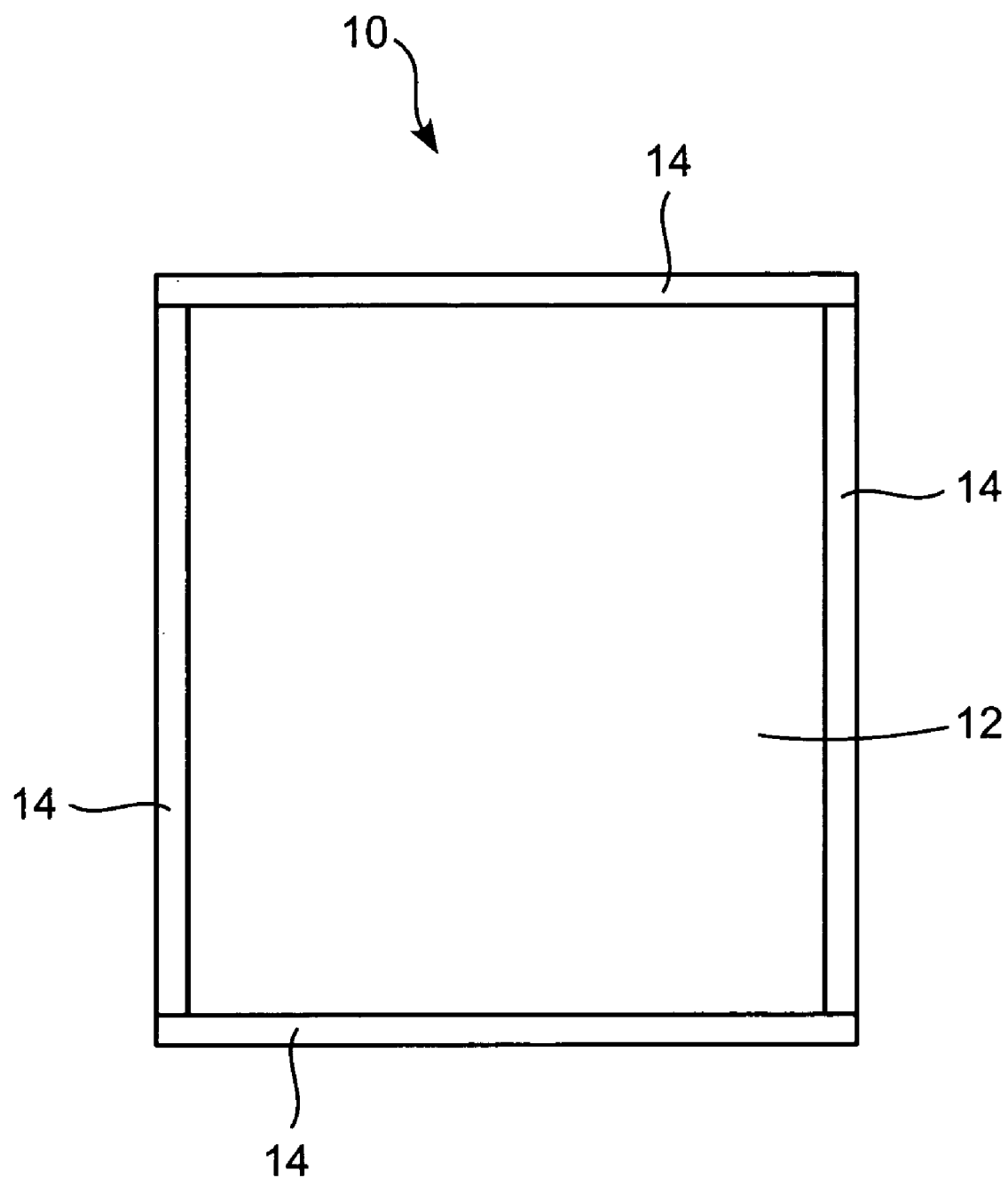
FIG. 3 is an elevational view of the backside of an exemplary shear wall illustrating the stud framing and sheathing attached thereto.

Referring now to FIG. 3, there is shown a shear wall 10. The shear wall 10 as shown FIG. 3 includes, a four-foot by eight-foot plywood sheathing panel 12, and a plurality of two inch by four-inch studs 14 disposed about the periphery of the panel. The shear wall 10 as shown in FIG. 3 mimics a typically constructed shear wall in a structure such as a private home. It shall be understood that the shear wall 10 illustrated in FIG. 3 shall be understood as being exemplary; the shear wall may be constructed of metal framing having a plywood panel disposed thereon. Furthermore, it is contemplated that other engineered materials may be utilized for both the framing elements as well as the sheathing material.

Figure 4A:
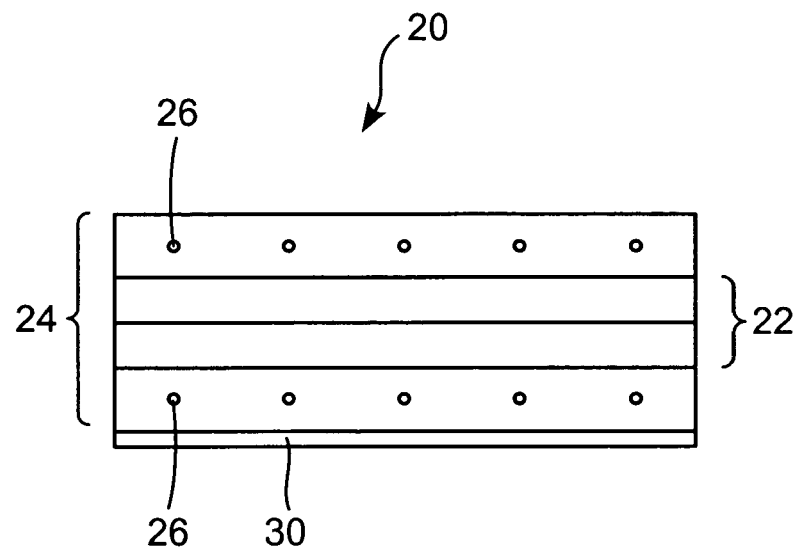
FIG. 4A is an elevational view of an exemplary embodiment of the force-resisting device in accordance with the present invention.

Referring now to FIG. 4A there is shown an exemplary embodiment of the force-resisting device 20 in accordance with the present invention. As shown in FIG. 4A, the force-resisting device 20 includes an active element 22 disposed within a force-resisting member 24. The force-resisting member 24 may further include a plurality of apertures 26 disposed adjacent to the active element 22, wherein the apertures are configured to receive connection means for connecting the active element to a structure. Still further, the force-resisting device may include a frame element 30, wherein the frame element 30 may be coupled to the force-resisting member 24. As shown in FIG. 4A, the active element has defined force versus deflection properties, wherein the active element is configured to provide a load path across a discontinuous structural element.

Figure 4B:
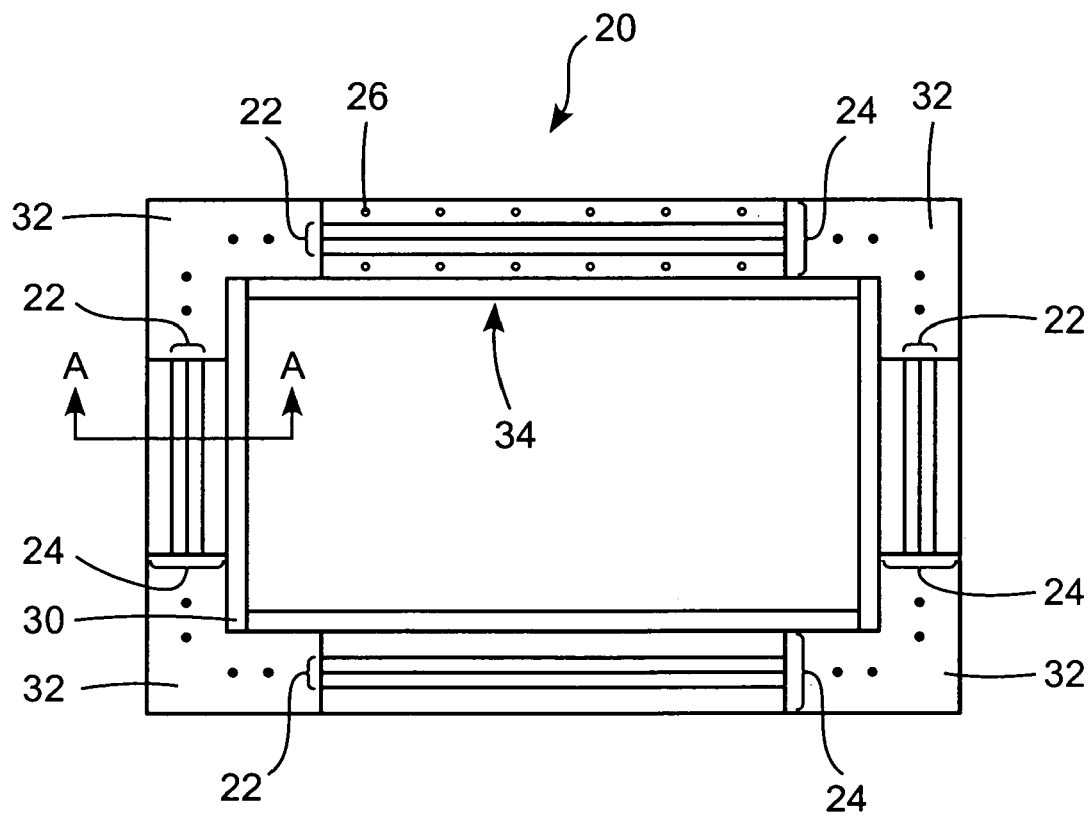
FIG. 4B is an elevational view of an exemplary embodiment of the force-resisting device according to the present invention.

Referring now to FIG. 4B, there is shown an alternative exemplary embodiment of the force-resisting device 20 in accordance with the present invention. As shown in FIG. 4B, the force-resisting device includes at least one active element 22; the active element disposed within a force-resisting member 24, at least one frame element 30, and at least one reinforcement element 32. As shown in FIG. 4B, the force-resisting device 20 is shown as being configured to be disposed about a discontinuous structure, such as an opening formed in a structure. It shall be understood that the reinforcement element 32 may be fixedly attached to the opening periphery utilizing suitable known means such as screws, bolts, glues, or nails. Additionally, the reinforcement element 32 may be fixedly connected to an end of the force-resisting members 24 through the use of fastening means such as those above.

Further still, it is contemplated that the reinforcement element 32 and the force-resisting member 24 may be formed as a unitary member. It is also contemplated that the reinforcement element 32 and the force-resisting member 24 may not be connected directly, but may be individually connected to the shear wall adjacent to the opening, or to some intermediate members, or to a mounting frame disposed about the periphery of the opening. The force-resisting device 20 as shown in FIG. 4B and described above is shown as being configured to be disposed about an opening, therefore the force-resisting device includes at least four force-resisting members 24 and at least four reinforcement elements 32. Additionally, as shown in FIG. 4B, the frame elements 30 are configured to be disposed about the periphery of the opening thereby forming a frame 34. The force-resisting members 24 and/or the reinforcement elements 32 are attached at one side, to the opening periphery either directly or indirectly, and at the other side to the frame 34 or a structure disposed about the opening, so that forces can be transmitted across the opening.

Frame elements 30 or frame 34 may be configured having a variety of structural properties. For example, the frame 34 or the frame elements 30 may be made sufficiently rigid such that any forces applied to the frame will be transmitted with little deflection. Alternatively, the frame 34 may be configured to be "soft" or flexible, thus, the frame 34 can be configured to function as an additional active element in conjunction with the other active element(s) embodied in the force-resisting device 20 in accordance with the present invention. It is further contemplated that the geometry of the frame 34 may be adjusted such that the frame 34 includes a plurality of active elements formed therein. For example, the frame may be constructed including multiple "active folds." It shall be understood that the reference to active folds above should not be considered limiting and that other geometries and embodiments of the active element as described herein may be embodied in the frame 34 or frame elements 30.

The frame 34 may be further configured to include mounting area(s) to receive and retain elements, such as windows and doors. The frame 34 may be configured to receive windows or doors in different manners. For example, the mounting area may include a soft and resilient interface to allow the force-resisting device, including window or doorframe, to flex as needed, and allow the window or door to float within the frame. Second, the mounting frame may be rigid, to keep deflections so low that the window or door is not loaded even if fixedly connected to the frame, while the active element(s) sustains all the deflection. Still further, these mounting areas can be used to provide accurate openings into which the doors and windows could be fitted without the conventional use of shims, thus cutting down installation time and adjustment and reducing the risk of distortion of window and door frames by improper installation or subsequent settling of the building. This aspect of the invention is especially valuable in the case of vinyl-framed doors and windows, which are comparatively soft, and easily distort. Incorporating a mounting frame within the force-resisting device 20 provides an additional benefit of reducing air gaps around the window or door openings that may lead to energy loss. Yet another benefit of forming a door or window frame within the force-resisting device 20 is that this not only provides the advantages previously mentioned, but also distributes any loads from attempted forced entry directly into the structure of the wall containing the opening, thus providing greatly enhanced security for openings, as opposed to conventional door/window frames, which are simply nailed into the rough framing of the building. An additional safety function is also introduced by providing a proper mounting for doors and windows, therefore the likelihood of a window shattering or a door becoming stuck or jammed due to forces applied during an earthquake is reduced because the device according to the present invention transmits force about the opening thereby reducing the amount of force applied to the windowpanes and/or door.

The function of the invention may be achieved with less hardware than shown in the exemplary embodiments of FIGS. 4A and 4B. It is contemplated that the force-resisting device according to the present invention may function with a single active element, provided the active element is attached at a first end to the opening periphery and at a second end to some structure that reacts the forces transmitted through the active element to some other location about the opening. For example, the device of FIG. 4B could be reduced to a single force-resisting member at the left side which is attached at one end to the left side of the opening and at the other end to an "L" shaped frame along the left and top of the opening, which is in turn rigidly fixed by some means to the opening periphery along the top. In this case, load is transmitted from the left side of the opening, through the active element, through the frame, to the top edge of the opening (not through a second active element). However, for best load distribution, stress control, and simplicity, symmetrical configurations using two opposing or all four opening sides of a rectangular opening (or configured similarly about a non-rectangular opening) are preferred.

The reinforcement element 32 and the force-resisting member 24 as shown in FIGS. 4A and 4B may be constructed of materials such as steel, stainless steel, aluminum, copper, brass, titanium, or other metals. It is further contemplated that the reinforcement element 32 and the force-resisting member 24 may be constructed of engineered composite materials such as fiberglass, carbon fiber, graphite, Spectra®, or similar composite materials. Still further, it is contemplated that the reinforcement element and the force-resisting member may be constructed of a combination of any of the materials listed above and other materials not listed. It shall be understood that the list of materials above is merely exemplary and should not be considered limiting in any manner; it is contemplated that other materials not listed may be utilized in the construction of the reinforcement element or the force-resisting member in accordance with the present invention.

Although the force-resisting device 20 is illustrated in FIG. 4B as being formed of multiple reinforcement elements and force-resisting members, which are then assembled, it is contemplated that the force-resisting device according to the present invention may be constructed as a unitary member. Furthermore, although the present invention has been illustrated as being disposed about a window opening formed within a shear wall, it is contemplated that the force-resisting device 20 according to the present invention may be utilized around any type of opening or structural discontinuity. For example, in a door or hallway opening where there is no remaining shear panel along the lower edge of the opening, loads may be transferred across the bottom of the opening through the use of a structural sill plate or by utilizing an existing sill plate, if the existing sill plate is capable of transmitting the applied loads. In some cases, with proper design of the side and top of the force-resisting device, it will also be feasible to eliminate the bottom element altogether. Further still, if the foundation has mechanical properties sufficient to carry the appropriate forces, the vertical elements of the force-resisting device 20 may be attached to the foundation. For instance, if a wood wall is connected to a concrete retaining wall, as might occur in side hill construction, earthquake forces concentrate at the point at which the flexible wood wall contacts the unyielding concrete wall. If an active element having the correct properties as described herein is installed between the wood wall and the concrete retaining wall, the wood wall is allowed to move and absorb energy while still being supported by the rigid concrete wall, but without the damaging concentration of energy. In such manner, the active element contributes to the survivability of the structure under seismic loads.

Figure 5:
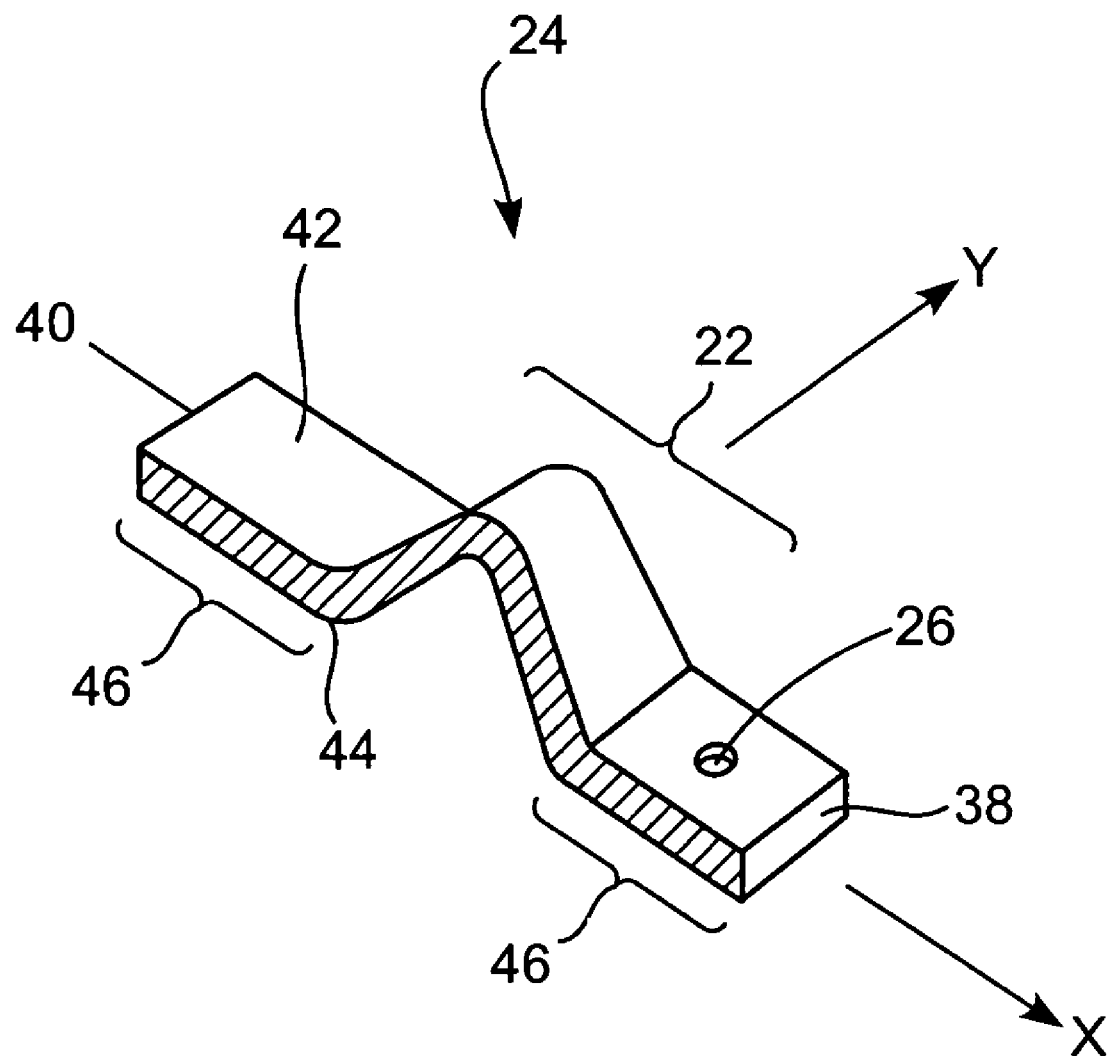
FIG. 5 is a sectional perspective view of an exemplary embodiment of a force-resisting member of the force-resisting device, taken about line A-A of FIG. 4B, which contains an active element according to the present invention.

Referring now to FIG. 5, there is shown a sectional perspective view of an exemplary embodiment of the force-resisting member 24 in accordance with the present invention. As shown in FIG. 5, force-resisting member 24 includes the active element 22 formed within an elongated member 36, the elongated member 36 having a first end 38, a second end 40, the active element 22 having defined force versus deflection properties in the X and Y directions, such that the active element is configured to provide load sharing across a discontinuous structural element. The active element 22 as shown in FIG. 5 is shown as being embodied as an "active fold" formed within the elongated member 36 and disposed between the first end 38 and the second end 40, and formed between the edges of the elongated member 36. As shown in FIG. 5, the first surface 42 and second surface 44 adjacent to either side of the active element 22 are substantially parallel to each other, but they need not be. Further still, it is contemplated that the force-resisting member 24 may further include apertures 26 disposed through the substantially horizontal portions 46 of the elongated member adjacent to the active element 22.

Although the active element is described and shown as being an "active fold" it is contemplated that other geometries and mechanical structures could be utilized. For example, the active element may comprise any one of the following devices individually or in any combination thereof. Examples of such active elements are: at least one cutout, a single slot, a plurality of slots (where in all cases the remaining material is the active element), a plurality of folds, a plurality of pins and engaging members (where the pins or engaging members deflect/distort), or an aperture having a web disposed thereacross (where the web deflects/distorts). It shall be further understood that the examples above are merely exemplary and should not be considered limiting in any manner. Any geometry and combination(s) of materials can be used for the active element that generates a useful force versus deflection property when loaded in one or more directions.

The active element 22 may be formed within the elongated member 36 utilizing known manufacturing processes such as pressing, bending, casting, cutting, or other methods suitable for the material used. The force-resisting member 24 and active element 22 in accordance with the present invention may be constructed of materials such as those listed above with regard to the reinforcement element 32, or combinations of more than one material. Under certain conditions, it may be desirable to further tune the force versus deflection properties of the active element 22. The force versus deflection properties of the active element 22 can be tuned by increasing/decreasing the height of the active element, providing multiple active elements within the elongated member 36, adjusting the geometry of the active element(s), varying the material thickness of the active element and/or of the elongated member 36, or other variations. For example, it may be desirable to provide more energy dissipation or absorption under greater earthquake forces that result in overall building deflections greater than the two inches required by the code. The active element 22 may produce force versus deflection properties under tension and compression in direction X and opposing senses of shear in direction Y as the building will sway back and forth under earthquake loads producing an oscillating response.

It shall be understood that the principle of the active element 22 may be incorporated into any other type of structural building connector wherein the connector is designed to transmit forces and dissipate/absorb energy. For example, at least one active element may be incorporated into building connectors adapted to attach two portions of a structure having dissimilar modulus or stiffness, such as a concrete wall to a timber framed structure. Alternatively, active element 22 may be embodied within a corner force-resisting device (not shown) on a shear wall. The corner force-resisting device may be connected to the framing members and the top or bottom plate of the shear wall. The corner force-resisting device may be designed so that as forces are imposed at a joint during a loading event, the corner force-resisting device transmits force and dissipates/absorbs energy via a defined force versus deflection property, which may be designed by engineering analysis. Depending on the structural location of the application in a building or structure, the force versus deflection property may be designed for differing absolute and relative levels of stiffness and dissipation. It shall be understood that the building connectors above are merely exemplary and should not be considered limiting in any manner; it is contemplated that other building connectors not listed may be utilized wherein the connector is designed to transmit forces and dissipate/absorb energy. Such benefits can be obtained at any location in a structure where relative movement of adjacent parts may occur during a loading event.

Figure 11:
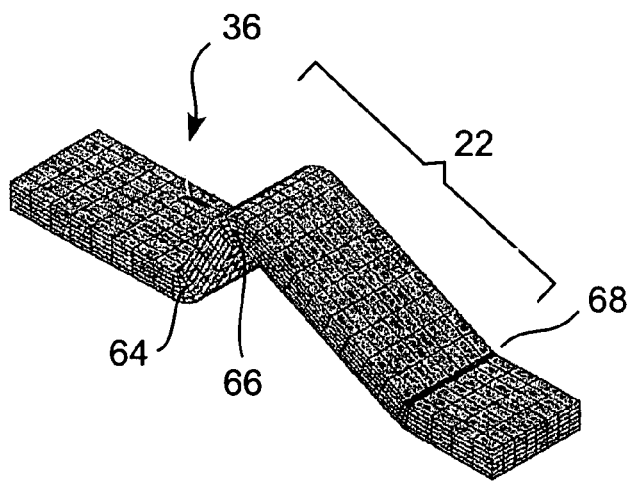
FIG. 11 is a sectional perspective view of a computer model of a portion of an exemplary embodiment of a force-resisting member of the force-resisting device, taken about line A-A of FIG. 4B, including an active element according to the present invention.
Figure 12:
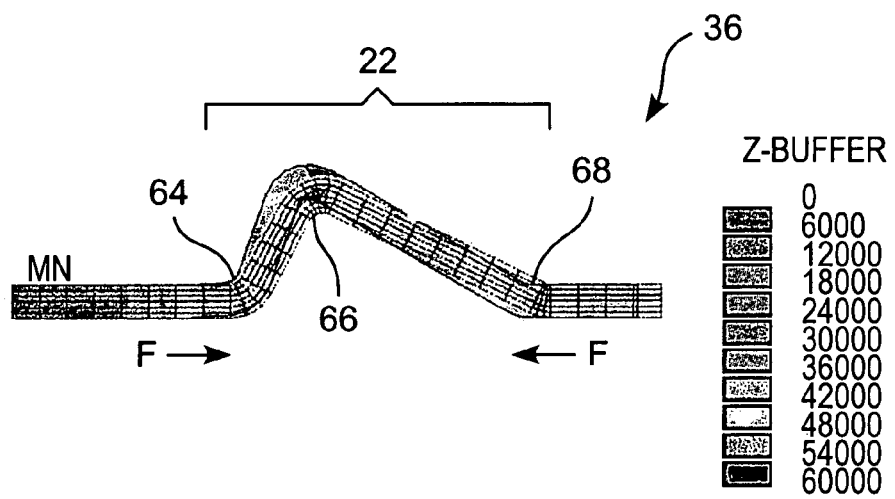
FIG. 12 is a true scale deformation and color coded stress display of a computer simulation of an exemplary embodiment of a force-resisting member of the force-resisting device including the active element undergoing progressively plastic compression due to an applied force.
Figure 13:
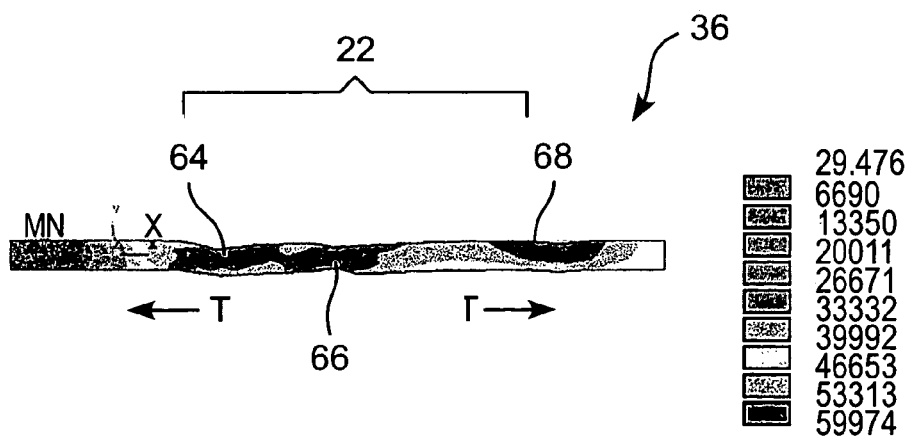
FIG. 13 is a true scale deformation and color-coded stress display of a computer simulation of an exemplary embodiment of a force-resisting member of the force-resisting device including the active element undergoing progressively plastic deformation in tension.

Referring now to FIGS. 6-9, there are shown computer models and color coded results of computer simulations of an exemplary shear wall with and without the force-resisting device according to the present invention undergoing "drift" (deflection) in response to in-plane shear forces as in an earthquake. FIGS. 11-13 show computer models and color coded results of computer simulations of the active element 22 undergoing deformation due to force application. The analysis results presented in FIGS. 6-13 are provided to aid in understanding of the function of the invention, and are not to be considered limiting in any way.

Figure 6:
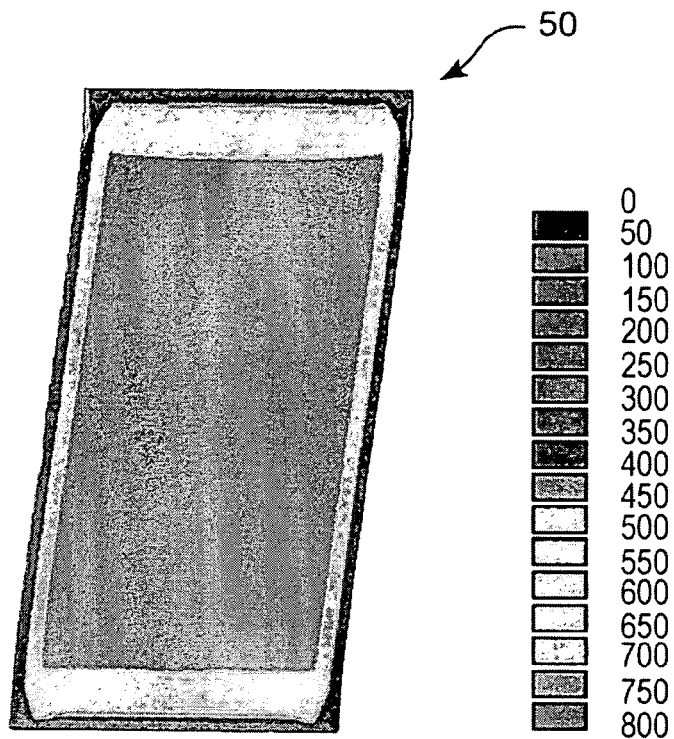
FIG. 6 is an exaggerated deformation and color-coded sheathing shear stress display of a computer simulation of an exemplary shear wall undergoing deflection due to a shear force applied thereto.

Referring now to FIG. 6 there is shown an exemplary shear wall 50 undergoing drift due to an applied shear force. In each of the displays illustrated in FIGS. 6, 7, and 9, the drift was restricted to two inches maximum because two inches of drift is a requirement generally accepted by present building codes for an eight-foot high wall, and the deflection is exaggerated for viewing clarity. As shown in FIG. 6, for a solid plywood shear wall, loaded to produce the maximum code allowable two inches of drift requires a force of approximately 9855 pounds to be applied to the shear wall. Additionally, as shown in FIG. 6, the stresses within the solid shear wall sheathing are distributed smoothly throughout the panel and around the periphery of the shear wall.

Figure 7:
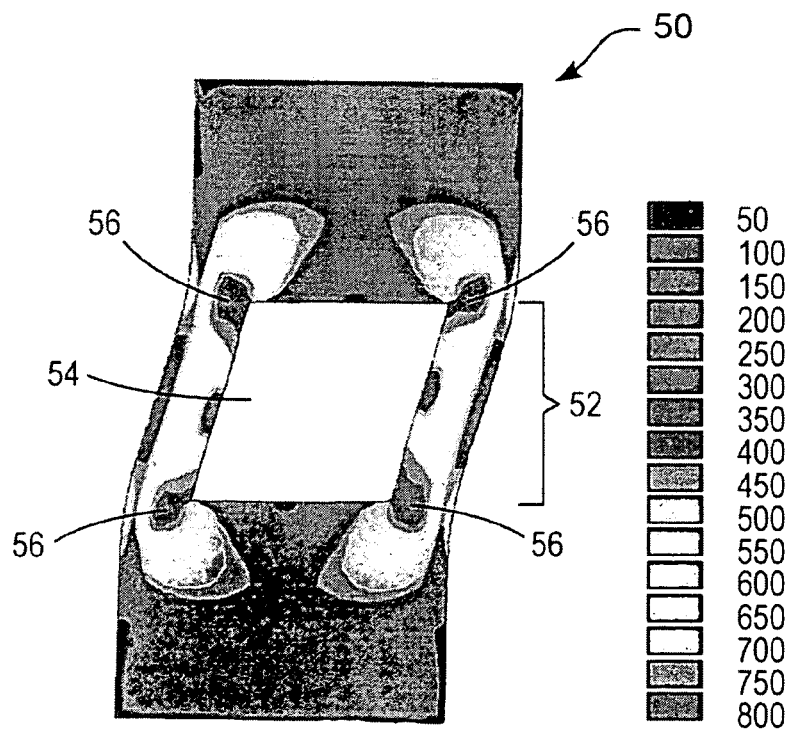
FIG. 7 is an exaggerated deformation and color coded sheathing shear stress display of a computer simulation of an exemplary shear wall having an opening formed therein, wherein the shear wall is undergoing deflection due to a shear force applied thereto.

Referring now to FIG. 7, there is shown the shear wall 50 wherein an opening or discontinuity has been formed therein. The opening formed within the shear wall models a typical window opening of about 30 inches×30 inches. As shown in FIG. 7, the center portion 52 adjacent to the opening 54 deflects greatly due to the applied load. As shown, the shear wall deflects the allowed two inches when only 2807 pounds have been applied to the shear wall. Thus the load resisting capacity of the shear wall 50 is reduced by a factor of almost four. Furthermore, as shown in FIG. 7, the opening also produces extreme concentration of stresses in the corners of the opening as can be evidenced by the red stress pattern indicators 56.

Figure 8:
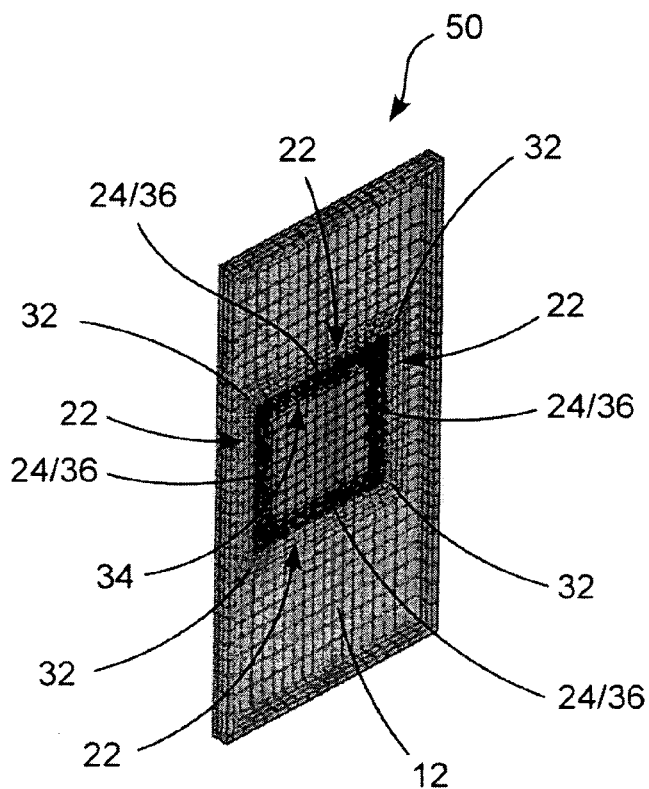
FIG. 8 is a display of a computer model of an exemplary shear wall illustrating schematically the force-resisting device according to the present invention as disposed about the periphery of an opening formed within the shear wall.

Referring now to FIG. 8, there is shown the backside of the model of the shear wall 50. As shown in FIG. 8, the force-resisting device 20 of the present invention has been disposed about the periphery of the opening 54 formed within the shear wall 50. The force-resisting device 20 includes, in this case, four force-resisting members 24 in communication with the periphery of the opening, wherein each of the force-resisting members are configured to restore stiffness and dissipation capacity to the shear wall by transferring forces about the periphery of the opening/discontinuity through controlled deformation of the active elements. It shall be understood that the active element may be configured to deform plastically, elastically, or in any combination thereof. For example, the active element may initially deform elastically, then as loads increase deform plastically until a predetermined amount of deformation has occurred, then deform elastically again, or the active element may act in a progressive elastic or plastic manner.

As shown in FIG. 8, the force-resisting device 20 includes two horizontal force-resisting members 24 and two vertical force-resisting members 24. The force-resisting members 24 each include an active element as described in detail above with reference to FIGS. 4A, 4B and 5. Further still, the horizontal and/or vertical force-resisting members 24 are attached to the plywood panel 12 utilizing fasteners such as screws, bolts, glues, rivets or similar products disposed through the apertures formed in one end portion of the elongated member(s) 36. In addition to being attached on one end to the shear wall, a second end of the force-resisting members 24 may be attached to the frame 34, wherein the frame 34 may be configured as described above. It is further contemplated that the force-resisting device 20 in accordance with the present invention may comprise a mounting device configured to be disposed peripherally about an opening. In a preferred embodiment the mounting device is formed as a unitary member including at least four corner elements and elongated plate members extending therebetween. The mounting device configured to be affixed to the shear wall and to receive at least one force-resisting member 24 thereon. It is further contemplated that the mounting device may be integrally formed with the frame 34 and the force-resisting member 24.

The force-resisting member including the active element is designed to implement the desired known force versus deflection properties of the active element. This allows the engineer to select and design the proper active element that will provide load sharing across a discontinuity formed in the shear wall such that the shear wall including the force-resisting member performs substantially as if no opening existed in the shear wall. This allows an engineer to "tune" the building such that all of the shear walls behave in a similar manner so that a force concentration is not created in any portion of the building that could lead to failure of the building.

As embodied in the present invention and illustrated in the sample computer simulation figures, the active element is configured to undergo deformation, thus carrying the loads from the edge of the plywood panel opening in tension and compression across the active element and at the same time absorbing and dissipating energy. This particular modeled design uses steel of the requisite shape and thickness, but it is obvious to one skilled in the art that a wide range of materials and configurations in many combinations can be employed to produce suitable force/deflection properties.

Figure 9:
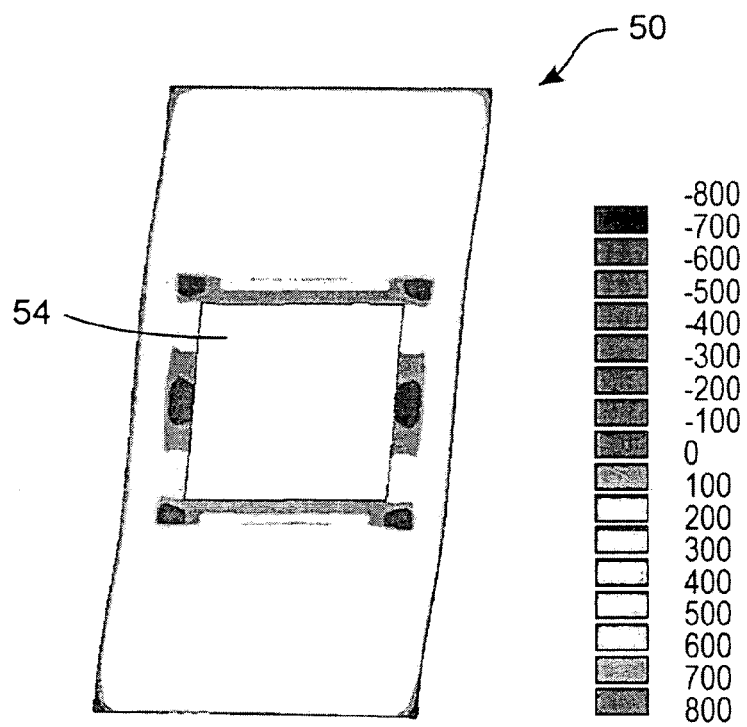
FIG. 9 is an exaggerated deformation and color-coded sheathing shear stress display of an exemplary shear wall having an opening formed therein and the force-resisting device disposed thereabout, wherein the shear wall is undergoing deformation due to an applied force.

Referring now to FIG. 9, there is shown the modeled shear wall undergoing drift due to a shear force applied thereto. As shown in FIG. 9, to achieve two inches of drift in the shear wall 50 including the force-resisting device 20 designed for this size opening, in this size and configuration shear panel, requires 10,705 lb for force. Comparing this to FIGS. 6 and 7 it can be seen that the shear wall including the opening 54 and the force-resisting device 20 behaves substantially like the shear wall 50 as shown in FIG. 6 with no opening. That is, with the force-resisting device 20 disposed about the periphery of the opening the shear wall including the opening functions in nearly the same manner as that of a solid shear wall, i.e. it transmits substantially similar shear force for a given deflection, and the stresses in the panel are not concentrated and do not result in premature failure. This can be better understood with reference to the graph shown in FIG. 10.

Figure 10:
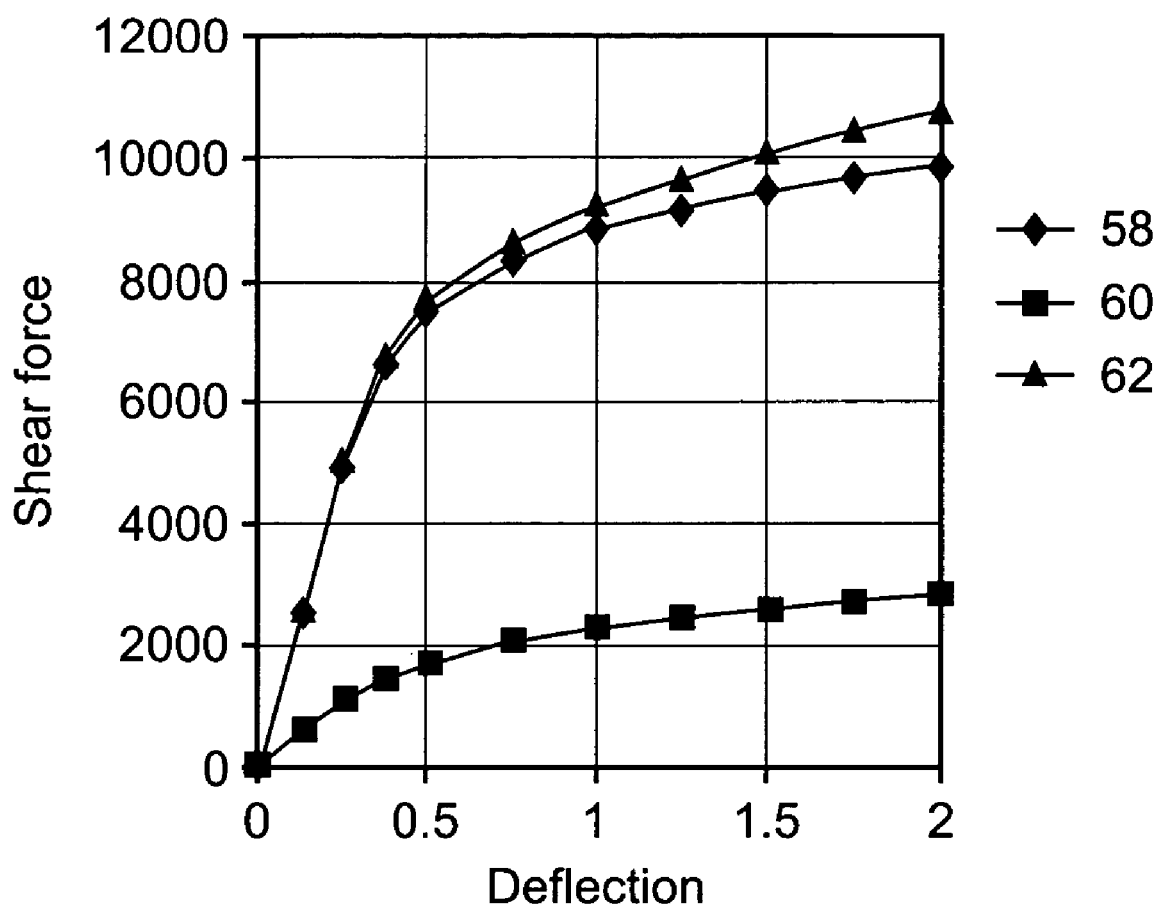
FIG. 10 is a graph illustrating the shear load versus deflection properties of an exemplary shear wall, an exemplary shear wall having an opening, and an exemplary shear wall including the force-resisting device according to the present invention.

Referring now to FIG. 10 there is shown a graph illustrating the performance of the shear wall 50 shown in FIGS. 6-9. As shown in the graph in FIG. 10, the present invention when disposed about an opening formed in a solid shear wall replaces all of the lost stiffness and dissipation capacity of the solid panel. It will be appreciated that the force versus deflection properties of the invention can be adapted to suit a wide range of plywood thickness and other shear panel and sheathing material characteristics. The exemplary shear wall modeled in FIGS. 6-9 was modeled to replicate ½" Douglas fir plywood shear wall sheathing as this is typical of materials used in conventional building practice. Referring now to the graph illustrated in FIG. 10, there is shown three separate load versus deflection characteristic lines. The first line 58 illustrates the load versus deflection characteristics of the solid shear wall of FIG. 6, and the second line 60 illustrates the load versus deflection characteristics of the shear wall including a 30 inch by 30 inch window opening as illustrated in FIG. 7. As can be seen by the difference between line 58 and line 60 the creation of the opening within the solid shear wall drastically reduces the load bearing capacity of the shear wall. Referring now to line 62, there is shown the load versus deflection characteristics of the shear wall including the 30×30 inch opening and the force-resisting device 20 in accordance with the present invention disposed about the periphery of the opening. As shown in the graph of FIG. 10, the present invention restores the shear capacity of the shear wall such that the shear wall including the present invention and a 30×30 inch opening formed therein performs substantially similar to a solid shear wall. Thus, it can be seen that the force-resisting device is configured to resist forces and reduce stresses and replace stiffness, dissipation, and strength to the structure such that the structure behaves substantially as if a discontinuous structural element has not been formed therein.

Thus it can be seen with reference to FIGS. 4B, 6-10 in accordance with the present invention there is provided a force-resisting device for transmitting forces and dissipating and absorbing energy across a discontinuous structural element of a structure by providing at least one active element having at least a first end and a second end, the active element having defined force versus deflection properties and configured to transmit forces and dissipate and absorb energy, wherein the first end of the active element is configured to be connected to a structure. The force-resisting device further includes at least one frame element disposed about a discontinuous structural element, wherein the frame element is configured to be connected to a second end of the active element, the active element and the frame element configured to resist forces and reduce stresses and replace stiffness, dissipation, and strength to the structure.

Thus it can be seen with reference to FIGS. 4B, 6-10 in accordance with the present invention there is provided a force-resisting device for transmitting forces and dissipating and absorbing energy across a discontinuous structural element of a structure by providing at least one active element having at least a first end and a second end, the active element having defined force versus deflection properties and configured to transmit forces and dissipate and absorb energy, wherein the first end of the active element is configured to be connected to a structure. The force-resisting device further includes at least one frame element connected to a discontinuous structural element, the frame element is configured to be connected to a second end of the active element, wherein the active element and the frame element configured to resist forces applied to the structure by transmitting forces across the discontinuous structural element.

Additionally, it can be further seen with reference to FIGS. 4B, 6-10 in accordance with the present invention there is provided a force-resisting device for transmitting forces and dissipating and absorbing energy across a discontinuous structural element of a structure by providing at least one active element having at least a first end and a second end, the active element having defined force versus deflection properties and configured to transmit forces and dissipate and absorb energy, wherein the first end of the active element is configured to be connected to a structure, and at least one reinforcement element, the reinforcement element configured to be connected to the structure. The force-resisting device further includes at least one frame element disposed about a discontinuous structural element, wherein the frame element is configured to be connected to a second end of the active element, the active element, frame element, and reinforcement element configured to resist forces applied to the structure by transmitting forces across the discontinuous structural element and are further configured to reduce the stresses and replace stiffness, dissipation, and strength to the structure.

Thus it can be seen with reference to FIGS. 4B, 8, 9, and 10 in accordance with the present invention that there is provided a method for restoring stiffness, energy dissipation capacity, and strength of a structure containing a discontinuous structural element by transmitting forces across the discontinuous structural element, thereby providing load sharing across the discontinuity.

It will be appreciated by one skilled in the art that the large number of calculations required to produce an active element having accurately known force versus deflection properties over the entire working deflection range requires the use of a finite element analysis (FEA) computer program capable of iterative calculations to optimize the performance of the active element. An example of such a program is ANSYS, available from ANSYS, Inc. in Houston, Pa. While it is true that the active element can be designed without the use of a computer, to properly optimize the design would require an overly excessive number of calculations and would not be accurate. Therefore, the use of a computer model in a finite element analysis program is the preferred embodiment.

Thus it can be seen with regard to FIG. 10 there is provided a method for selecting a force-resisting device, the force-resisting device being configured to transmit loads and to dissipate and absorb energy by selecting a structural element to be reinforced and selecting a design configuration of a force-resisting device, the force-resisting device including at least one active element and selecting a design configuration for the active element, then building a computer generate finite element model of the force-resisting device with at least one active element having at least one degree of freedom for transmitting force and dissipating and absorbing energy, and using the computer generated finite element model in a finite element analysis program to iterate the design of the active element to produce defined force versus deflection properties.

Referring now to FIGS. 11-13 there is illustrated a color computer simulation simulating the forced response of the modeled sample active element in accordance with the present invention.

Referring now to FIG. 11, there is shown a perspective view of a section of an exemplary force-resisting member 24 including the active element 22, wherein no force has been applied. The active element 22 being defined by three bend points 64, 66, and 68.

Referring now to FIG. 12, there is shown a sectional view of an exemplary model of a force-resisting member 24 and the active element 22 wherein a force has been applied to the force-resisting member 24 in the X direction of FIG. 5. As shown in FIG. 12, the active element undergoes compression resulting in localized elastic and plastic bending primarily at the three pre-bent points 64, 66, and 68. The elastic bending effects energy absorption and the plastic bending effects energy dissipation, while the geometry and size of the active member provides for the ability to transmit sufficient load to be effective without material failure. Also, to avoid failure, a ductile metal is used for this case.

Referring now to FIG. 13, there is illustrated a cross-sectional view of an exemplary model of a force-resisting member 24 wherein a tension force has been applied thereby causing the active element 22 to elongate. By elongating as shown in FIG. 13, the active element is subjected again to localized elastic and plastic bending primarily at the three pre-bent points 64, 66, and 68, resulting in absorption, dissipation, and load transmitting effects similar to the compression case. Over multiple cycles, e.g., over multiple elastic-plastic-elastic cycles such as encountered in one or more seismic events, the active element maintains its designed response, e.g., the designed force versus deflection response, without failure or fatigue of the active element, particularly the pre-bent portions of the active element.

As the active element undergoes compression or tension as illustrated in FIGS. 12-13, the active element behaves in a general manner similar to that of the materials of which the shear wall has been constructed. That is, the force-resisting device 20 according to the present invention is not intended to create a rigid non-yielding structure within the shear wall; instead the active element is configured to behave in a progressively plastic manner similar to the natural behavior of the surrounding plywood panel structure and to not create an overly stiff portion which would cause the forces to become concentrated therein.

The implementation of force-resisting devices for different size openings or different discontinuity features in different configurations of shear walls may be done by varying the active element design, by using tailored specific X and Y directional force-resisting behavior on one or more sides of the opening or discontinuity. For example, in some cases, suitable force-resisting devices can be developed using only vertical side force-resisting members with no horizontal top and bottom force-resisting members, provided the Y or vertical direction stiffness of the remaining vertical members is high in proportion to the X or horizontal direction stiffness, such that the assembly does not rotate appreciably under load.

The implementation of force-resisting devices for different size openings or different discontinuity features in different configurations of shear walls may be augmented by using the frame 34 or frame elements as an additional active element. For example, the frame itself may be designed to dissipate energy by plastic deformation in addition to stiffness and ability to transmit forces. This would in most cases require the window or door in the frame to be mounted resiliently to avoid damage.

Figure 28:
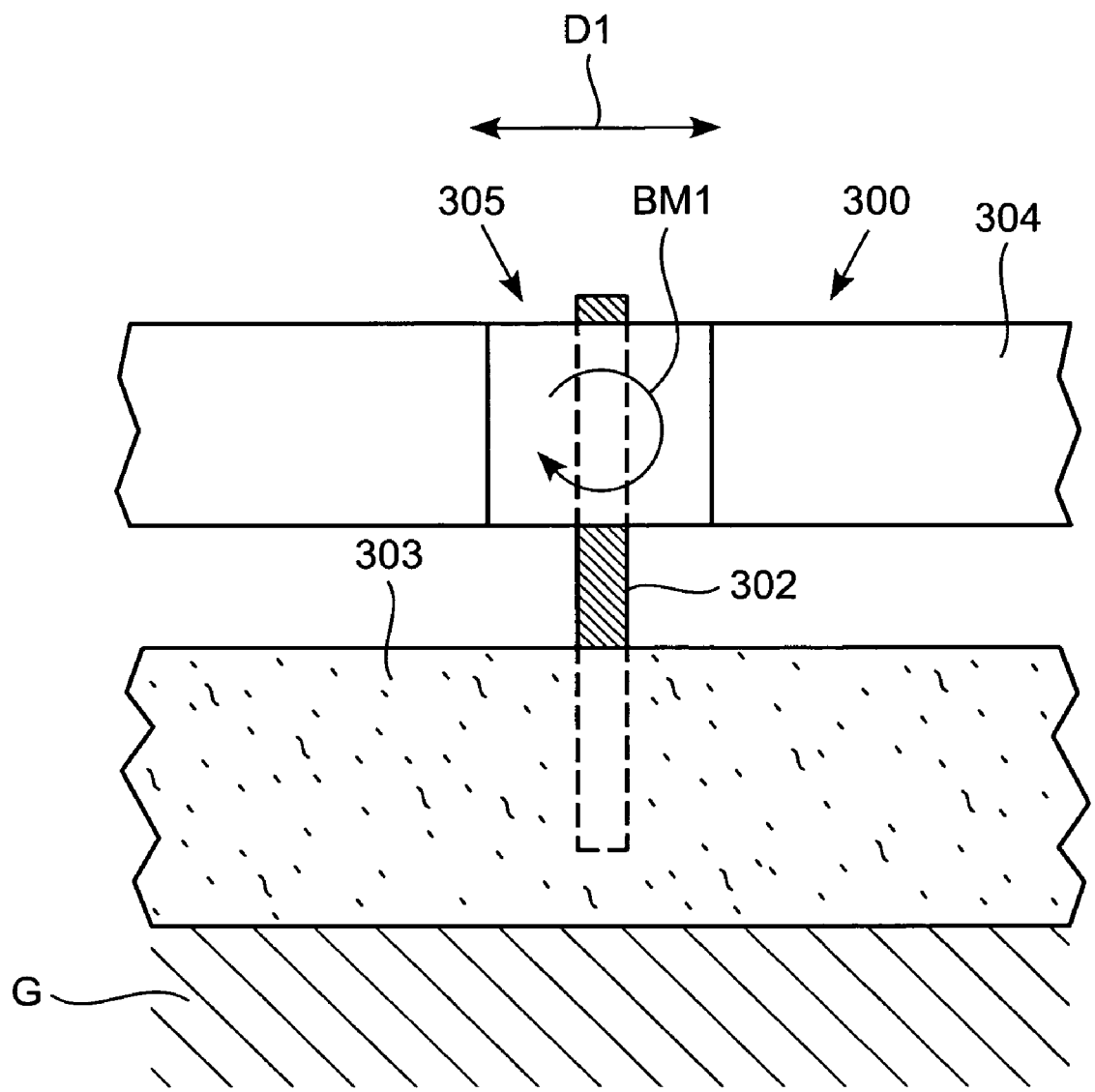
FIG. 28 is a side elevation view of a third embodiment of the present invention.
Figure 29:
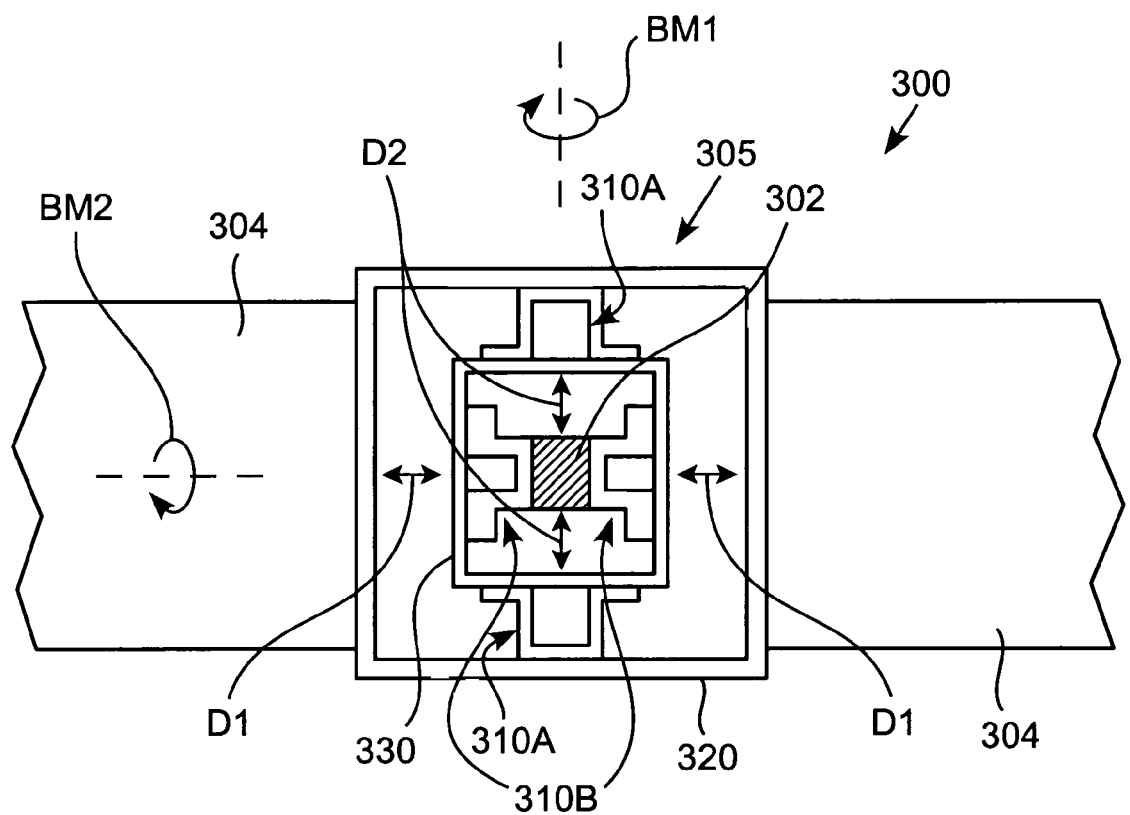
FIG. 29 is a top plan view of the third embodiment of the present invention.
Figure 30:
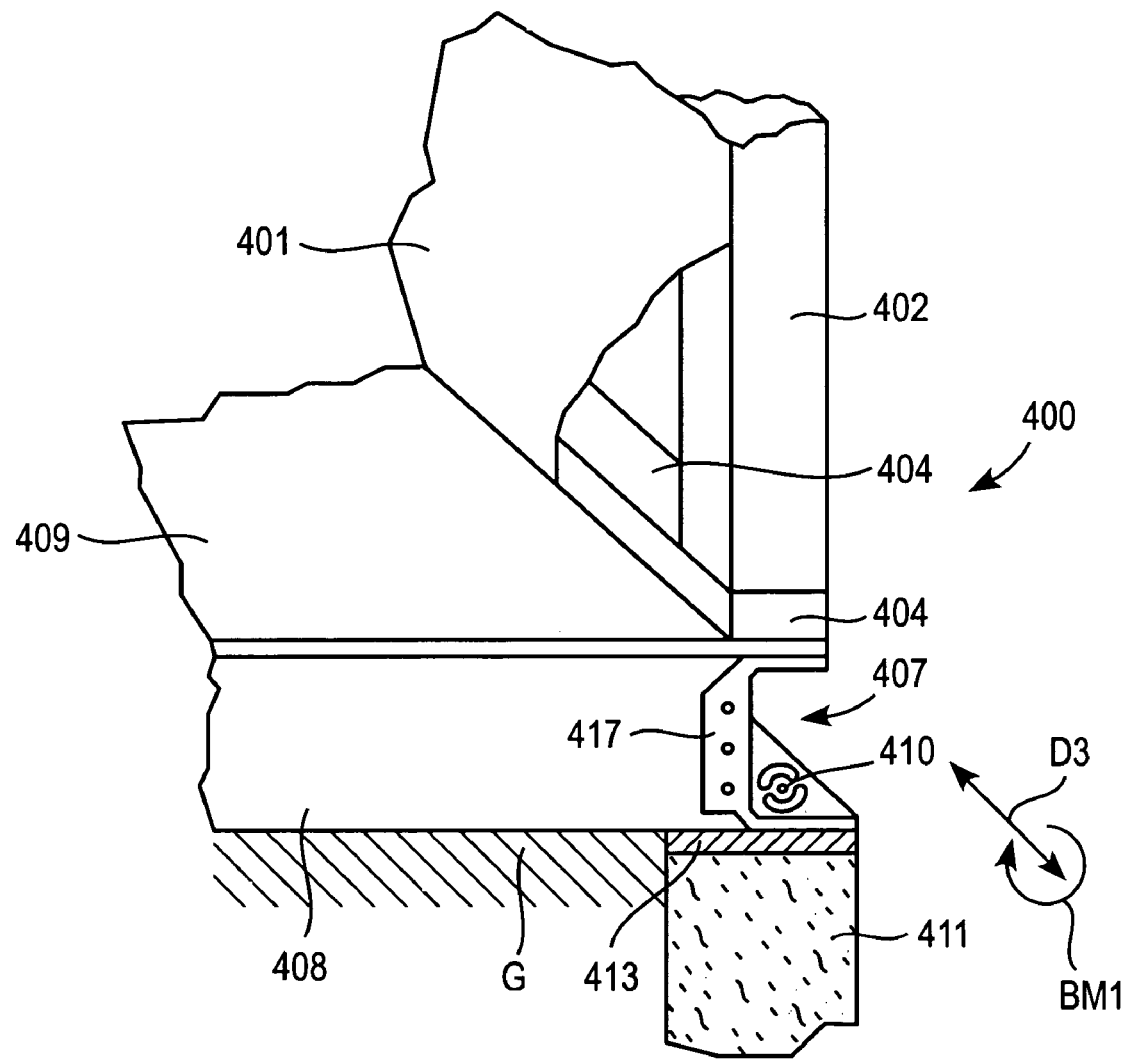
FIG. 30 is a perspective view of a wall stud and sill plate sitting on a floor joist and foundation, incorporating a joist hanger according to the present invention.
Figure 31:
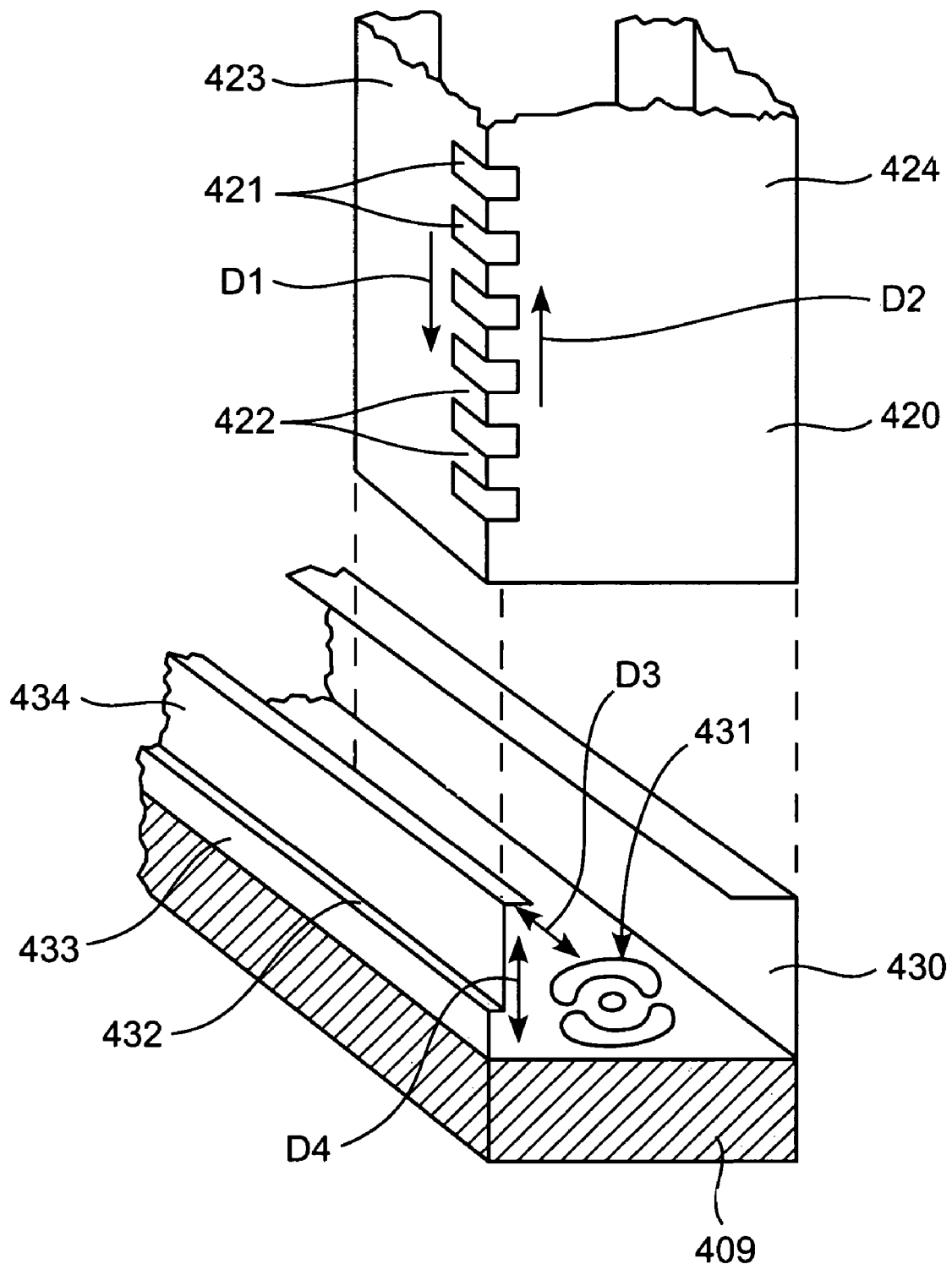
FIG. 31 is a perspective view similar to FIG. 30, incorporating a wall stud and sill plate according to the present invention.
Figure 37:
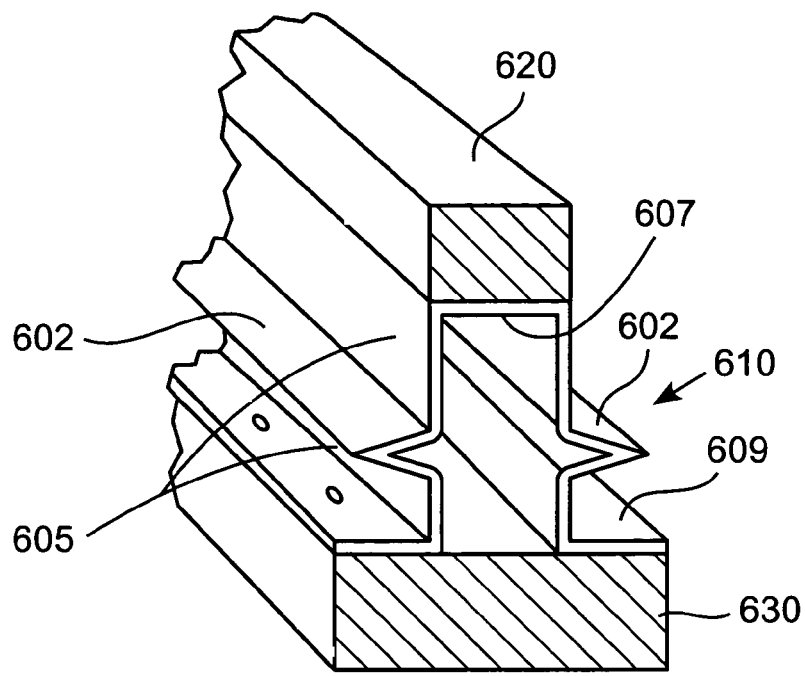
FIG. 37 is a perspective view of an alternate active element of the present invention.
Figure 38:
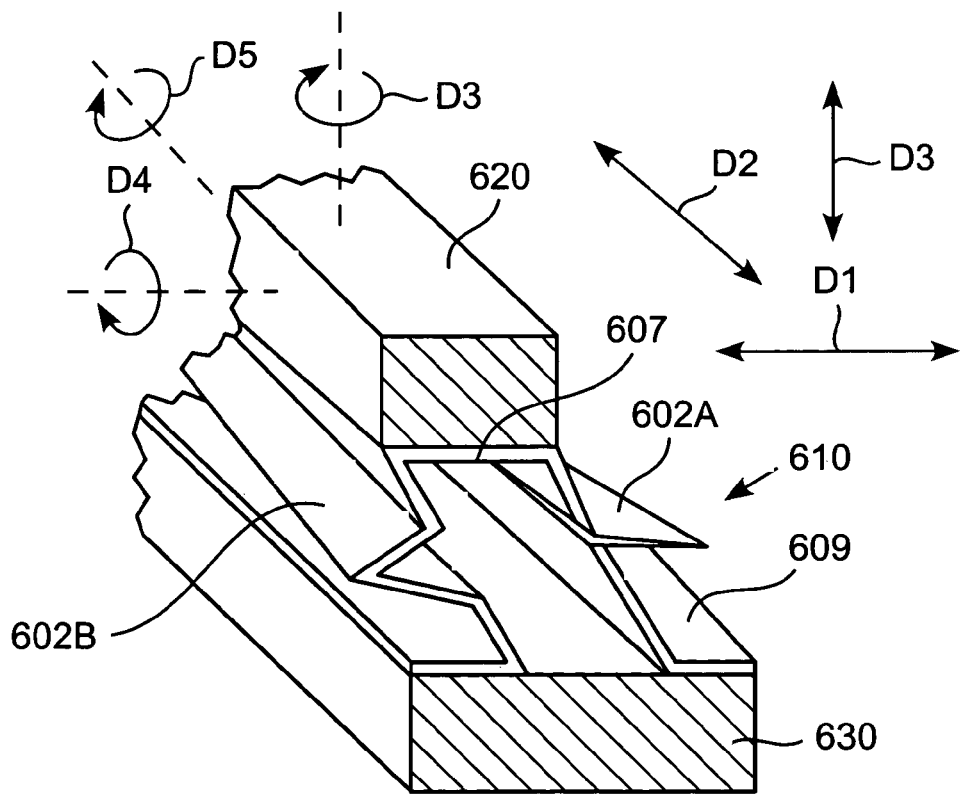
FIG. 38 is a perspective view of the active element of FIG. 37 after it has been deflected by a force applied thereto.
Figure 39:
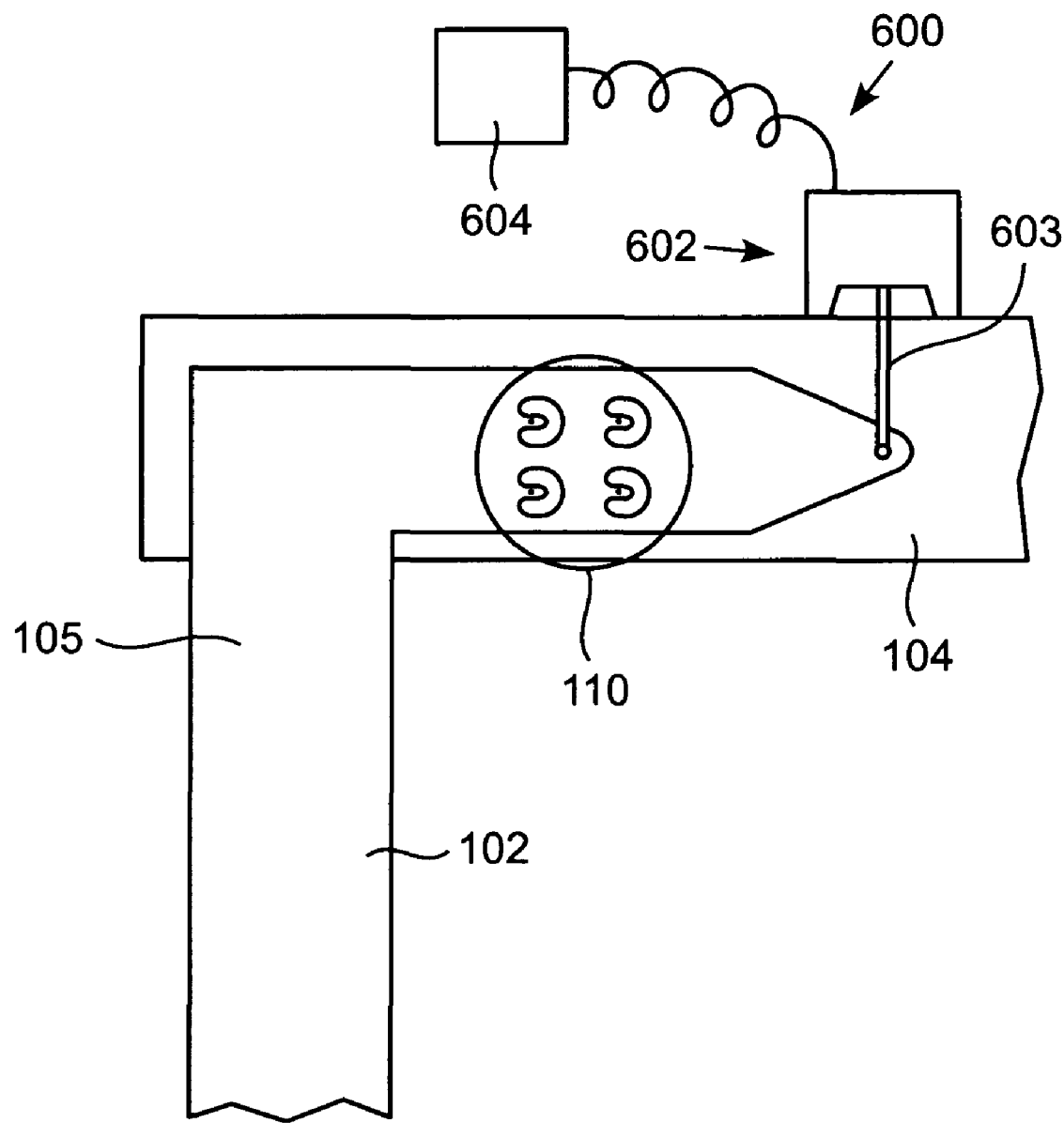
FIG. 39 is a side elevation view of the first embodiment of the invention further including an optional add-on electromechanical system for passively or actively controlling stiffness and energy dissipation.
Figure 40:
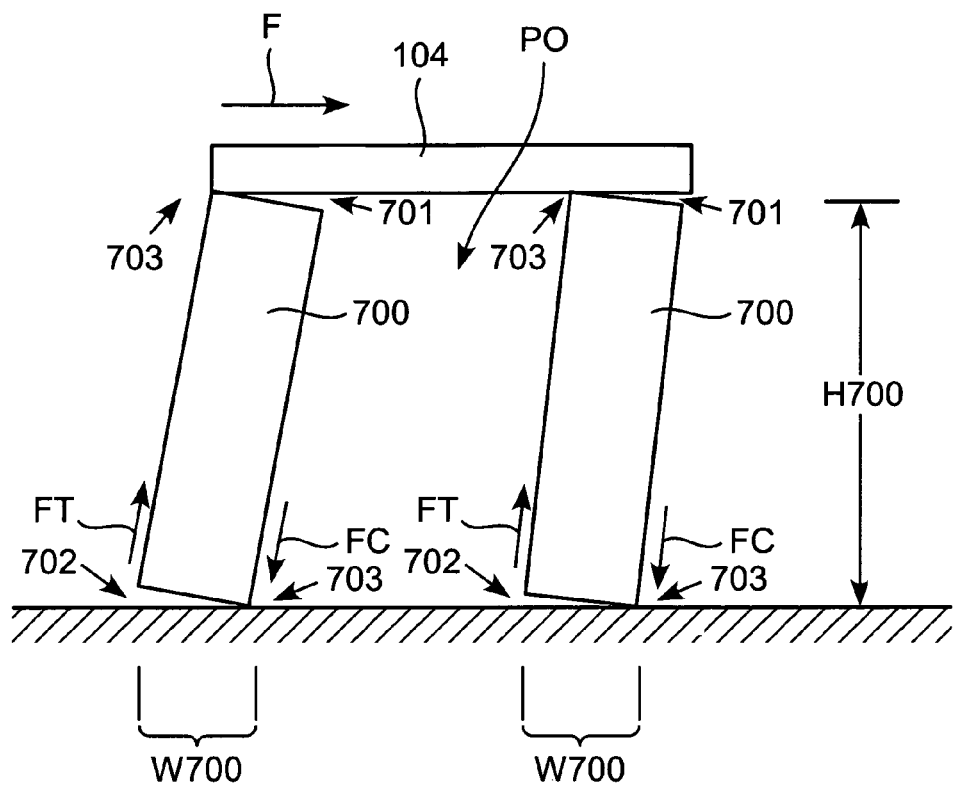
FIG. 40 is a side elevation view of a pair of Simpson StrongWalls® disposed on either side of a portal opening.
Figure 41:
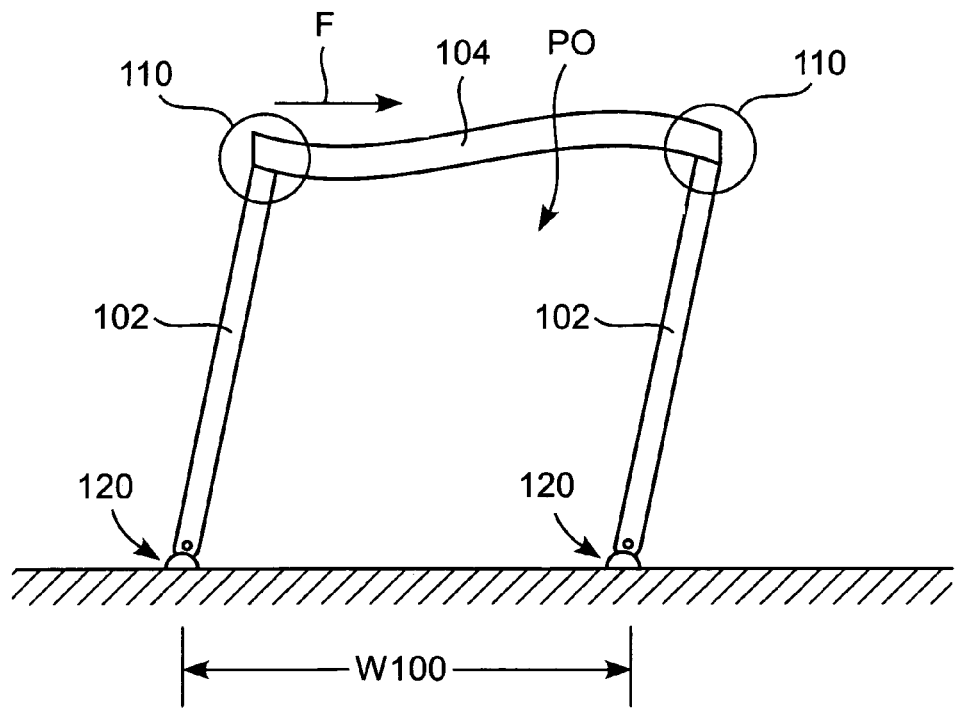
FIG. 41 is a side elevation view of a system of structural members according to the present invention, with a pair of vertical structural members disposed on either side of a portal opening.

FIGS. 14 to 19 show a further embodiments of the invention. FIGS. 20 to 27 show a second embodiment of the invention. FIGS. 28 and 29 show a third embodiment of the invention. FIGS. 30 and 31 illustrate a particular cases of a rim joist, wall stud and sill plate according to the present invention. FIGS. 32 to 36 show a fourth embodiment of the invention. FIGS. 37 and 38 illustrate an alternative active element design according to the present invention. FIG. 39 illustrates an optional add-on system for passively or actively controlling stiffness and energy dissipation. FIGS. 40 and 41 illustrate advantages of the present system as compared to a Simpson StrongWall® portal reinforcing system.

Figure 14:
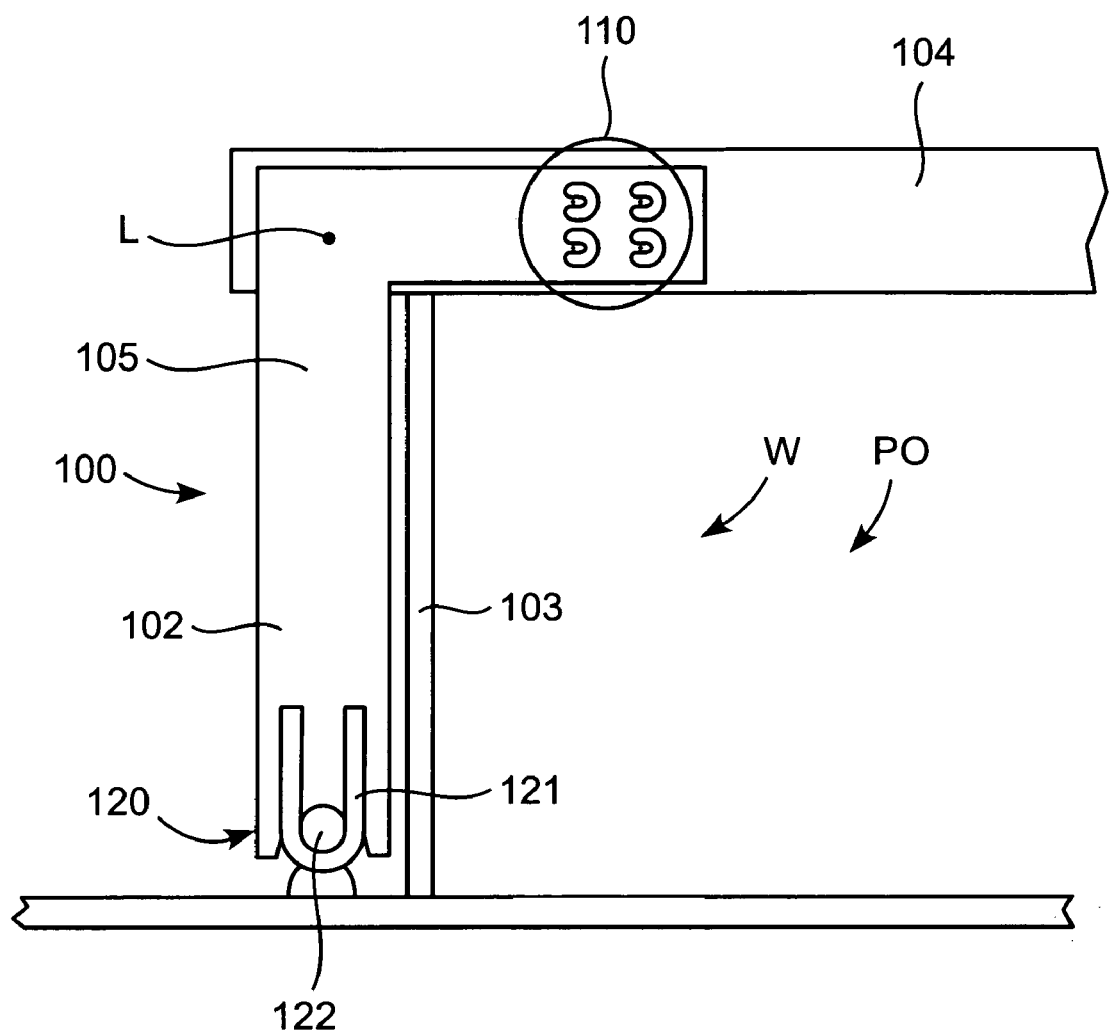
FIG. 14 is a side elevation view of a first embodiment of the present invention.

FIGS. 14 to 19 illustrate a first embodiment of the present invention, as follows. Referring first to FIG. 14, a structure 100 is provided. Structure 100 includes at least two structural members. In one aspect, the first structural member is a vertically extending member 102, and the second structural member is a header beam 104. Optionally, the first structural member may instead comprise a vertical post or beam 103. It is to be understood that vertically extending member 102 may optionally be attached to beam 103 such that member 102 and beam 103 together comprise the first structural member. It is also to be understood that beam 103 may be omitted such that vertically extending member 102 alone comprises the first structural member. Point "L" illustrates the locus of the joint formed between structural members 102 and 104. Header beam 104 may be made of wood, laminated veneer lumber (lvl), pressed steel or any other suitable structural material to which joining element 105 may be attached.

Structure 100 includes a joining element 105 that is connected to the at least two structural members 102 (or 102/103 together) and 104. As illustrated, joining element 105 may simply be incorporated (e.g. integrally formed with) structural member 102.

An active element 110 is provided. Active element 110 may be integrally formed into joining element 105, as shown (such that joining element 105 is L-shaped). As such, active element 110 is disposed between joining element 105 and at least one of the structural members (header beam 104).

Active element 110 is configured such that when a force applied to one structural member (e.g. to header beam 104) the force passes at least partially through active element 110 and into the other structural member (e.g. vertical member 102), such that the entire structure 100 exhibits a prescribed load-deflection relationship.

A connector 120 configured to connect vertical member 102 to an external body is provided. As shown, connector 120 may comprise a U-shaped bracket 121 that freely rotates around a pin joint 122. (U-shaped bracket 121 being attached to vertical member 102). Alternatively, connector 120 may comprise a live hinge joint (i.e. a bendable flange of material).

In various aspects, structure 100 may alternatively be disposed adjacent to (or fully within) a wall W or portal opening PO. For this reason, FIG. 14 illustrates both a wall W and a portal opening PO. It is to be understood that either may be provided within the space labeled as "W" or "PO". Wall W may be any load bearing wall, or any part thereof. Therefore, when disposed either within or adjacent to a wall W, structure 100 may be used to reinforce the wall. In preferred aspects, portal opening PO may include a door, a garage door, a window or a security panel. When disposed adjacent to (i.e. at, near or around) portal opening PO, structure 100 may be used to reinforce the portal opening.

Figure 15:
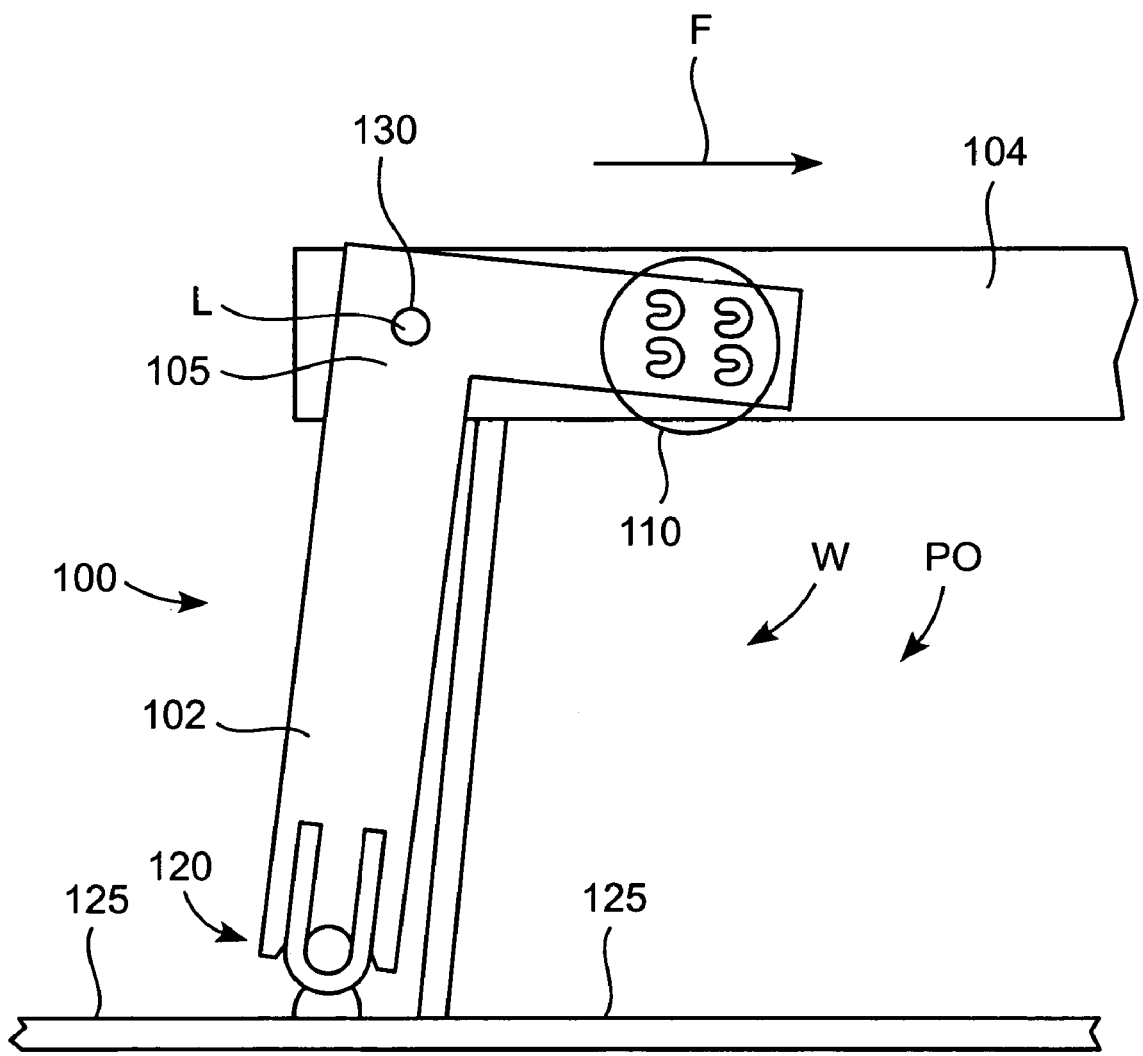
FIG. 15 is a side elevation view of the first embodiment of the invention, further including a pivot joint between the structural members, showing movement of the structural members of the system when a force has been applied thereto.

Referring next to FIG. 15, connector 120 is configured such that when a force F is applied to header beam 104, U-shaped bracket 121 will rotate slightly around pin joint 122. In this way, connector 120 permits movement of structural members 102 and 104 without transmitting substantial bending moments to an external body 125. (External body 125 may comprise a portion of any floor of a building or the foundation of the building.) Specifically, structural members 102 and 104 are permitted to rotate relative to one another while connector 120 prevents, or very substantially reduces, bending moment transmission to floor/foundation 125 in the plane in which structural members 102 and 104 are disposed.

For example, when structural members 102 and 104 are disposed within a wall of a building, connector 120 prevents bending moment transmission to the floor/foundation 125 in the plane of the wall. Alternatively, when structural members 102 and 104 are disposed around the perimeter of a portal opening (such as a door, a garage door or a window opening), connector 120 prevents bending moment transmission to the floor/foundation 125 in the plane of the portal opening.

An advantage of connector 120 is that it is preferably configured to transmit bending moments to floor/foundation 125 in a plane or direction normal to the wall. This is because connector 120, as shown, is not configured to rotate in a direction normal to the plane of the wall or portal opening. This is particularly advantageous in that the overall structure retains its stiffness in a direction normal to the wall, and is thus able to withstand wind loading against the wall.

Whereas floor/foundation 125 may be a first floor foundation, it is to be understood that element 125 may alternatively represent a ground plane or floor member found on any story of a building. Thus, the present invention is not limited to reducing the unwanted effects of bending moments at the base of a building. Rather, it may be used to reduce the unwanted effects of concentrated overturning moments between various stories of a building (as is found when using the Simpson StrongWall® or Hardy Frame® designs on various stories of a building).

Active element 110 is preferably configured such that wall W (or structural members adjacent to the portal opening PO) exhibit a desired load-deflection relationship when a force is applied to the load bearing wall. When structure 100 is disposed within a building, active element 110 is preferably configured such that the entire building exhibits a desired load-deflection relationship when a force is applied to the building.

Active element 110 is preferably configured to transmit, absorb and dissipate energy due to structure 100 exhibiting a prescribed force/deflection relationship when subject to a force such as through cyclic motion. Accordingly, active element 110 is preferably configured to react to a bending moment between members 102 and 104 in the plane in which both the first and second structural members are disposed such that the unwanted effects of bending moments between structural members 102 and 104 are substantially reduced. Specifically, active element 110 reacts by transmitting, absorbing and dissipating energy resulting from the relative motion of the first and second structural members 102 and 104.

Active element 110 is preferably designed by performing finite element analysis, or iterative calculations. For example, active element 110 (or any other active element described herein) are preferably designed by a finite element analysis computer program capable of iterative calculations to optimize the performance of the active element. An example of such a program is ANSYS, available from ANSYS, Inc., of Houston, Pa.

As can be seen, active element 110 may optionally be integrally formed into joining element 105. As will be explained, this can be accomplished by designing active element 110 as a series of cut out sections.

As can be seen in FIG. 15, an optional pivot 130 can be provided between header beam 104 and joining element 105/vertical member 102. Pivot 130 may preferably be positioned at the locus L of the joint between structural members 102 and 104, as shown. When a force F is applied along header beam 104, header beam 104 and vertical member 102 will rotate relative to each other about pivot 130. Pivot 130 may optionally be connected to wall W (when wall W covers structure 100). A variety of different connector systems may be used to connect the wall to the pivot.

As will be explained below, active element 110 will preferably flex when this rotation occurs. By flexing, active element 110 operates so that stresses between structural members 102 and 104 do not concentrate between the structural members at the joint locus L. Instead, the stresses are shared by active element 110 flexing. Moreover, pivot 130 also assists in providing support to horizontal header beam 104. In this aspect of the invention, active element 110 is positioned some distance away from the joint locus L between structural members 102 and 104. In the case of a plurality of active elements being used, the active elements are preferably distributed at different locations away from joint locus L, as shown. This allows multiple active elements to be incorporated into a structure over a large area to thereby reduce loads on individual active elements and their attachments, while providing desired force/deflection properties to the overall structure.

Figure 16:
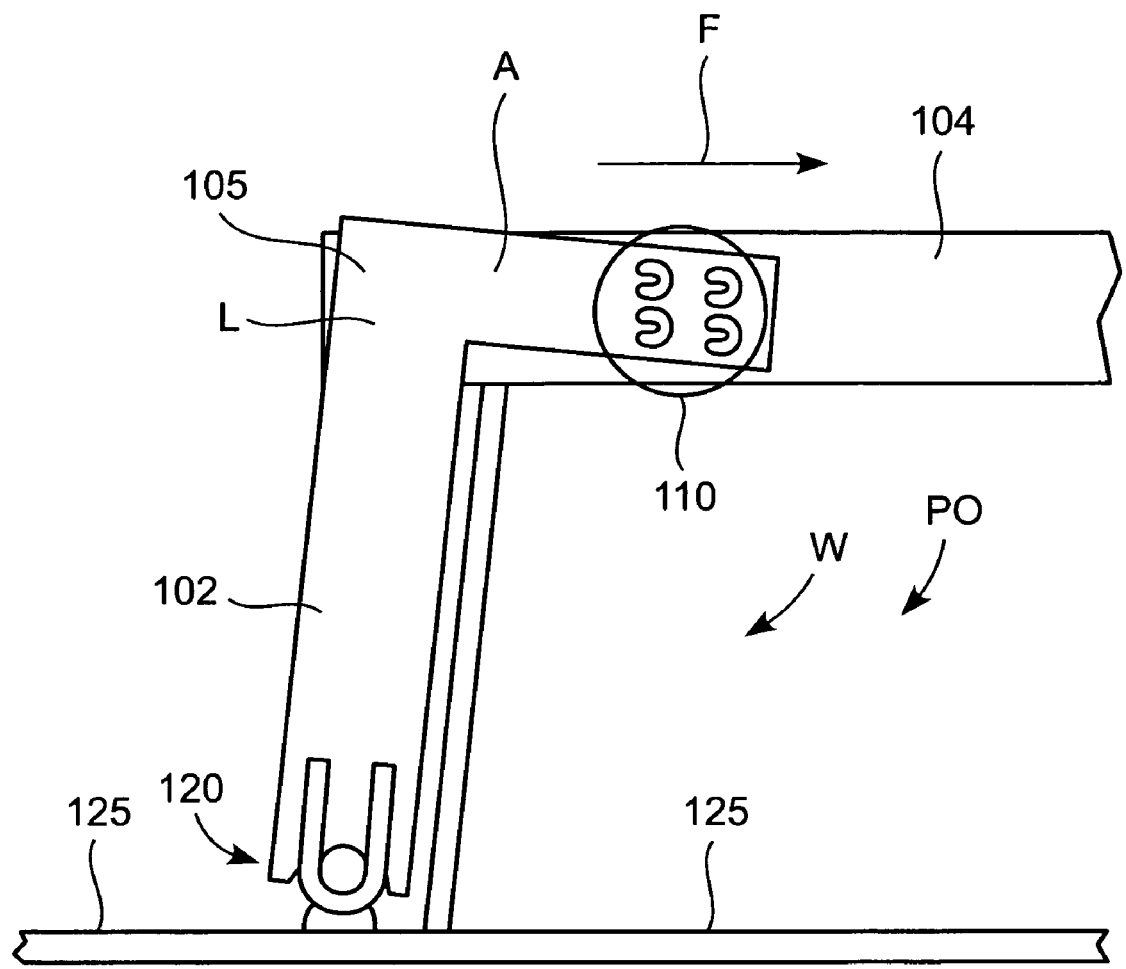
FIG. 16 is a side elevation view of the first embodiment of the invention, not including a pivot joint between the structural members, showing movement of the structural members of the system when a force has been applied thereto.

Alternatively, as can be seen in FIG. 16, the pivot (130 in FIG. 15) need not be included. In this case, active element 110 flexes such that structural members 102 and 104 rotate relative to one another about an axis A that is displaced from joint locus L. By spatially distributing the active elements away from the axis A and away from the locus L, the present invention operates so that stresses between structural members 102 and 104 do not concentrate at the locus L of the joint. The specific location of axis A is defined by the properties of active element 110. Thus, active element 110 is preferably configured to respond to forces applied thereto such that structure 100 exhibits a prescribed load-deflection response when a load has been applied thereto.

In various aspects, the degree to which active element 110 flexes varies along a length of the active element. Moreover, the load-deflection relationship of structure 100 may be non-linear, and the configuration of active element 110 may change the deflection, velocity or acceleration level of structure 100 in a prescribed manner in response to an applied load. Additionally, active element 110 may be configured to provide stiffness and energy dissipation (when transmitting a force therethrough) via hysteretic damping. The flexure of the active elements dissipates energy regardless of whether the structure is subject to monotonic or oscillatory (i.e. cyclic) loading.

In preferred aspects, the first structural member 102 is generally vertical. In preferred aspects, first structural member 102 may be: a post or a structural member attached to a post; a column, or a structural member attached to a column; a beam, or a structural member attached to a beam; a wall stud, or a structural member attached to a wall stud.

In preferred aspects, the second structural member 104 is generally horizontal. In preferred aspects, second structural member 104 may be: a beam, or a structural member attached to a beam; a wall horizontal plate, or a structural member attached to a wall horizontal plate; a wall sill plate, or a structural member attached to a wall sill plate; a wall header, or a structural member attached to a wall header; a building perimeter frame, or a structural member attached to a building perimeter frame; a rim joist system, or a structural member attached to a rim joist system.

FIG. 17 shows a close up of the cut out embodiment of active element 110 seen in FIG. 14. Active element 110 comprises a plurality of cut-out openings 111 within joining element 105. Structural member 104 is connected to a first portion 113 of active element 110 and structural member 102 is connected to a second portion 115 of active element 110. As illustrated in FIG. 17, the first portion 113 is the portion of joining element 105 that is disposed within cut-out opening 111 and second portion 115 is the portion of joining element 105 that is not disposed within cut-out opening 111 (i.e. the remainder of the body of joining element 105). A bolt passing through each of holes 114 is used to fasten header beam 104 to first portion 113 of active element 110. (It is to be understood that screws, lag screws or any other suitable fastener can be used as a substitute for "bolts" as described herein). Additionally, further connectors may be used to connect joining element 105 directly to wall W when wall W covers structure 100. In various aspects, joining element 105 can be fixed rigidly, or through an active element to wall W. Such connectors may optionally comprise a series of connectors connecting the joining element 105 (and/or vertical member 102) to various locations on wall W.

Cut-out openings 111 permit the first and second portions 113 and 115 of active element 110 to move relative to one another. When members 102 and 104 rotate relative to one another from a neutral position to a flexed position, first portions 113 will move to the position shown in dotted lines as 113B.

Figure 18B:
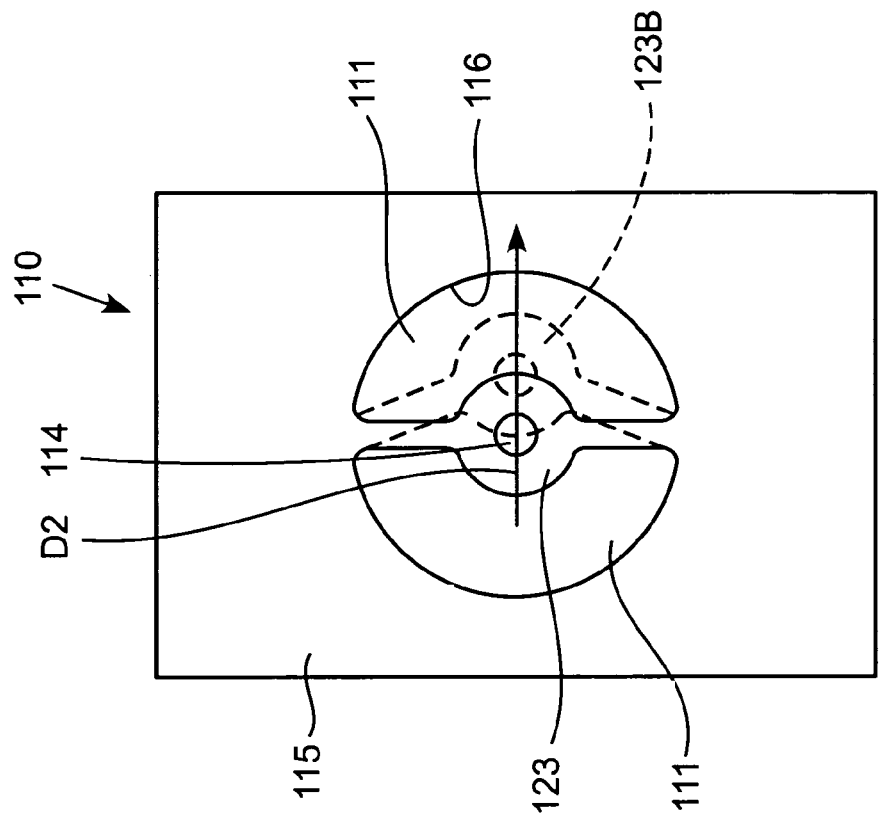
FIG. 18B is a close up of an alternative active element that can instead be used in the system shown in FIG. 17.
Figure 18A:
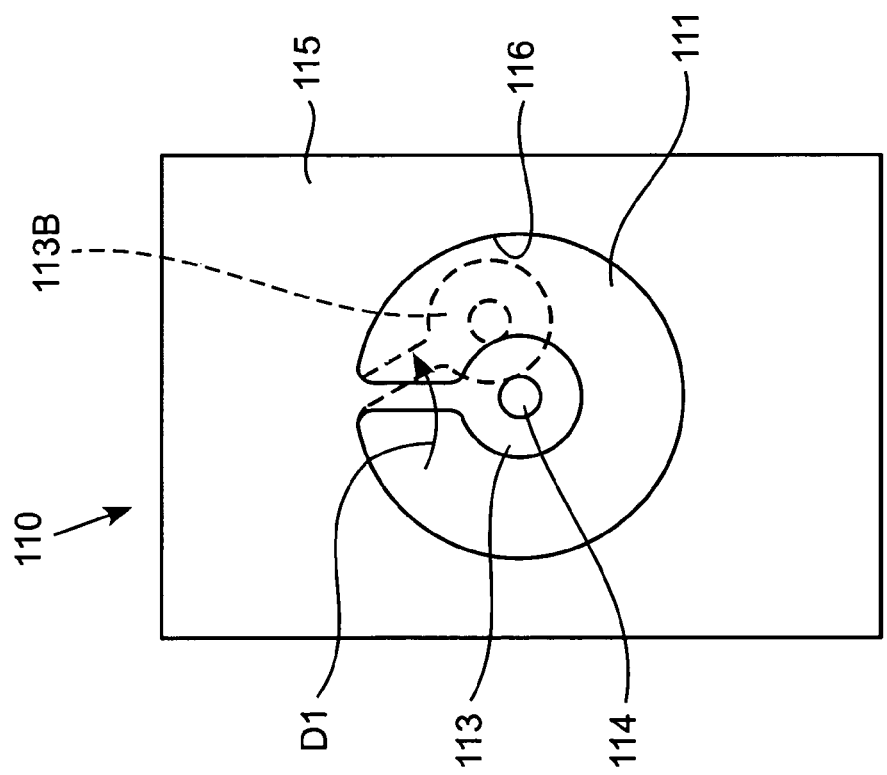
FIG. 18A is a further close up of the active element of FIG. 17.

FIGS. 18A and 18B show alternate cut-out designs of active element 110, as follows. FIG. 18A shows a first cut-out design as was shown in FIG. 17. In this design, the narrow "neck" of first portion 113 first deforms elastically and then plastically as the first portion 113 moves to the location shown as 113B when flexing. Specifically, when active element 110 flexes, first portion 113 will rotate in direction D1 with respect to second portion 115. If pushed (i.e. flexed) far enough, an edge of first portion 113 will eventually contact side edge 116 of opening 111. At this stage, any further deformation of active element 110 will be largely elastic and much stiffer.

Alternatively, FIG. 18B shows a second cut-out design. In this design first portion 113 has two opposite "necks". In this design, the two narrow "necks" of first portion 123 first deform elastically and then plastically (under tension) as first portion 123 moves to the location shown as 123B. When active element 110 flexes, first portion 113 will move in direction D2 with respect to second portion 115. If pushed (i.e. flexed) far enough, an edge of first portion 113 will eventually contact side edge 116 of opening 111. At this stage, any further deformation of active element 110 will be largely elastic and much stiffer.

It is to be understood that active elements 110 as shown in FIGS. 18A and 18B could be subject to tension, bending and compression, or any combinations thereof, depending upon the relative movement of structural members 102 and 104 with respect to one another.

Figure 19:
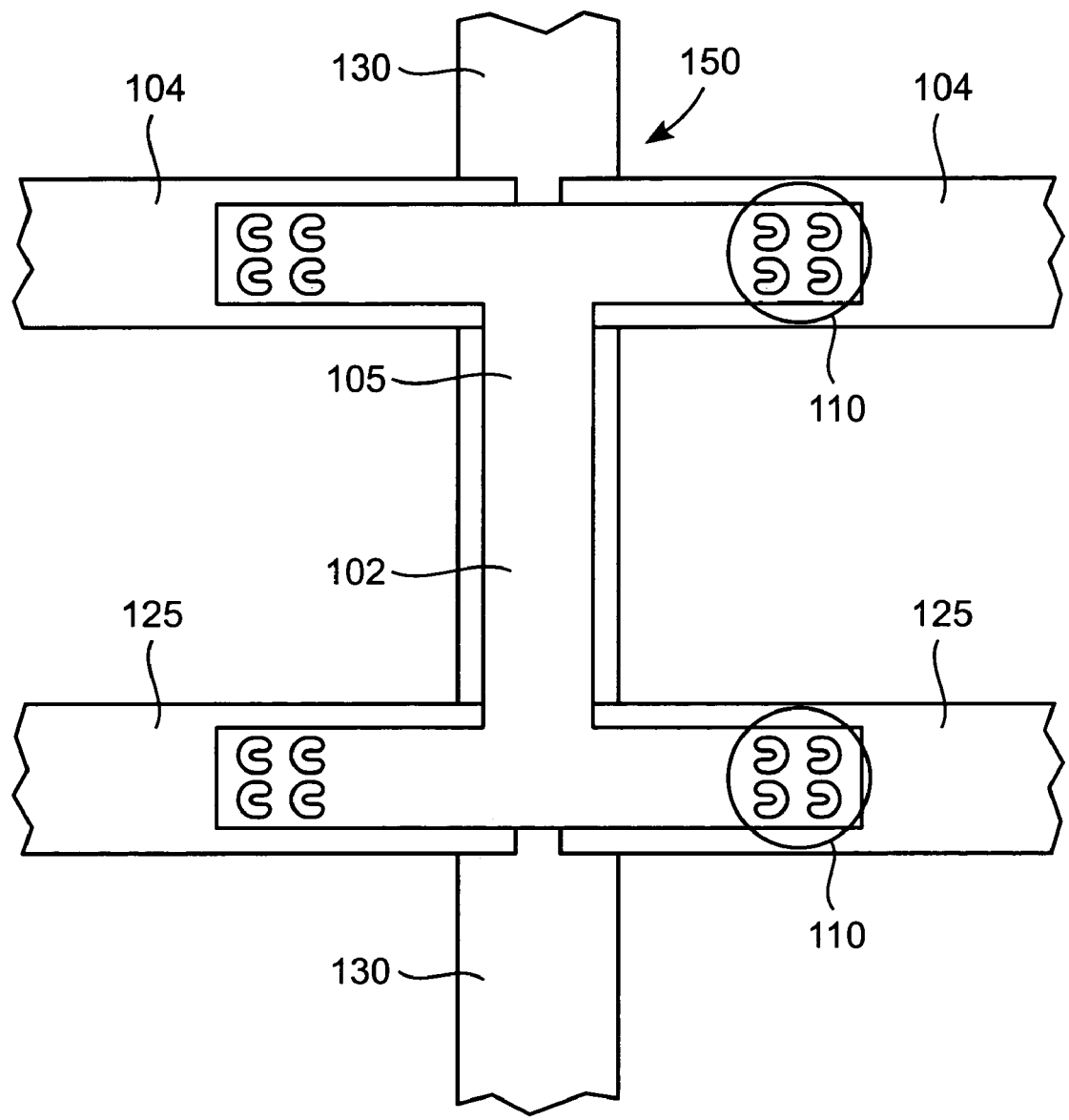
FIG. 19 is a side elevation view of a section of a building incorporating a system of the first embodiment of the present invention having upper and lower active elements.

FIG. 19 shows a side elevation view of a section of a building incorporating a system of the first embodiment of the present invention having upper and lower active elements 110. Specifically, system 150 comprises two header beams 104 and two building story floor members 125. A vertical building member 130 is also shown. In this illustration, building story members 125 may preferably be located on a second, third, or fourth, etc. story of a building. As such, an additional connector (such as connector 120 in FIG. 14) which is not shown in FIG. 19, may be placed at the bottom of the building, connecting the building to its foundation, in the manner described above.

Figure 20:
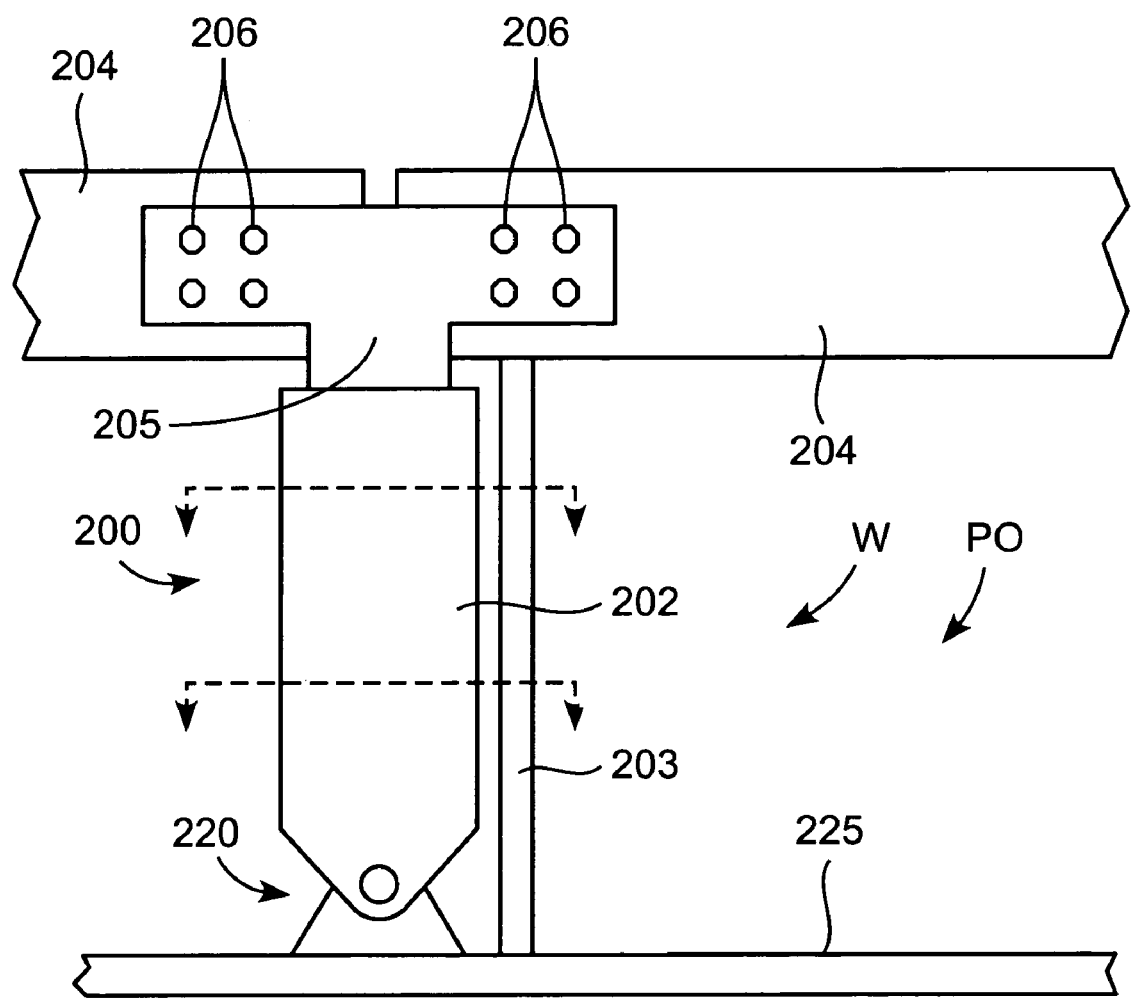
FIG. 20 is a side elevation of a second embodiment of the present invention.
Figure 21:
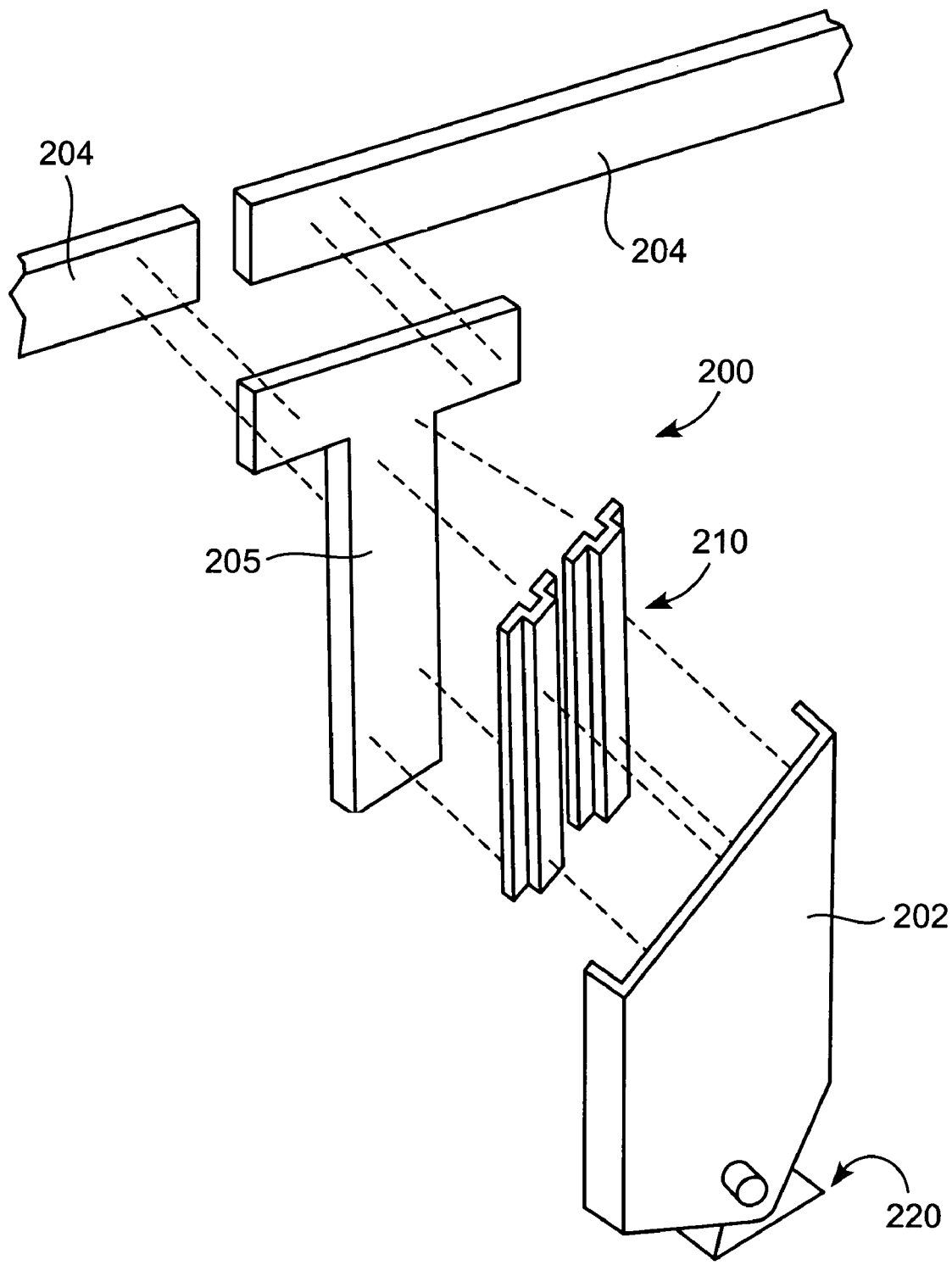
FIG. 21 is an exploded perspective view of the second embodiment of the invention.
Figure 22:
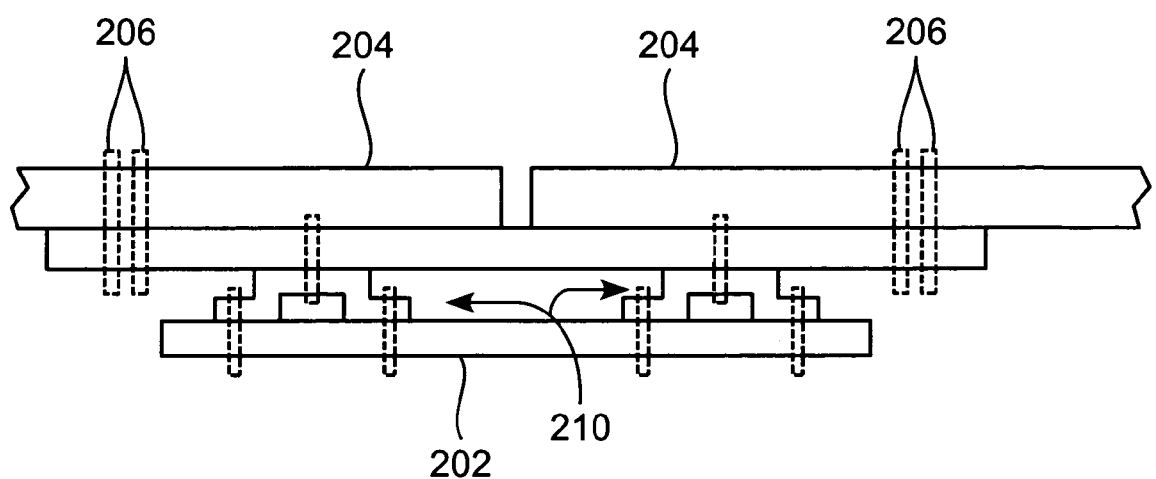
FIG. 22 is a top plan view of the second embodiment of the invention.

FIGS. 20 to 27 illustrate a second embodiment of the present invention, as follows. Referring first to FIG. 20, a structure 200 is provided. Structure 200 includes at least two structural members. In one aspect, the first structural member is a vertically extending member 202, and the second structural member is one of the header beams 204. As shown, however, two header beams 204 may be used.

Optionally, the first structural member may instead comprise a vertical post or beam 203. It is to be understood that vertically extending member 202 may optionally be attached to beam 203 such that member 202 and beam 203 together comprise the first structural member. It is also to be understood that beam 203 may be omitted such that vertically extending member 202 alone comprises the first structural member.

It is to be understood that structural member 202 may include any of the exemplary members listed above with respect to structural member 102. Similarly, it is to be understood that structural member 204 may include any of the exemplary members listed above with respect to structural member 104.

Structure 200 includes a joining element 205 that is connected to structural members 202 (or 202/203 together) and 204. As illustrated clearly in FIG. 21, joining element 205 may be T-shaped. Header beam 204 may be made of wood, laminated veneer lumber (lvl), pressed steel or any other suitable structural material to which joining element 205 may be attached.

An active element 210 is provided. As will be explained, active element 210 may comprise one or more bendable sections or channels of material connected to joining element 205. As such, active element 210 is disposed between joining element 205 and vertical member (e.g. vertical channel) 202.

Active element 210 is configured such that when a force applied to one structural member (e.g. to header beam 204) the force passes at least partially through active element 210 and into the other structural member (e.g. vertical member 202), such that the entire structure 200 exhibits a prescribed load-deflection relationship.

A connector 220 configured to connect vertical member 202 to an external body is provided. As shown, connector 220 may comprise a pivot joint or a live hinge joint operating in the same manner as was described above with reference to connector 120 in FIG. 14. As such, connector 220 permits movement of structural members 202 and 204 without transmitting substantial bending moments to an external body 225. (External body 225 may comprise a portion of any floor of a building or the foundation of the building, similar to external body 125.) Thus, structural members 202 and 204 are permitted to rotate relative to one another while connector 220 prevents, or very substantially reduces, bending moment transmission to floor/foundation 225 in the plane in which structural members 202 and 204 are disposed.

Active element 210 is configured in a manner similar to that described above with reference to active element 110. Thus, structure 200 may alternatively be disposed in adjacent to (or fully within) a wall W or portal opening PO, operating in the same manner as was described above with reference to structure 100. For example, active element 210 may be configured such that the entire building structure (into which structure 200 is incorporated) exhibits a desired load-deflection relationship when a force is applied to the building.

Joining element 205 is preferably rigidly connected to header beam 204 such that joining element 205 does not move with respect to header beam 204. Such connection may be made by a series of bolts 206. Further details of this bolted (or screw or otherwise fastened) connection are shown in the top view of FIG. 22.

Figure 23:
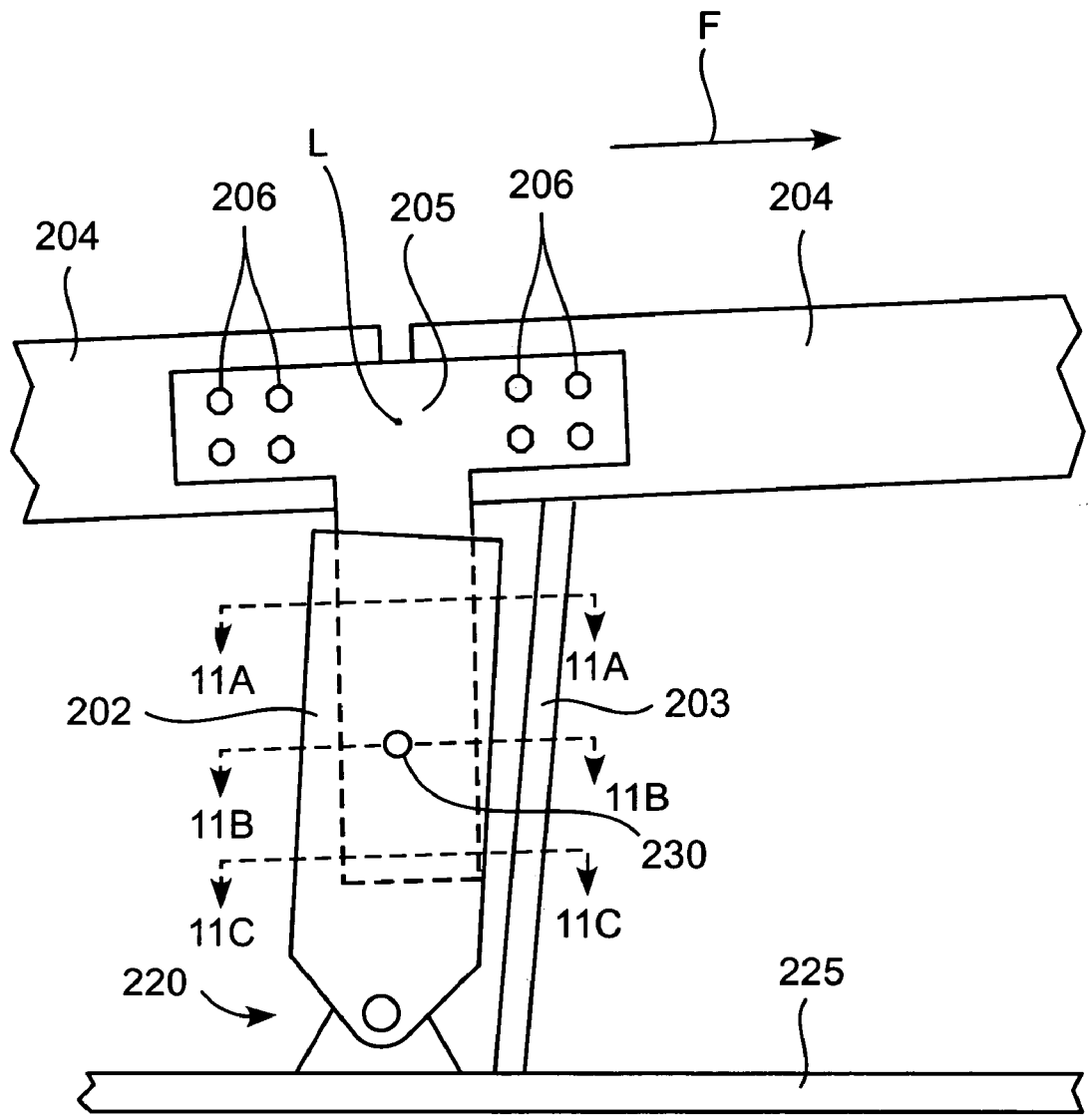
FIG. 23 is a side elevation view of the second embodiment of the invention, further including a pivot joint between the structural members, showing movement of the structural members of the system when a force has been applied thereto.

As can be seen in FIG. 23, an optional pivot 230 can be provided between joining element 205 and vertical member 202. When a force F is applied along header beam 204, header beam 204 (together with joining element 205) and vertical member 202 will rotate relative to each other about pivot 230.

As will be explained below, active element 210 will preferably flex when this rotation occurs. This is shown most clearly in FIGS. 24A to 24C discussed below. By flexing, active element 210 operates so that stresses between structural members 202 and 204 do not concentrate between the structural members at their joint locus L. Instead, the stresses are shared by active element 210 flexing. Moreover, pivot 230 also assists in providing support to horizontal header beam 204. In this aspect of the invention, active element 210 is located some distance away from the joint locus L between structural members 202 and 204. When a plurality of active elements 210 re used, they may be spatially distributed at locations away from joint locus L.

Figure 24A:
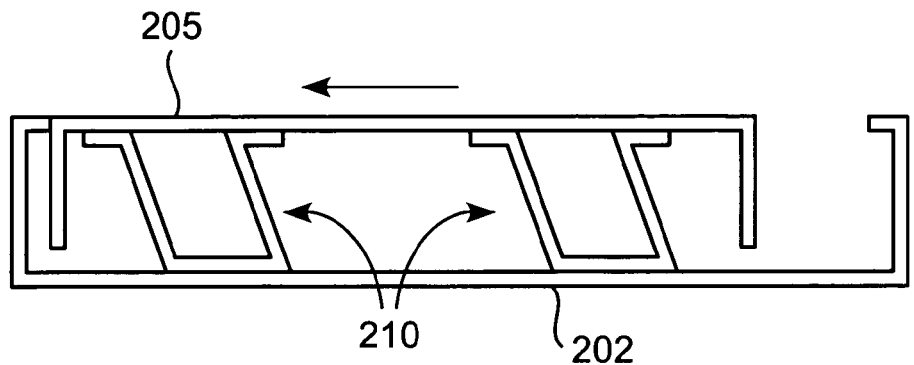
FIG. 24A is a top sectional top plan view taken along line 11A-11A in FIG. 23.
Figure 24B:
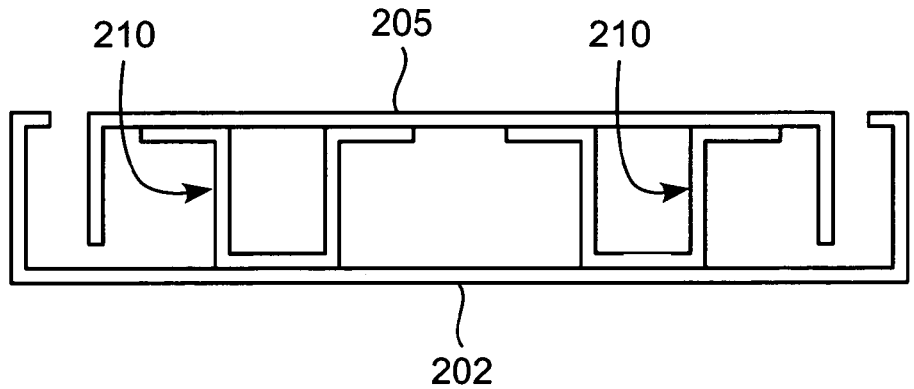
FIG. 24B is a top sectional top plan view taken along line 11B-11B in FIG. 23.
Figure 24C:
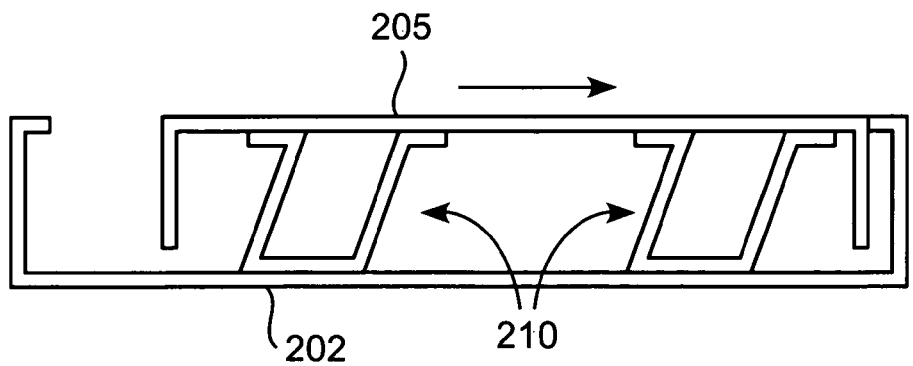
FIG. 24C is a top sectional top plan view taken along line 11C-11C in FIG. 23.

FIGS. 24A, 24B and 24C show further details of the flexing of active element(s) 210 taken along the lines 11A-11A, 11B-11B and 11C-11C in FIG. 23, respectively, as follows. Each active element 210 comprises a vertically extending channel of bendable or foldable material. Most preferably, this material is metal. The present inventors have successfully modeled a joining element 205 having a width of 11.25 inches and a depth of about 2 inches, together with a vertical member 202 having a width of 14.5 inches and a depth of 2.5 inches, with both joining element 205 and vertical member 202 being fabricated from 13 gage mild steel. Additionally, each active element 210 was modeled with a height of 2.5 inches and were fabricated from 12 gage steel. The resulting system, as illustrated in FIGS. 24A, B, and C, was sufficient to meet code requirements equivalent to a 22 inch pre-manufactured wood shear wall (being typical in the building industry). Moreover, by slightly increasing the thickness of the metal in active elements 210, or by slightly increasing the width of vertical structural member 202, the present system can be used at a portal opening to provide the same shear resistance characteristics as a solid conventional ply shearwall, without any weakening from the portal opening itself.

FIG. 24A shows the bending of active elements 210 near the top of vertical member 202. Specifically, shear forces on active element 210 (caused by relative movement of structural members 202 and 204) cause active element 210 to bend. FIG. 24B shows a view corresponding to that passing through pivot 230. As such, there is no bending of active element 210 at this location. FIG. 24C shows the bending of active elements 210 near the bottom of vertical member 202. Note that FIGS. 24B and 24C show active element 210 bending in opposite directions. By flexing in different directions along their length, active elements 210 transmit, absorb and dissipate energy due to structure 200 exhibiting a prescribed force/deflection relationship when a force is applied thereto. In this way, active element 210 reacts to bending moments between structural members 202 and 204 such that the unwanted effects of these bending moments are substantially reduced.

Figure 25:
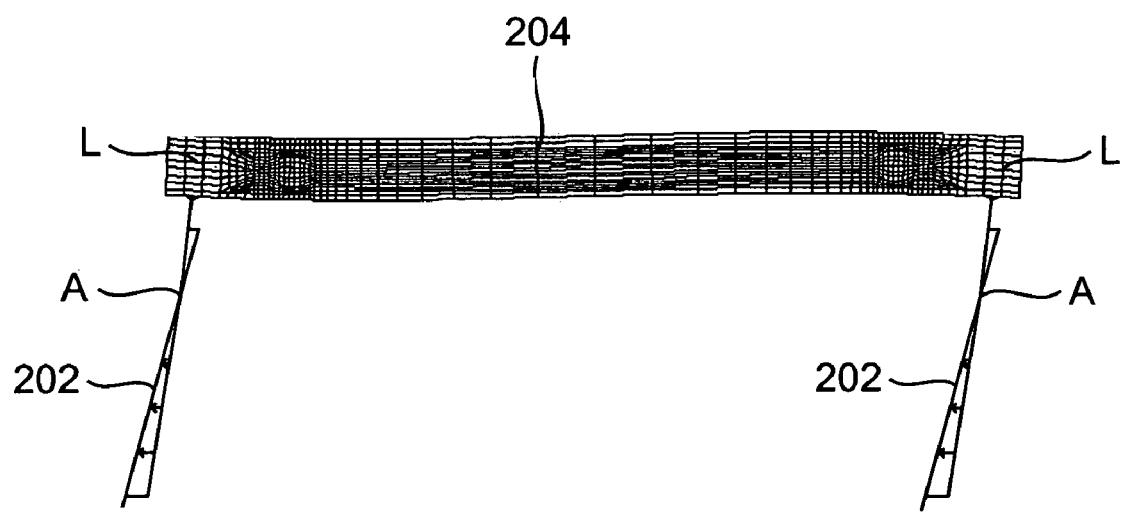
FIG. 25 is an illustration of the movement of the structural members of the second embodiment of the invention when a pivot joint is not provided between the first and second structural members.

It is to be understood that pivot 230 is optional. FIG. 25 shows relative movement of a pair of vertically extending members 202 and a header beam 204 in the absence of a pivot 230. As can be seen, each pair of structural members 202 and 204 rotate about an axis A that is displaced from its joint locus L. By thus moving axis A (about which structural members 202 and 204 rotate) to a location displaced away from joint locus L, the present invention operates so that stresses between structural members 202 and 204 do not concentrate at the locus L of the joint. Rather, the effective length of the bending moment arm of vertical member 202 is reduced and the unwanted effects of bending moments at joint loci L are thereby substantially reduced. The specific location of axis A is defined by the properties and location of active element 210. Thus, active element 210 is preferably configured to respond to forces applied thereto such that structure 200 exhibits a prescribed load-deflection response when a load has been applied thereto.

In the aspect of the invention illustrated in FIG. 25 (i.e.: in the absence of a pivot joint 230), the full weight of header beams 204 is supported through active elements 210. This could possibly prove to be disadvantageous in that the ability of active elements 210 to support such weight could change as, or after, the active element 210 flexes. Specifically, since active element 210 comprises a vertically extending "hat-shaped" channel of material, its stiffness is diminished after it has been bent to one side at its top end and bent to an opposite side at its bottom end.

Figure 26:
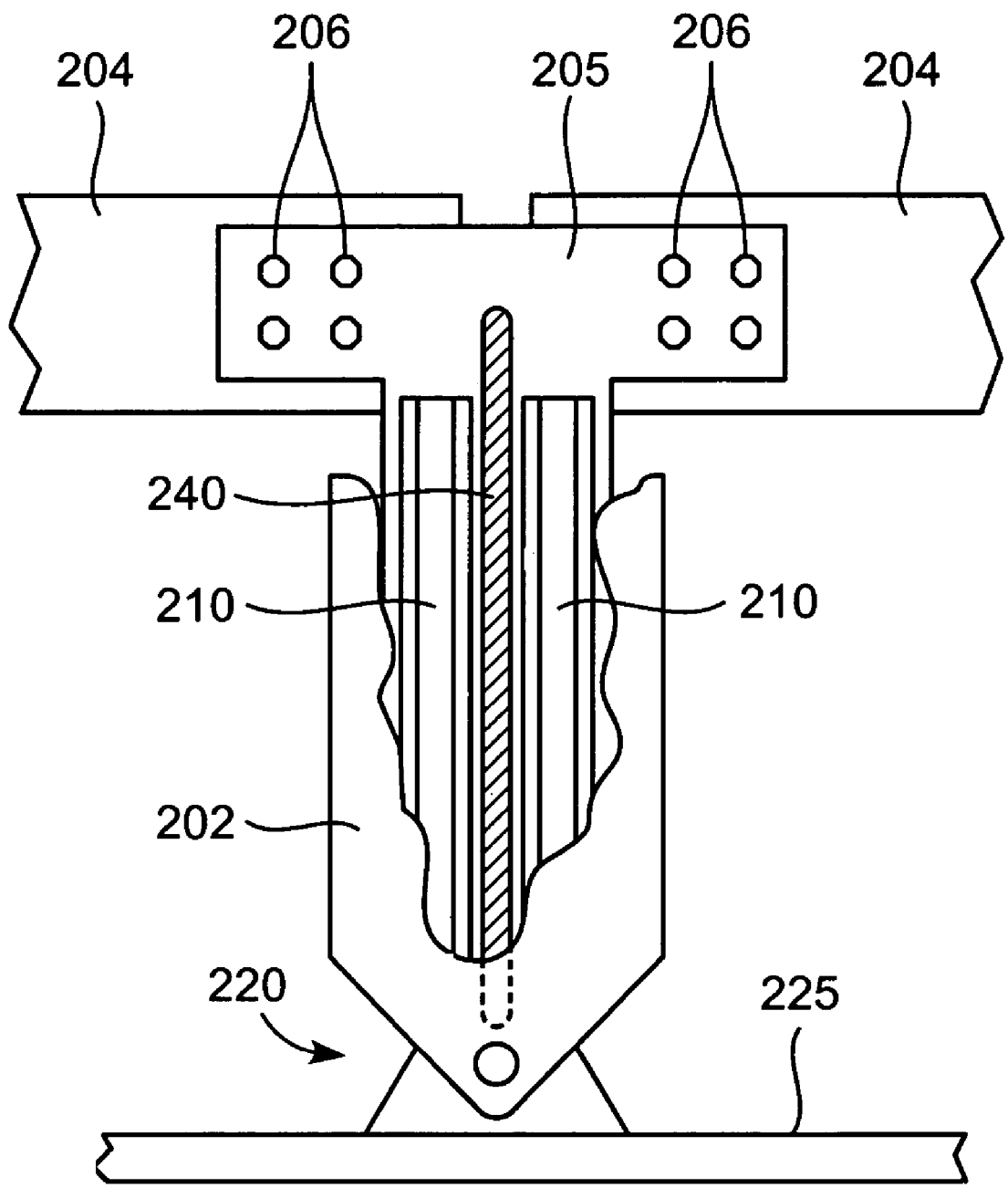
FIG. 26 is a cut-away side elevation view of the second embodiment of the invention, further including a load bearing element partially supporting the weight of one of the structural members.

For this reason, an optional aspect of the invention includes a load bearing element 240 (FIG. 26). Load bearing element 240 is configured to at least partially support the weight of one of the two structural members (e.g. header beams 204), such that its weight is not fully supported by the active element(s) 210. As shown, load bearing element 240 may comprise a cable connecting joining element 205 to vertical structural member 202. The use of a cable as the load bearing element 240 has the advantage that such cable would move slightly from side to side as joining element 205 moves with respect to vertical member 202 as active element(s) 210 flex. Alternatively, when pivot joint 230 is present, pivot 230 advantageously acts as the load bearing element, by connecting joining element 205 to vertical member 202.

Figure 27:
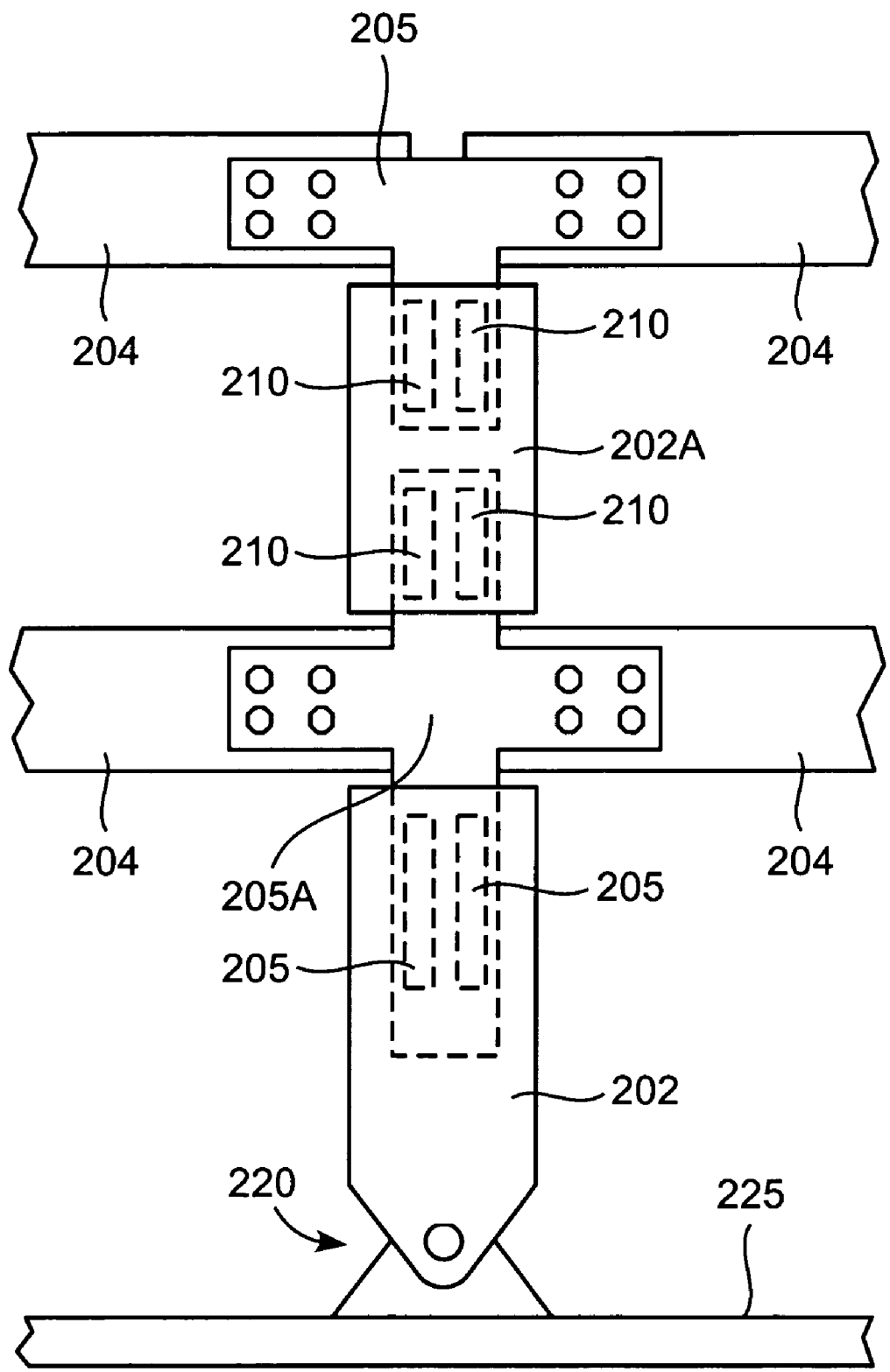
FIG. 27 is a side elevation view of a section of a building incorporating a system of the second embodiment of the present invention having upper and lower active elements.

FIG. 27 shows a side elevation view of a section of a building incorporating a system of the second embodiment of the present invention. In this aspect of the invention, the lower joining element 205A is cross-shaped and is connected to active elements 210 at both its upper and lower ends. In addition, upper vertical member 202A is connected to active elements 210 at both its upper and lower ends. A connector 220, as described above is provided at the bottom of the system, operating in the manner described above.

FIGS. 28 and 29 illustrate a third embodiment of the present invention, as follows. Referring first to FIG. 28, a structure 300 is provided. Structure 300 includes at least two structural members. In one aspect, the first structural member is a vertically extending post 302, and the second structural member is a portion of a rim joist 304. Post 302 is preferably anchored in a building foundation 303 which sits on top of, or within, the ground G.

Structure 300 includes a joining element 305 which connects post 302 to rim joist 304. Further details of joining element 305 are seen in the top plan view of FIG. 29. In the illustrated embodiment, joining element 305 comprises an outer frame 320 and an inner frame 330. A first pair of active elements 310A are disposed between outer frame 320 and inner frame 330. A second pair of active elements 310B are disposed between inner frame 330 and post 302. Active elements 310 may comprise one or more bendable sections or channels of material similar in shape to the "hat-shaped" active elements 210 described above. Active elements similar to cylindrical active elements 510 (see FIGS. 32 to 36) but instead positioned with their longitudinal axes being vertical, may also be substituted for active elements 310. Active elements 310 are configured such that when a force applied to one structural member (e.g. a seismic load moving post 302 horizontally in one or more directions) the force passes at least partially through active elements 310 and into the other structural member (e.g. rim joist 304), such that the entire structure 300 exhibits a prescribed load-deflection relationship in response to loading.

As can be seen in FIG. 29, when post 302 moves back and forth in direction D1, active elements 310A will flex back and forth in direction D1. Similarly, when post 302 moves back and forth in direction D2, active elements 310B will flex back and forth indirection D2. Thus, the present invention reduces the effects of force loading in the horizontal plane of the rim joist 304. Additionally, since active elements 310 comprise vertically extending channels of material, as shown, active elements 310 may also flex so as to reduce the unwanted effects of bending moments between post 302 and rim joist 304. Specifically, active elements 310A will flex so as to reduce the unwanted effects of bending moment BM1 (FIG. 15), and active elements 310B will flex so as to reduce the unwanted effects of bending moment BM2 (FIG. 29). To accomplish this, each of active elements 310A and 310B would flex in a manner similar to that described with reference to active elements 210, above. Specifically, the top end of the active element 310 would flex in one direction and the bottom end of the active element 310 would flex in an opposite direction. Thus, structure 300 reduces the unwanted effects of bending moments in various vertically extending planes passing through post 302.

Active elements 310 are preferably configured in a manner similar to that described above with reference to active elements 110 and 210. Thus, structure 300 may also alternatively be disposed under a wall or portal opening, operating in the same manner as was described above with reference to structure 100. For example, active element 310 may be configured such that the entire building structure (into which structure 300 is incorporated) exhibits a desired load-deflection relationship when a force is applied to the building.

FIG. 30 is a perspective view of a wall stud and sill plate sitting on a floor joist hanger according to the present invention. FIG. 31 is a perspective view similar to FIG. 30, incorporating a wall stud and sill plate according to the present invention.

Referring first to FIG. 30, structure 400 includes a wall (or shear panel 401) attached to a standard vertical stud 402 and a standard sill plate 404. The entire structure 400 is resting on a concrete foundation 411 and the ground G. A rim joist 407 (including a joist hanger 417) is shown supporting a floor joist 408 and sub floor 409 under sill plate 404. Rim joist 407 includes an active element 410 (similar to active element 431 described below). Active element 410 permits relative movement of assembly 401/402/404/408/409 relative to foundation 411 in direction D3 (being the same direction as D3 in FIG. 18). A separation layer 413 is provided between joist hanger 407 and foundation 411 to absorb the relative motion between joist hanger 407 and foundation 411. Separation layer 413 may be made of plastic, or any other material having a suitable coefficient of friction. As can also be seen, rim joist 407 is preferably channel shaped such that it is further able to deform to absorb vertical loads from wall assembly 410/402/404. Joist hanger 417 provides vertical stiffness to the c-shaped channel of rim joist 407. Thus, rim joist 407 and joist hanger 409 is also able to react to bending moments in direction BM1 (i.e. around an axis extending in direction D3).

FIG. 31 illustrates an embodiment of the present invention including a wall stud and a sill plate according to the present invention. A wall stud 420 and a sill plate 430 according to the present invention are provided. As will be explained, wall stud 420 can advantageously be substituted for a standard stud 402 in FIG. 30 to provide beneficial shear resistance properties (i.e. load-deflection behavior) in wall (or shear panel) 401. Similarly, sill plate 430 can advantageously be substituted for a standard sill plate 404 in FIG. 30 to provide beneficial shear resistance properties (i.e. load-deflection behavior) in wall (or shear panel) 401.

Specifically, wall stud 420 preferably has a series of cut out sections 421 disposed along its edge, as shown. Cut out sections 421 permit link sections 422 (interspersed between cut out sections 421) to flex such that side 423 may move in direction D1 while side 424 moves in direction D2. Wall 401 is preferably attached to side 423. Accordingly, any toppling movement of wall stud 420 would not fully translate into a bending moment applied to wall 401. An optional shear membrane (e.g.: plywood) may be attached to wall stud 420 and a sill plate 430 and to any other structural members containing active elements such that any force on the wall is absorbed, transmitted or dissipated by active elements 422 and 432.

In addition, sill plate 430 preferably comprises a bendable section or channel of material, which is preferably made of metal. As can be seen, a cut out active element 431 may be provided. (Active element 431 being the same design as the active element 110 shown in FIG. 18B). Active element 431 permits sill plate 430 to be bolted (or otherwise suitably fastened) to sub floor 409 and to react to loading in direction D3. In an optional design of sill plate 430, a small horizontal ledge 432 divides wall sections 433 and 434. Ledge 432 is preferably configured to flex such that wall section 434 may move up and down in direction D4. As such, sill plate 430 is also adapted to react to toppling movement of wall stud 420 in a direction normal to the plane of wall (or shear panel) 401.

Although wall stud 420 and sill plate 430 are shown in use with a wall 401, it is to be understood that wall stud 420 and a sill plate 430 can also be beneficially used even in the absence of a wall 401. For example, they can be used to reinforce a portal opening.

Thus, in FIGS. 30 and 31, a structure 400 is provided having at least two structural members. These structural members may comprise the wall stud 402/420 and sill plate 404/430, or the wall 401 and sub floor 409, or any combination thereof. These structural members are joined together by at least one active element (410 or 421/422 or 431 or 432) wherein a force applied to one structural member passes at least partially through the active element and into the other structural member, with the active element being configured such that the structure exhibits a prescribed load-deflection relationship when a force is applied thereto.

Figure 32:
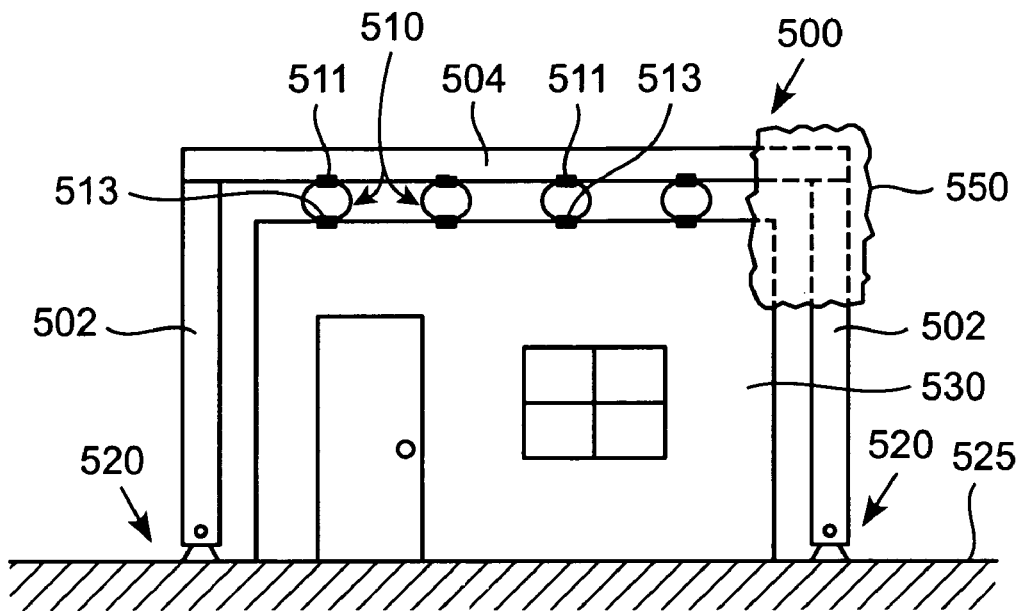
FIG. 32 is a side elevation view of a fourth embodiment of the present invention.

FIGS. 32 to 36 illustrate a fourth embodiment of the present invention, as follows. Referring first to FIG. 32, a structure 500 is provided. Structure 500 includes a header beam 504 and a pair of vertical members 502. In different aspects of the invention, the top ends of vertical members 502 may be connected to header beam 504 by any traditional means, or by pivot joints, or by a system shown in structure 100 or 200 or 400, described above. Vertical members 502 are preferably connected to an external body such as floor/foundation 525 by a pair of connectors 520 (operating similar to connectors 120 or 220 described above).

A series of active elements 510 are provided. As illustrated in further detail in FIG. 34, active elements 510 preferably each comprise a hollow cylinder of material. Header beam 504 is preferably connected to one side of active element 510 by fastener 511, and wall 530 is preferably connected to an opposite side of active element 510 by fastener 513.

Figure 33:
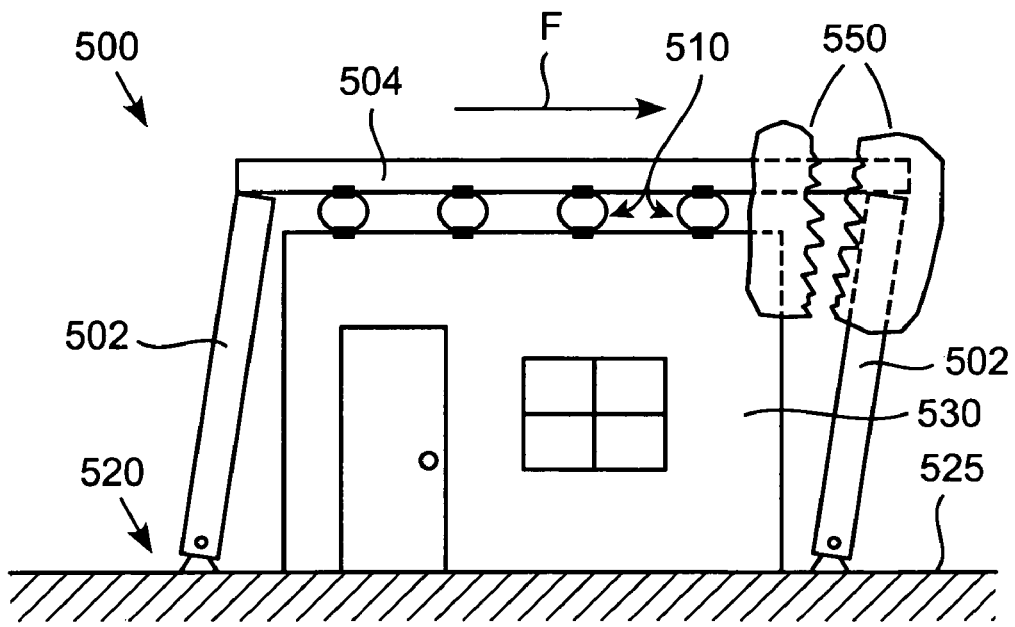
FIG. 33 is a side elevation view of the fourth embodiment of the present invention, showing movement of the structural members of the system when a force has been applied thereto.

Referring next to FIG. 33, active elements 510 are configured such that when a force F is applied to header beam 504, the active elements 510 will flex by rotating slightly, as shown. This flexing can be seen more clearly by referring to FIG. 35 (which shows a close up view of active elements 510 in the position shown in FIG. 32) as compared to FIG. 36 (which shows a close up view of active elements 510 in the position shown in FIG. 33).

Active elements 510 are particularly advantageous in that they flex to substantially reduce the unwanted effects of shear and bending moments in wall 530. In effect, they isolate wall 530 from bending forces and stresses traveling through vertical members 502 and horizontal building member 504.

However, a further advantage of the design of active elements 510 is that it is configured to transmit large forces in a direction along the axis of the cylinder (by resisting relative movement of header 504 and wall 530 along the direction of the axis), while transmitting much smaller forces (between header 504 and wall 530) in a direction normal to the axis of the cylinder. This is accomplished by permitting "rolling" movement in the direction normal to the axis. This advantage can be seen in FIG. 34, where a wind loading force in direction F2 (i.e.: normal to wall 530) is applied to the wall. Substantially all of this force F2 will be transmitted in (the same) direction D1 to wall 530. This is particularly advantageous in that the overall structure retains its stiffness in a direction normal to the wall, and is thus able to withstand wind loading against the wall. Other element configurations that similarly have high stiffness in selected directions and low stiffness in other selected directions are usable.

In a manner similar to that described above, active element 510 is preferably configured such that when a force (F in FIG. 34) is applied to one structural member (e.g. header beam 504 or wall 530) the force passes at least partially through active element 510 and into the other structural member (i.e. the other of header beam 504 or wall 530), such that the entire structure 500 exhibits a prescribed load-deflection relationship.

Figure 34:
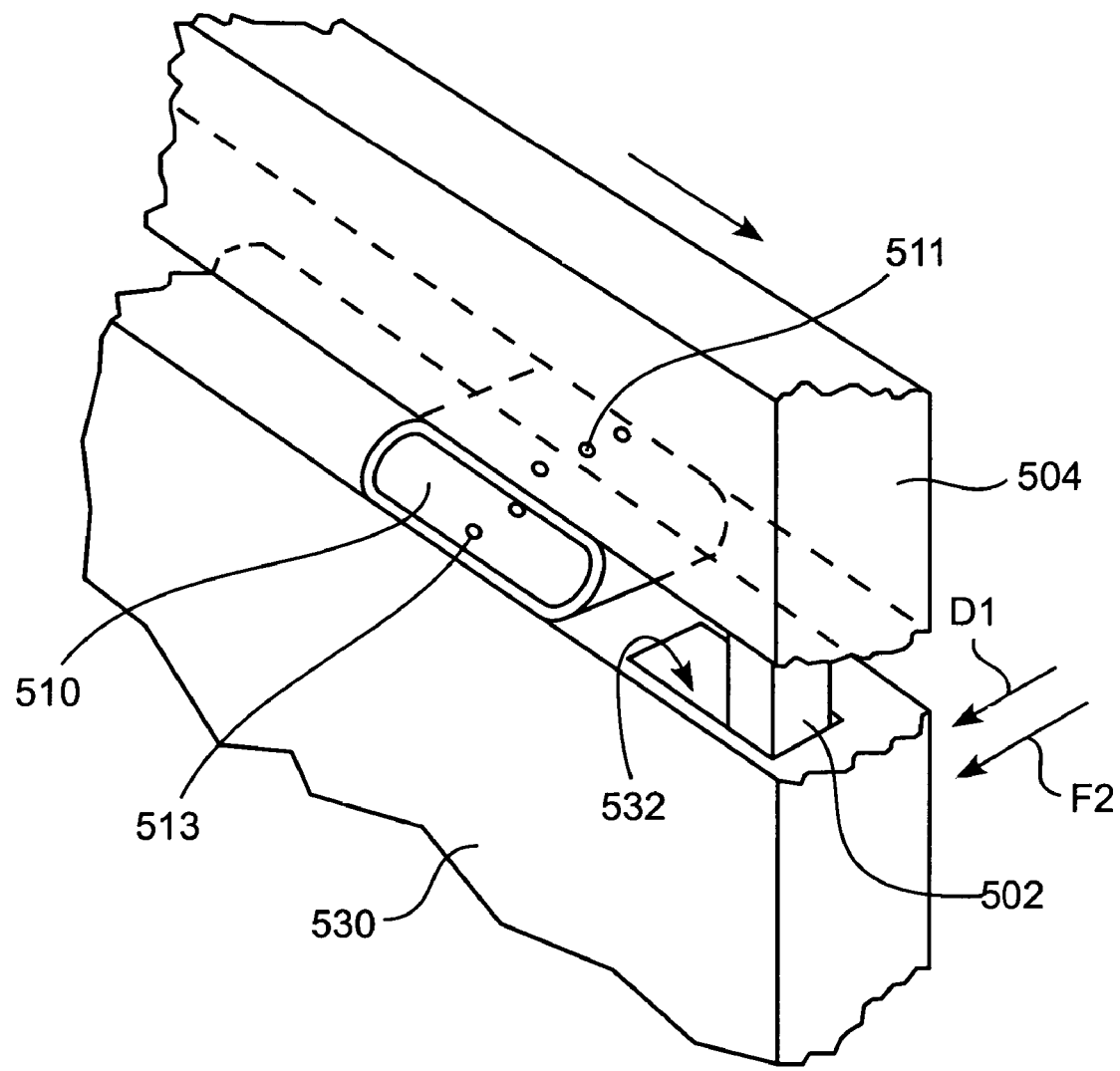
FIG. 34 is a cut away perspective view of the fourth embodiment of the invention.
Figure 35:
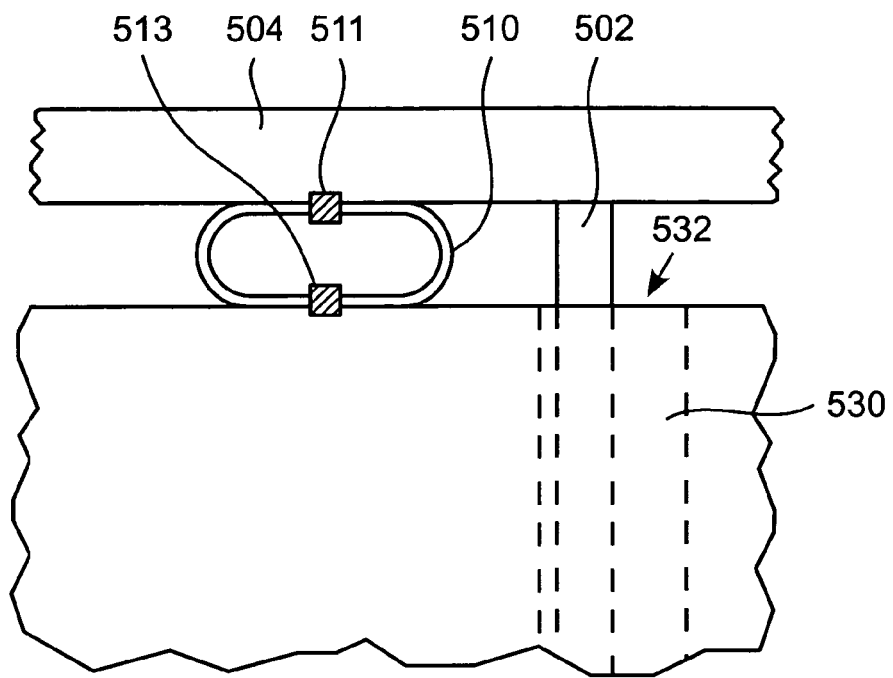
FIG. 35 is a close up side elevation view of the active element in the position shown in FIG. 32.
Figure 36:
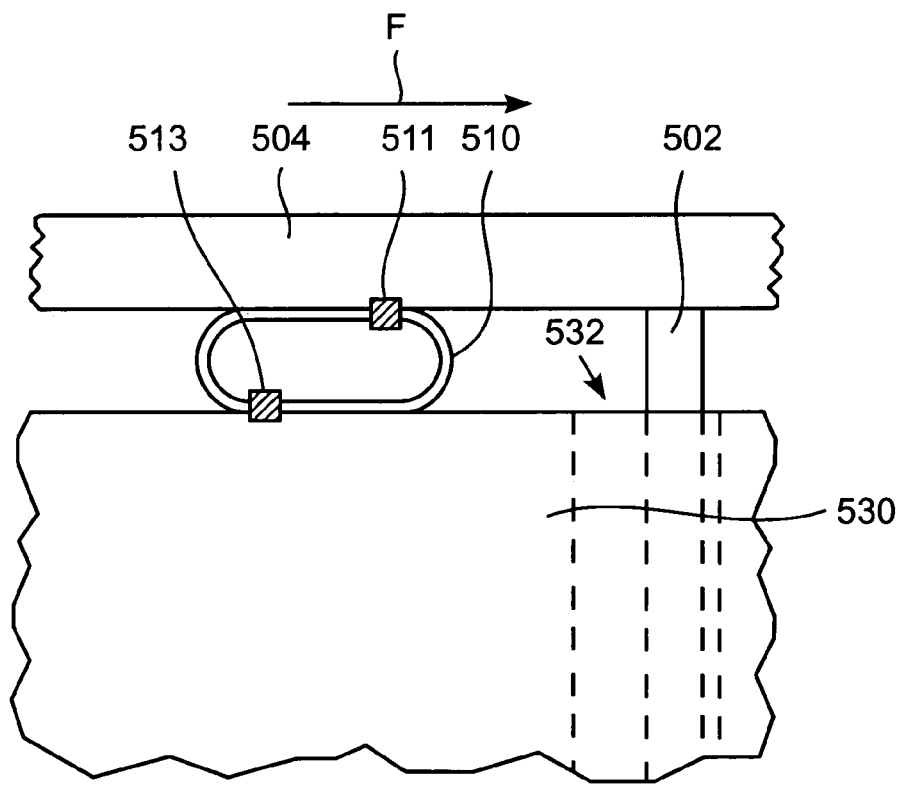
FIG. 36 is a close up side elevation view of the active element in the position shown in FIG. 33.

As illustrated in FIGS. 34 to 36, vertical structural member 502 may optionally comprise an intermediate load bearing post in a wall. Preferably, vertically extending intermediate load bearing posts 502 are isolated from wall 530 via vertically extending apertures 532 in the wall. Thus, load bearing post 502 is able to move somewhat within aperture 532 without transmitting bending or shear loads to wall 530.

In optional preferred aspects, covering elements 550 are attached to the structural members such that gaps among the structural members are covered. Such covering elements 550 may be disposed around the entire perimeter of wall 530, being connected to either or both of structural members 502 and 504. For ease of illustration, only a small portion of covering element 550 is shown in FIGS. 32 and 33 (being in a corner between wall 530 and structural members 502 and 504.

Covering elements 550 cover the gaps between wall 530 and structural members 502 and 504. Thus, they permit relative motion among the structural members with respect to one another. Preferably, covering elements 550 are sacrificial elements which may break apart with large loading or motion (as shown in FIG. 33).

FIGS. 37 and 38 illustrate an alternate design for an active element according to the present invention. Active element 610 comprises a bendable channel of material (similar to active elements 210, described above). In addition, however, active element 610 further comprises folds 602 on either side. One structural member is attached to the bottom of active element 610, whereas another structural (or joining) member 620 is connected to the top of active element 610.

An advantage of active element 610 is that it flexes such that members 620 and 630 can be moved with respect to one another in any of six degrees of freedom (absorbing forces in all six degrees of freedom), as desired. Referring to FIG. 38, members 620 and 630 can be moved in perpendicular directions D1, D2 and D3 with respect to one another, or they may be rotated in perpendicular directions D3, D4 ad D5 with respect to one another. As such movement occurs, the 605 sides will bend with respect to top 607 and bottom 609 of the active element 610. In addition, each of side folds 602 may open (e.g. fold 602B) or close (e.g. fold 602A). Moreover, folds 602 may tend to spread apart at one end and be compressed together at an opposite end along the length of the active element 610.

A particular advantage of active element 610 is that the same spacing between structural members 620 and 630 can be maintained even with the structural members moving laterally in direction D1 or rotating in direction D3 with respect to one another.

It is to be understood that active element 610 may be substituted for any of the active elements including 110, 210, 310, 430 or 510 described above.

FIG. 39 illustrates an optional add-on system 600 which may be used to actively control stiffness and energy dissipation. System 600 is illustrated for use with structure 100 (of FIG. 14) but is not so limited. Rather, system 600 can be used with any embodiment of the invention. In one optional aspect, system 600 may comprise an actuator 602 and a sensor 604. Actuator 602 may be mounted on top of structural member 104, as shown. Actuator 602 may further include a rod 603 which moves with respect to the mounted body of actuator 602. Sensor 604 detects the motion of rod 603 as active elements 110 flex. When motion is detected (especially cyclic motion at undesirable frequencies), actuator 602 may be activated such that it provides additional resistance to the movement of rod 603. This may have the advantageous effect of varying the energy dissipation characteristics of active elements 110.

It is to be understood that system 600 is not limited to the described embodiment. Rather, it may include any electrical or mechanical system which actively or passively modifies the load-deflection relationship of the structure in response to motion, either by modifying the characteristics of the active elements or by augmenting the load-deflection characteristics of the active elements. As such, system 600 may include any add-on system that responds to building movement, forces or acceleration wherein the system actively or passively adds or subtracts forces from the active elements, thus modifying the energy dissipation properties of the active elements.

Advantages of the present system are shown schematically by comparing FIGS. 40 and 41. FIG. 40 illustrates a pair of Simpson StrongWalls® 700 disposed on either side of a portal opening PO. The StrongWalls® 700 are each connected to header beam 104 at their top ends, as shown. When a force F (which may include a seismic loading force) is applied along header 104, bending moments will be created in each of StrongWalls® 700 such that one side is under tension (forces FT), and the opposite side is under compression (Forces FC). Each StrongWall® 700 has a height of H700 and a width of W700. As can be seen, StrongWall® 700 has a high aspect ratio (i.e.: its height H700 is significantly greater than its width W700). The bending moments caused by force F thus result in significant overturning forces in each StrongWall® 700. This is due to the fact that the overturning moments must be resolved into forces over the relatively narrow width W700.

Further disadvantages of StrongWalls® 700 include the fact that they tend to separate from header 104 at locations 701; separate from the ground or foundation members at locations 702; and compress at locations 703. Thus, a variety of external connectors (anchoring the StrongWall® 700 to the foundation and to the header beam 104), are required. A cumbersome assortment of internal reinforcements are found in each StrongWall® 700 as well.

FIG. 41 illustrates the advantages of the present invention over the Simpson StrongWall® design. FIG. 41 illustrates a pair of vertical members 102 disposed on either side of a portal opening PO. Vertical members 102 are each connected to header beam 104 at their top ends through active elements 110 (or any other active elements), as shown. When a force F (which may include a seismic loading force) is applied along header 104, vertical members 102 will rotate about connectors 120. Thus, no substantial bending moments will be transmitted from each of vertical members 102 to the ground or foundation members. Thus, the bending moment in structure 100 is advantageously resolved over the entire system width W100 (which is much larger than width W700 in FIG. 40), thus reducing the unwanted effects of the bending moment on the overall structure.

It will be noted that the active elements 110 of the present invention effectively displace the point about which structural members 102 and 104 rotate relative to one another from the locus of the joint therebetween. This beneficially reduces the local loads on header 104 (as compared to overturning moments on a conventional narrow shear wall (such as the Simpson StrongWall® 700 in FIG. 40). While header 104 must still transmit all of the loads, they are now better distributed therein. Moreover, as the pivot joint (i.e. connector 120) does not transmit significant bending loads, the foundation loads are greatly decreased (especially the uplift and compression loads associated with the hold down bolts of the conventional high aspect ratio StrongWall® 700 shear wall). This reduction in loads is sufficient to allow much lighter and cheaper anchor bolts and still meet the code mandated pull out requirements and spacing from the edge of the foundation. Requirements for grade beams across garage portals can also be reduced proportionate to the reduction in local bending and uplift such as occur with shear and moment frame portal solutions.

The building industry has recently attempted to codify the relationship between strength and stiffness by means of proposed AC (acceptance criteria) 215. In the past, R values (generally referred to as the equivalent response modification coefficient) have been largely determined by experience. However, R values, and other Code requirements are increasingly determinable from engineering principles and testing, such as finite element analysis.

R values relate to energy absorption, stiffness and strength, especially as related to required safety factors. For instance, concrete structures are very stiff and inelastic and have very low energy absorption. Therefore, in calculating the overall structural requirements for a building, concrete is at a disadvantage as far as the low R value dictates that there can be no allowance for energy absorption in the concrete. In other words, the concrete must resist the design loads with allowable safety factors with no failure. At the other extreme amongst building materials, wooden structures allow significant deformation, and the distortion of nails and fasteners along the edges of plywood panels provides significant energy absorption, thus have a much higher R value, which allows the building designer to provide sufficient strength and safety factors.

Referring to paragraph 1.2 of Proposed AC 215, the contents of which are herein incorporated by reference, it will be appreciated that the active elements provide the ability to modify and tune the dynamic characteristics and lateral force resistance and energy dissipation capacity and equivalent response coefficient, R, but also system overstrength coefficient, W and deflection amplification factors C. This can be done largely independently of the materials. For instance, to take an extreme example, if a structure comprising of two concrete elements were connected by an active element, the stiffness and energy absorption of the structure resulting from relative movement of the two concrete elements under an applied load or, to use the code language the force resistance and energy dissipation capacity would be determined by the properties of the active elements, not the low R value of the concrete. Thus, within broad limits, active elements can be used to provide a high R value (and other resultant values) even when the materials to which the active elements are connected have low R values and must be designed within entirely elastic limits with high safety margins (as in the case of concrete) or have other design constraints such as undesirable failure modes in light steel structures (linear response followed by catastrophic failure, usually buckling).

Some aspects of the Codes are derived from experience, rather than theoretical or calculated considerations. An example of this is the restriction on aspect ratio of non-engineered code compliant shear panels, as opposed to pre-manufactured or specifically engineered shear panels, from a maximum of 4-1 to 2-1, e.g. from 2' wide to 4' wide on an 8' high wall, instituted after the Loma Prieta earthquake. However, the concepts disclosed herein for active elements and shear panels incorporating active elements, including the performance of such elements and panels, can be measured and quantified.

Referring to the Finite Element Analysis (FEA) of shearwalls shown in FIGS. 6, 7 and 9, the force/deflection characteristics of the walls are shown on the graph in FIG. 10. The active elements on either side of the opening in FIG. 9 are of the type, configuration and characteristics shown in FIG. 11 and the FEA's in FIGS. 12 and 13. In all the FEA figures note the color code/shading for the indication of stress levels within the component.

The first FEA, FIG. 6, shows a standard 4×8 shear wall with overall force/deflection characteristics are shown in the graph on FIG. 10, the different colors/shading in the FEA showing the stress levels at maximum allowable deflection. The second FEA, FIG. 7 shows the same panel with an unreinforced opening, e.g., window, in it and the resultant stresses at maximum allowable deflection. The third FEA, FIG. 9, shows the same panel with AE's along the two vertical edges connected to a frame, thus surrounding the opening. The AE's are of the type, configuration and characteristics shown in FIGS. 11, 12 & 13.

These active elements deflect with the properties shown by the FEA's in such a manner that the deflection of the panel as shown in FIG. 9 is now essentially identical to the first panel (see upper two lines on graph in FIG. 10). Note also that the stresses around the very edge of the panels (see color codes/shading) where the shear membrane is nailed to the framing material (see FIG. 8) is essentially the same as the panel without the opening. Thus, in a building, the active elements allow the substitution of a shear panel with an opening that would otherwise unacceptably reduce its stiffness and strength for a solid shear panel without substantially changing the overall characteristics of the building structure of which they are part, as shown by the substantially same (±10%) force versus deflection curves.

It will be appreciated that different elements of the invention can be manufactured in many ways, either stamped, rolled or bent from one or more pieces of steel or other material, produced with separate reinforcement elements as in the embodiment shown. It can be made of non-metal materials such as engineered plastics and engineered wood-based products or other engineered materials either alone or in combination with any of the materials listed above in conjunction with steel and other materials as long as the force versus deflection properties are as desired. Use of different materials can also allow reduced heat transmission; it is often desirable to reduce heat loss through doors and windows to increase the energy efficiency of the structure. Use of different materials and combination of materials can also facilitate installation, by mechanical fasteners, gluing or bonding, interlocking or capture between studs and shear panels or other elements of the adjacent structure or other fastening means. It shall be appreciated that the force-resisting device in accordance with the present invention may be utilized for new building construction or for retrofits by providing a lightweight device that may be easily adapted for use within different areas or portions of a structure.

The implementation of force-resisting devices for different size openings or different discontinuity features in different configurations of shear walls may be done without changing the design or geometry of the active element by using tailored specific lengths of the same force-resisting elements on one or more sides of the opening or discontinuity.

Although the present invention has been described in detail with regard to resisting lateral or in-plane forces, as will be appreciated by one having ordinary skill in the art, the force-resisting device according to the present invention is also applicable to substantially horizontal perpendicular loads and/or rotational loads which may be applied to a structure.

The present invention provides a very versatile system for structural reinforcement; including, but not limited to reinforcing building structures, including walls and portal openings. As will be explained, the present invention can advantageously be used to reinforce building structures against seismic loading. However, the present invention is not so limited. For example, the present invention can also be used to provide reinforcement around a portal opening in a building (such as a door, garage door or window frame) so that the typical unwanted effects of a portal opening can be substantially reduced. Such typical unwanted effects of a portal opening include its reducing the structure's overall resistance to shear, and the increased stress concentrations that occur at the corners of the portal. Additional unwanted effects of portal openings include the high overturning moments they create in high-aspect walls Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A force resisting device for transmitting forces and dissipating and absorbing energy in a shear wall or shear wall segment, the force resisting device comprising: at least one active element, the active element includes two planar regions separated by an out-of-plane region and is a single unitary component having first and second opposite surfaces joined by a pair of end surfaces and a pair of side surfaces, wherein the first surface within the two planar regions is in a common plane and at least a section of the first surface in the out-of-plane region is outside the common plane, wherein the at least one active element has a force versus deflection property under at least one cyclic load such that the shear wall or shear wall segment has at least one building code compliant parameter, the parameter selected from the group consisting of an equivalent response coefficient, R, a system overstrength coefficient, W, and a deflection amplification factor, C, wherein the at least one active element is configured and oriented within the shear wall or shear wall segment so that as a shear force is applied to the shear wall or the shear wall segment the active element flexes in different directions along its length.

2. The force resisting device of claim 1, wherein the shear wall includes at least two building code compliant parameters.

3. The force resisting device of claim 2, wherein the shear wall includes at least three building code compliant parameters.

4. A force resisting device for transmitting forces and dissipating and absorbing energy, the device comprising: at least one active element, the at least one active element including two planar regions separated by an out-of-plane region and is a single unitary sheet of metal having first and second opposite surfaces joined by a pair of end surfaces and a pair of side surfaces, wherein the first surface within the two planar regions is in a common plane and at least a section of the first surface in the out-of-plane region is outside the common plane, wherein the at least one active element has a force versus deflection property under at least one cyclic load, wherein the force versus deflection property is elastic in a first range of forces and is plastic in a second range of forces, the second range of forces greater than the first range of forces, and wherein in the second range of forces, deflection increase more per unit load than in the first range of forces.

5. A force resisting device for transmitting forces and dissipating and absorbing energy, the device comprising: at least one active element, the at least one active element including two planar regions separated by an out-of-plane region and is a single unitary sheet formed from an engineered plastic or an engineered composite material having first and second opposite surfaces joined by a pair of end surfaces and a pair of side surfaces, wherein the first surface within the two planar regions is in a common plane and at least a section of the first surface in the out-of-plane region is outside the common plane, wherein the at least one active element has a force versus deflection property under at least one cyclic load, wherein the force versus deflection property is elastic in a first range of forces and is plastic in a second range of forces, the second range of forces greater than the first range of forces, and wherein in the second range of forces, deflection increase more per unit load than in the first range of forces.

6. A force resisting device for transmitting forces and dissipating and absorbing energy in a shear wall or shear wall segment, the force resisting device comprising:
a pivotable connection at a first end connecting the force resisting device to an external body; and
at least one active element, the at least one active element including two planar regions separated by an out-of-plane region and is a single unitary component having first and second opposite surfaces joined by a pair of end surfaces and a pair of side surfaces, wherein the first surface within the two planar regions is in a common plane and at least a section of the first surface in the out-of-plane region is outside the common plane, wherein the at least one active element has a force versus deflection property under at least one cyclic load,
wherein the pivotable connection permits movement of structural members of the shear wall or shear wall segment without transmitting substantial bending moments to the external body.

7. The force resisting device of claim 6, wherein the external body includes a portion of a floor of a building or a foundation of a building.

8. The force resisting device of claim 6, wherein the pivotable connection at the first end connects a vertical member of the force resisting device to the external body.

9. The force resisting device of claim 6, wherein the force versus deflection property is elastic in a first range of forces and is plastic in a second range of forces, the second range of forces greater than the first range of forces, and wherein in the second range of forces, deflection increase more per unit load than in the first range of forces.

10. A force resisting device for transmitting forces and dissipating and absorbing energy in a shear wall or shear wall segment, the force resisting device comprising:
an elongated member comprising first and second opposing sides and at least one active element located between the first and second opposing sides,
wherein the at least one active element includes two planar regions separated by an out-of-plane region and is a single unitary component having first and second opposite surfaces joined by a pair of end surfaces and a pair of side surfaces, at least a section of the top surface of the out-of-plane region is in a different plane from the plane common to the first surfaces of the two planar regions and the at least one active element has a force versus deflection property under at least one cyclic load, and
wherein the elongated member comprising the at least one active element is configured and oriented within the shear wall or shear wall segment so that as a shear force is applied to the shear wall or the shear wall segment the active element flexes in different directions along its length.

11. The force resisting device of claim 10, wherein the force versus deflection property is elastic in a first range of forces and is plastic in a second range of forces, the second range of forces greater than the first range of forces, wherein in the second range of forces, deflection increase more per unit load than in the first range of forces, and wherein the force-resisting device further includes a pivotable connection at a first end connecting the force resisting device to an external body.

12. A building including the force resisting device as in any one of claims 1, 2, 3, 4, 5, 6, 10, and 11.

13. A prefabricated shear wall or shear wall segment comprising the force resisting device as in any one of claims 1, 2, 3, 4, 5, 6, 10, and 11.

14. A building including the prefabricated shear wall or shear wall segment of claim 13.

* * * * *